United States Patent [19]

Bailey

[11] 4,344,479

[45] Aug. 17, 1982

[54] PROCESS AND APPARATUS UTILIZING COMMON STRUCTURE FOR COMBUSTION, GAS FIXATION, OR WASTE HEAT RECOVERY

[75] Inventor: Frank W. Bailey, New York, N.Y.

[73] Assignee: Fuelsaver Company, Potomac, Md.

[21] Appl. No.: 928,811

[22] Filed: Jul. 28, 1978

[51] Int. Cl.³ .............................................. F28F 13/12
[52] U.S. Cl. .............................. 165/109 R; 122/44 A;
122/155 A; 122/20 B
[58] Field of Search .......... 122/44 A, 155 A, DIG. 3,
122/20 B, 367; 126/391; 110/147, 322;
165/109; 222/72, 249, 250; 73/197, 243

[56] References Cited

U.S. PATENT DOCUMENTS

| | | | |
|---|---|---|---|
| 642,535 | 1/1900 | Snyder | 165/109 |
| 676,165 | 6/1901 | Wacker | 34/182 |
| 1,880,533 | 10/1932 | Thomas | 122/367 A |
| 2,188,133 | 1/1940 | Hepburn | 431/215 X |
| 3,143,395 | 8/1964 | Hilmore | 165/109 X |
| 4,110,064 | 8/1978 | Vorona et al. | 431/171 |
| 4,157,706 | 6/1979 | Gaskill | 122/155 A |

Primary Examiner—Edward G. Favors
Attorney, Agent, or Firm—Ira C. Edell

[57] ABSTRACT

An enclosure containing rotating blades for mechanical stirring of gaseous fluids may be a heat exchanger, flue gas energy recovery device, gas generator or combustion device. A high rotational stirring velocity increases the convective heat transfer rate, rendering it independent of the lower throughput velocity of primary fluid which can be controlled independently of the stirring speed. Primary fluid is isolated from a secondary fluid by a thermal transfer surface which is continuously swept by the swirling primary fluid and which may be the peripheral wall of the enclosure or a flow tube located proximate the peripheral wall. In one embodiment, swirling is achieved by radially-extending blade assemblies secured to a rotatable shaft at longitudinally spaced locations to establish discrete swirling zones in which fluid recirculates from the shaft outwardly, along the wall, and back toward the shaft. In another embodiment, the blades extend longitudinally, proximate the peripheral wall, from peripheries of horizontal discs which rotate with the shaft. In this embodiment, primary fluid follows a restricted helical path, maintaining continuous contact with the thermal transfer surface, away from the shaft. Either embodiment may be converted to a combustion system by igniting primary fluid in the presence of admitted air. In all embodiments, recirculation of primary fluid condensate, injected water or additive optimizes heat transfer via latent heat of vaporization and dropwise condensation. Blade rotary speed may be varied to commonly or independently control: combustion fuel and air flow; primary fluid flow; and stirring energy.

46 Claims, 31 Drawing Figures

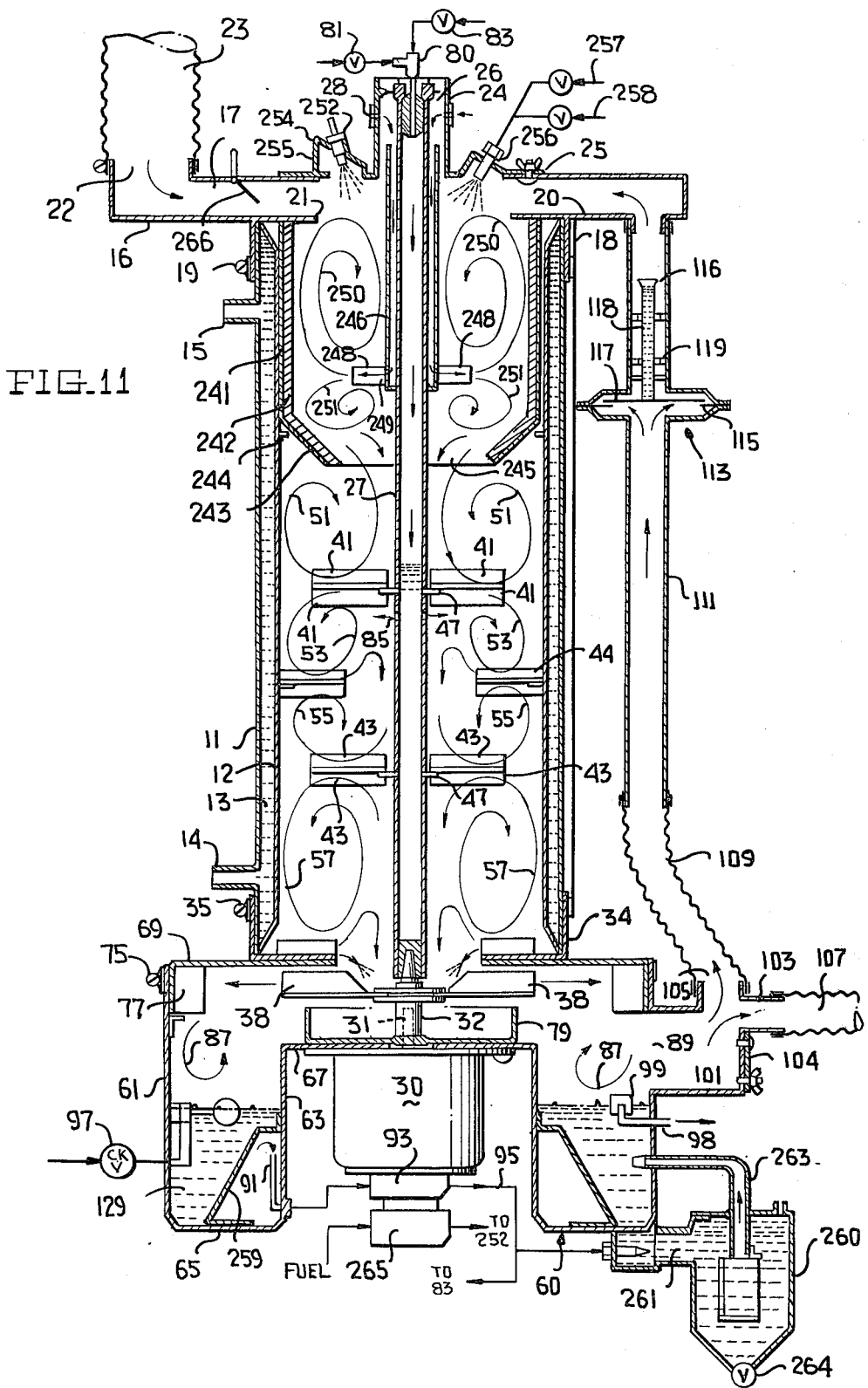
FIG_11

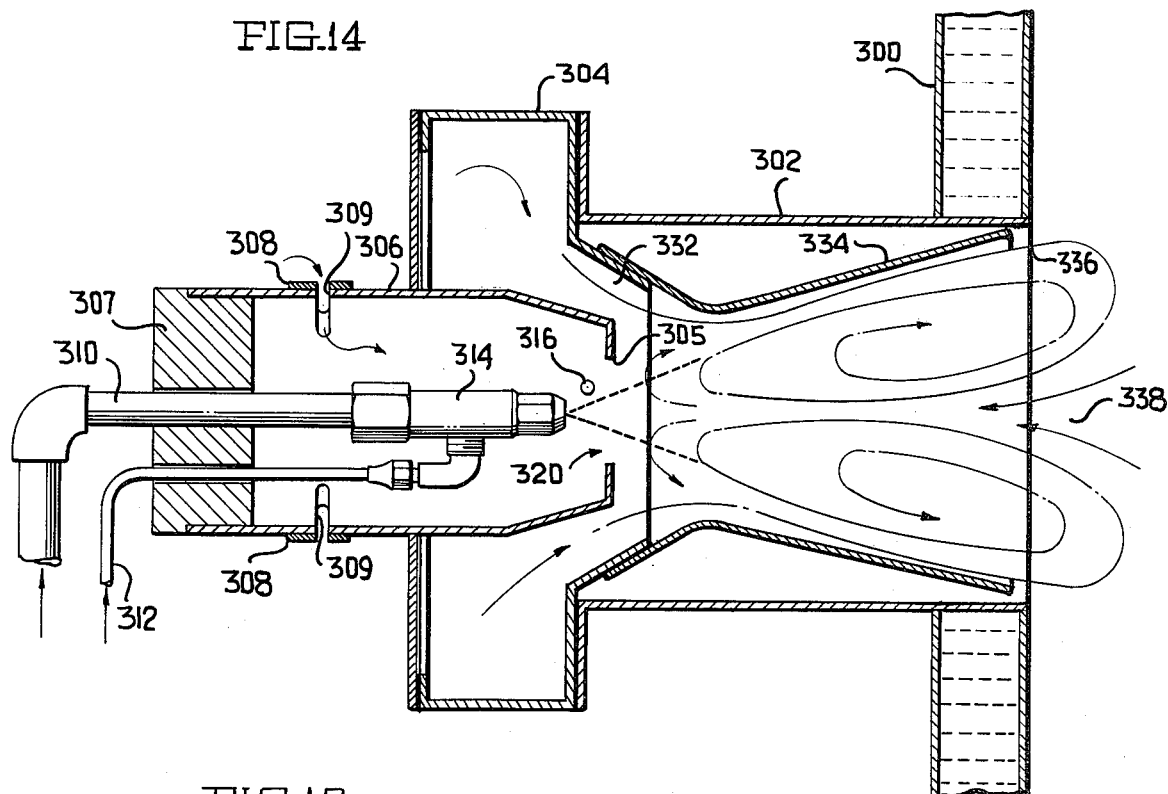
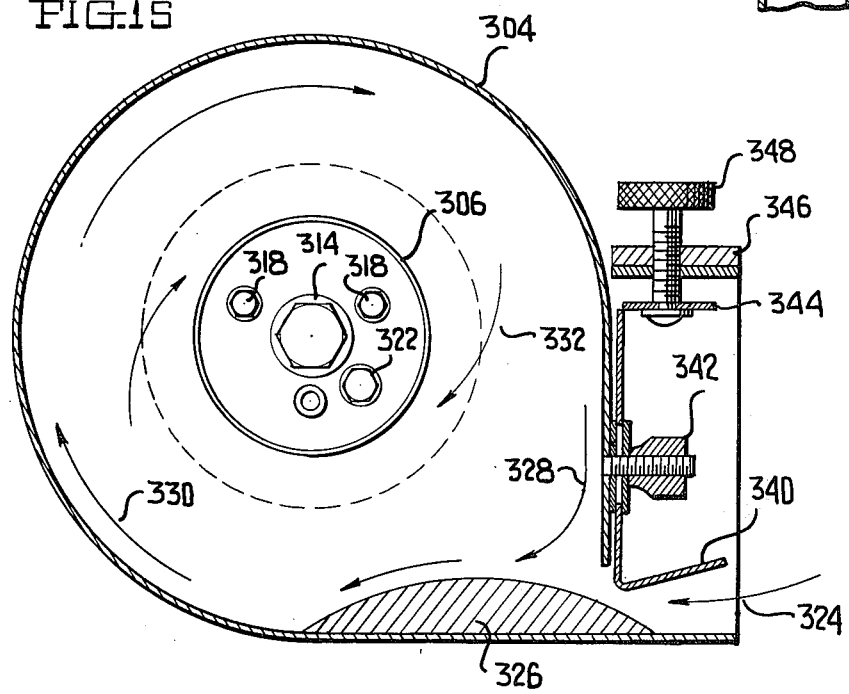

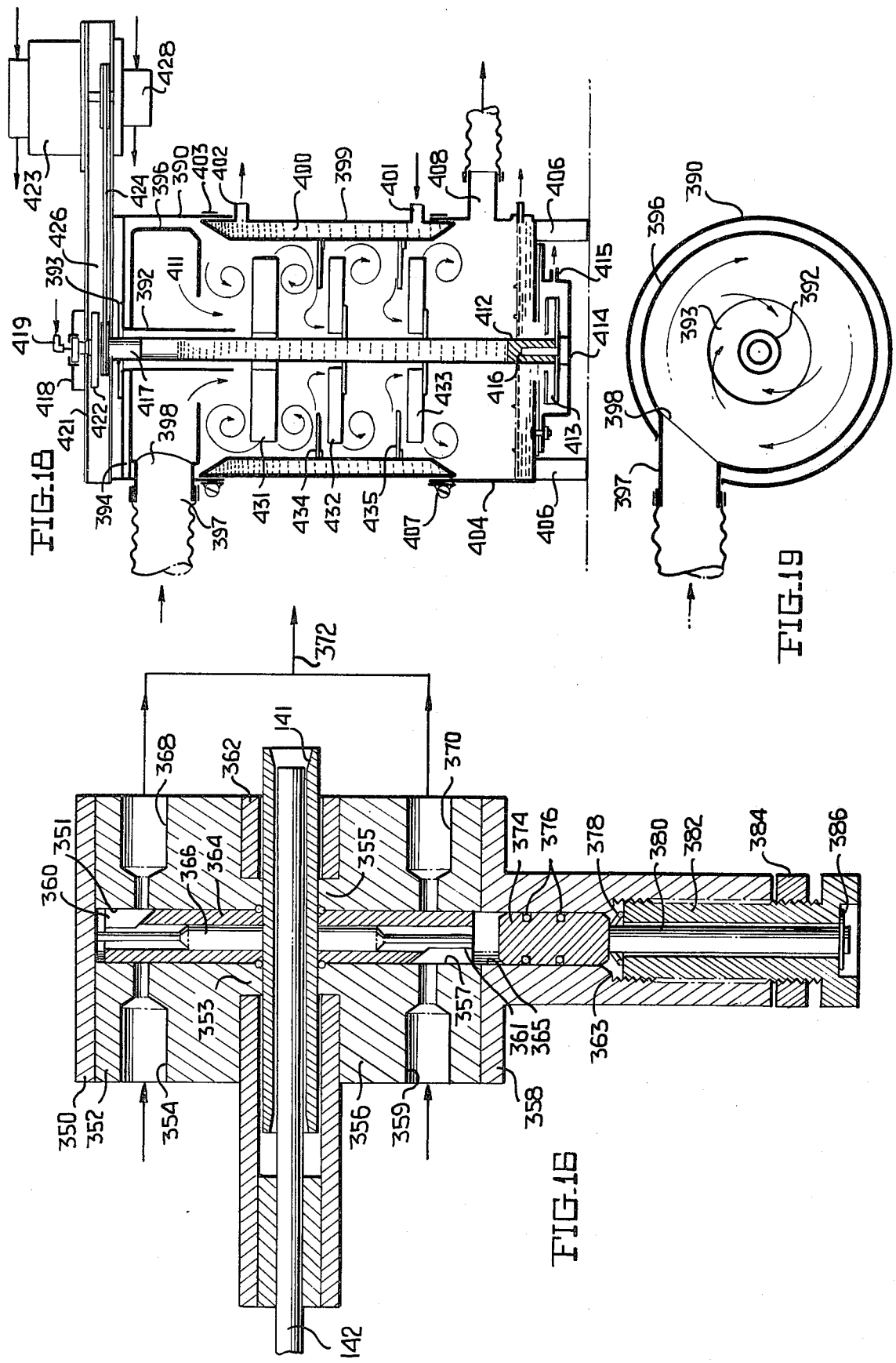

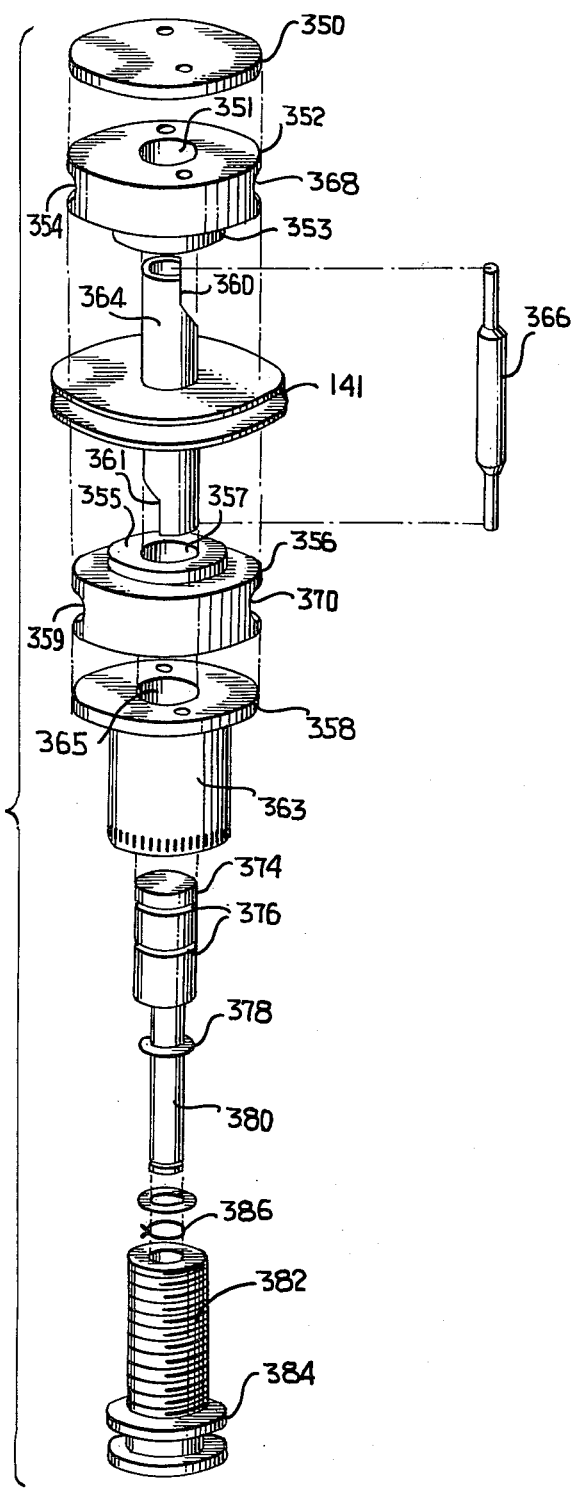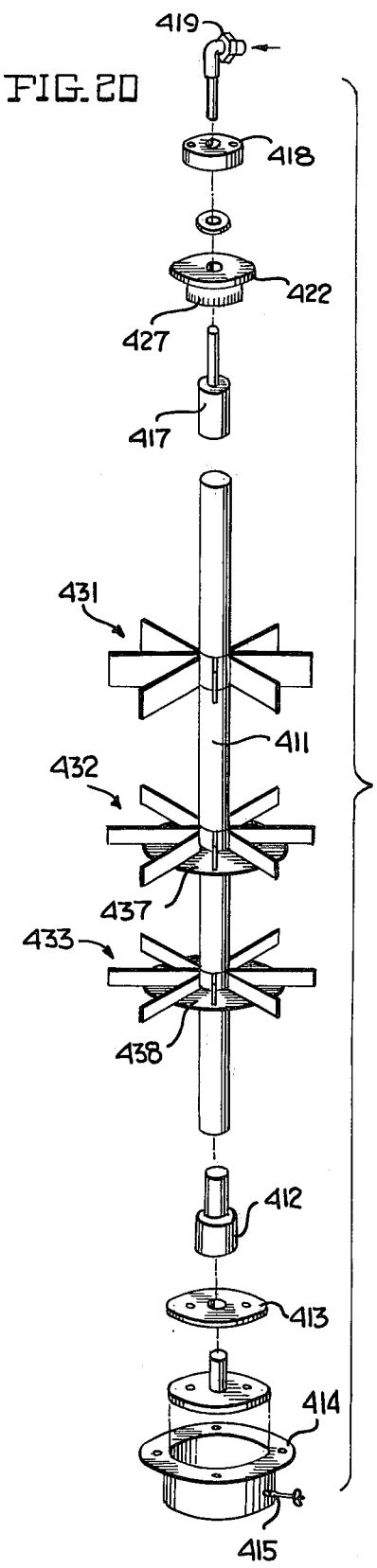

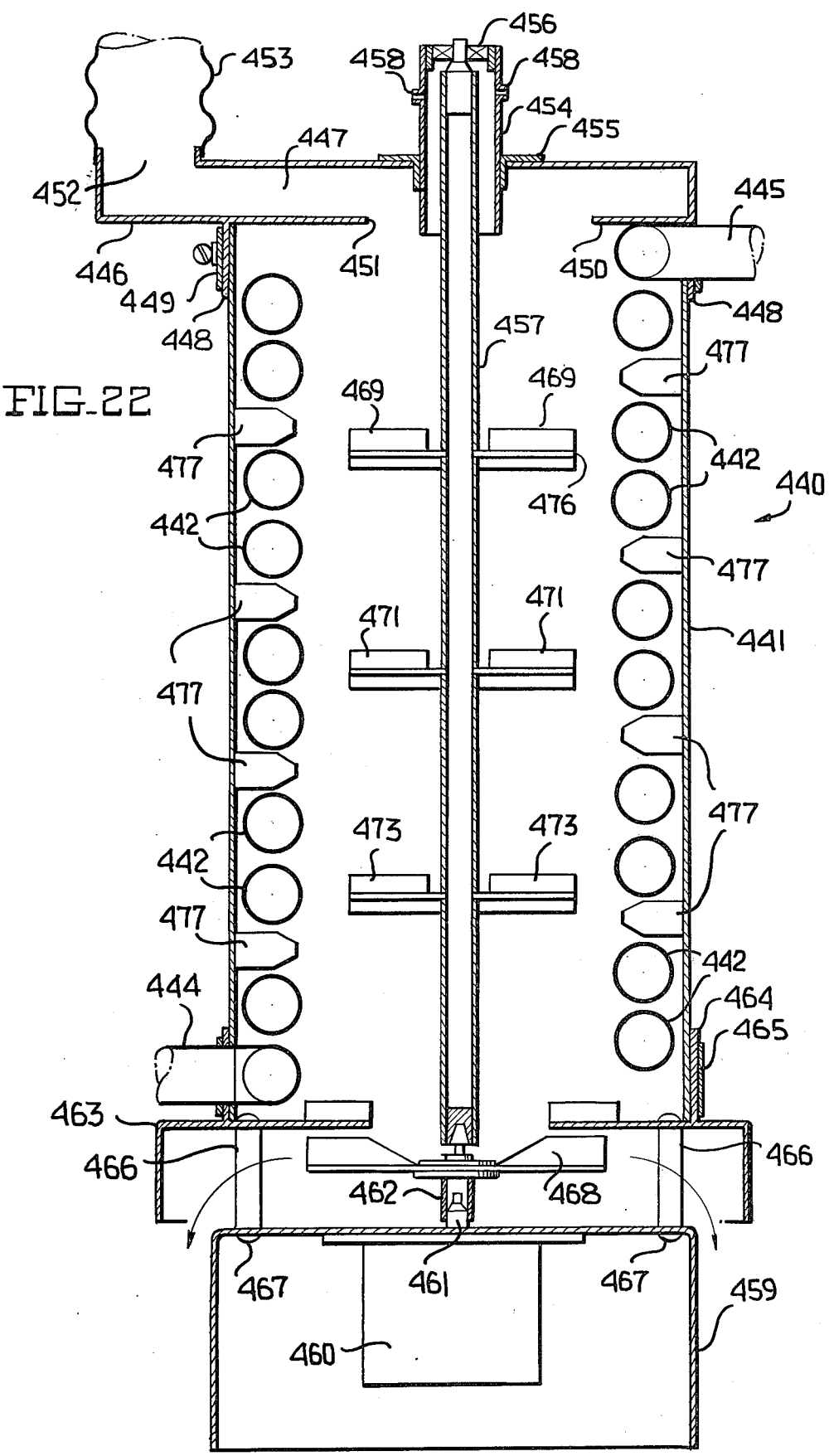

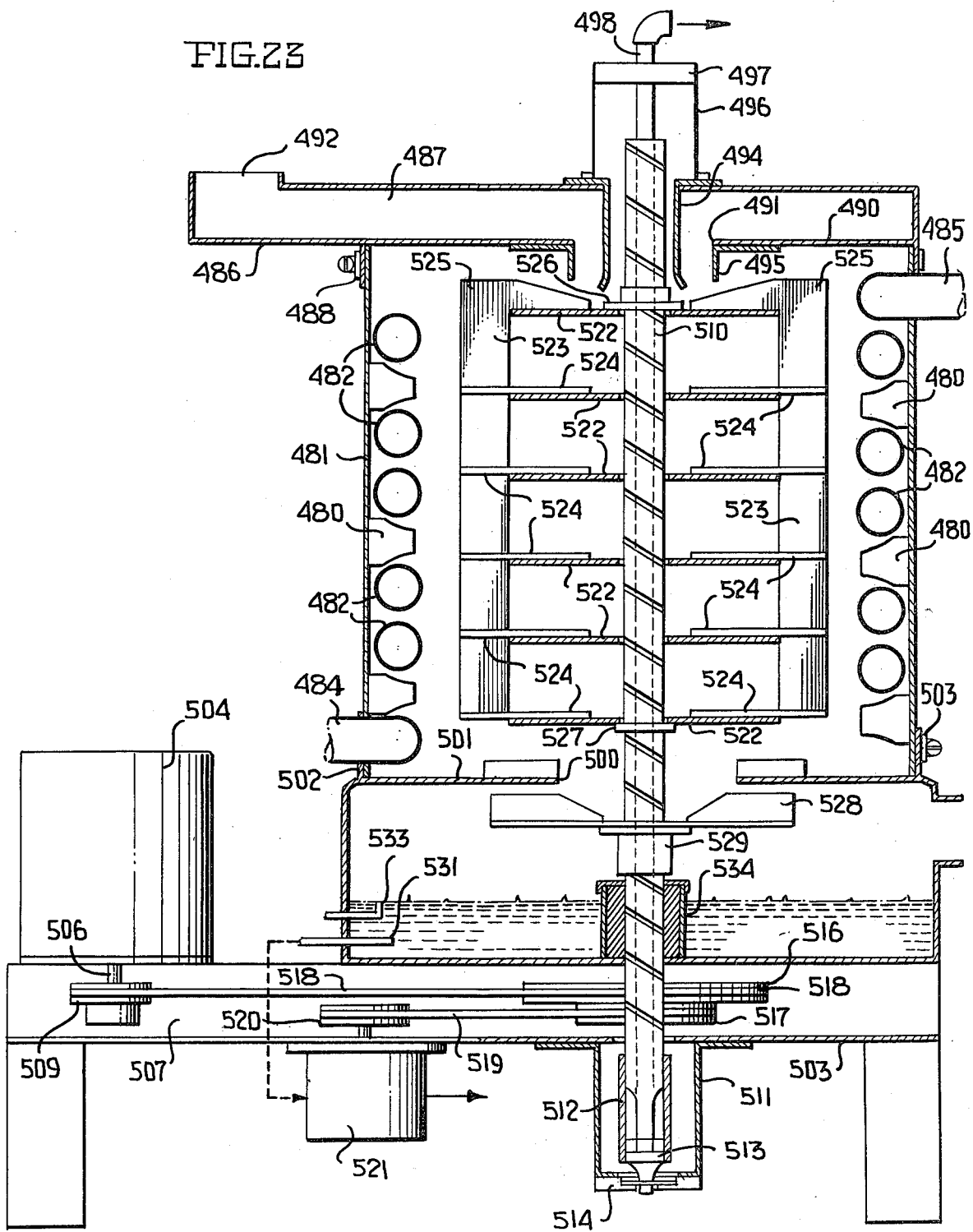

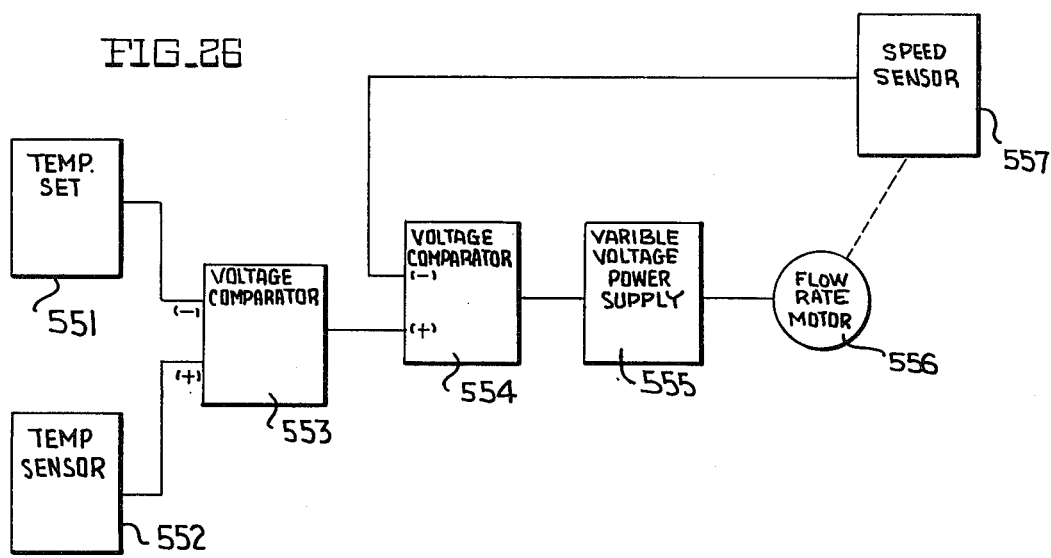
FIG_26
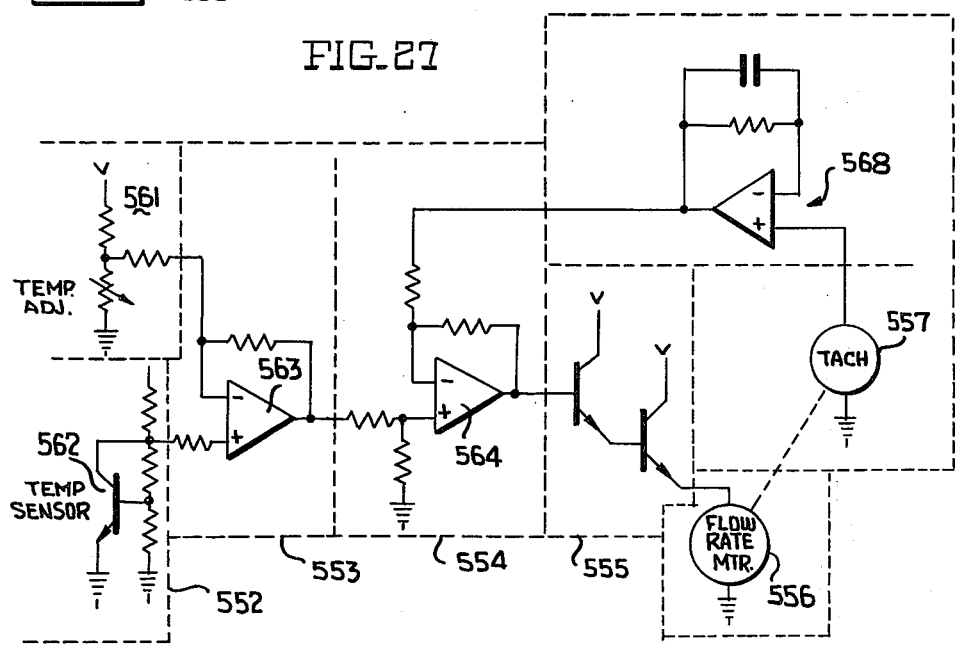
FIG_27
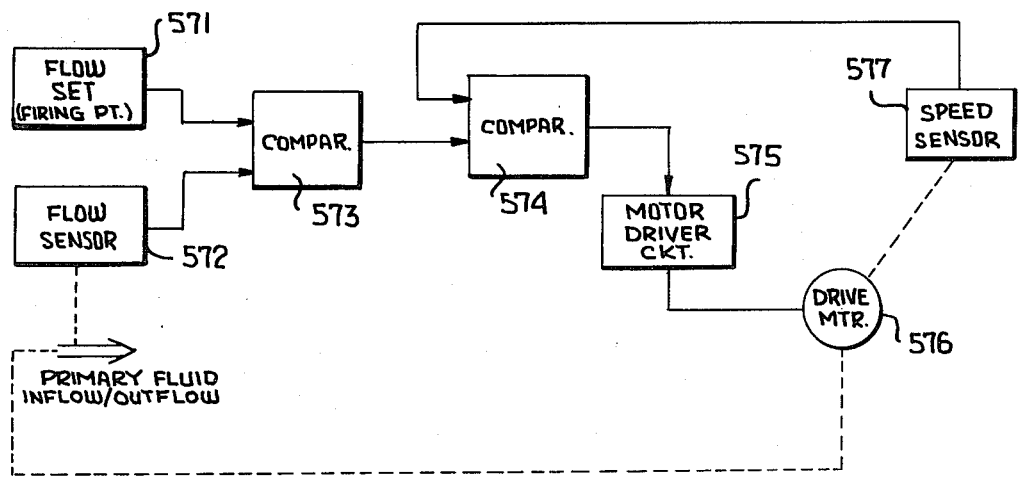
FIG_28

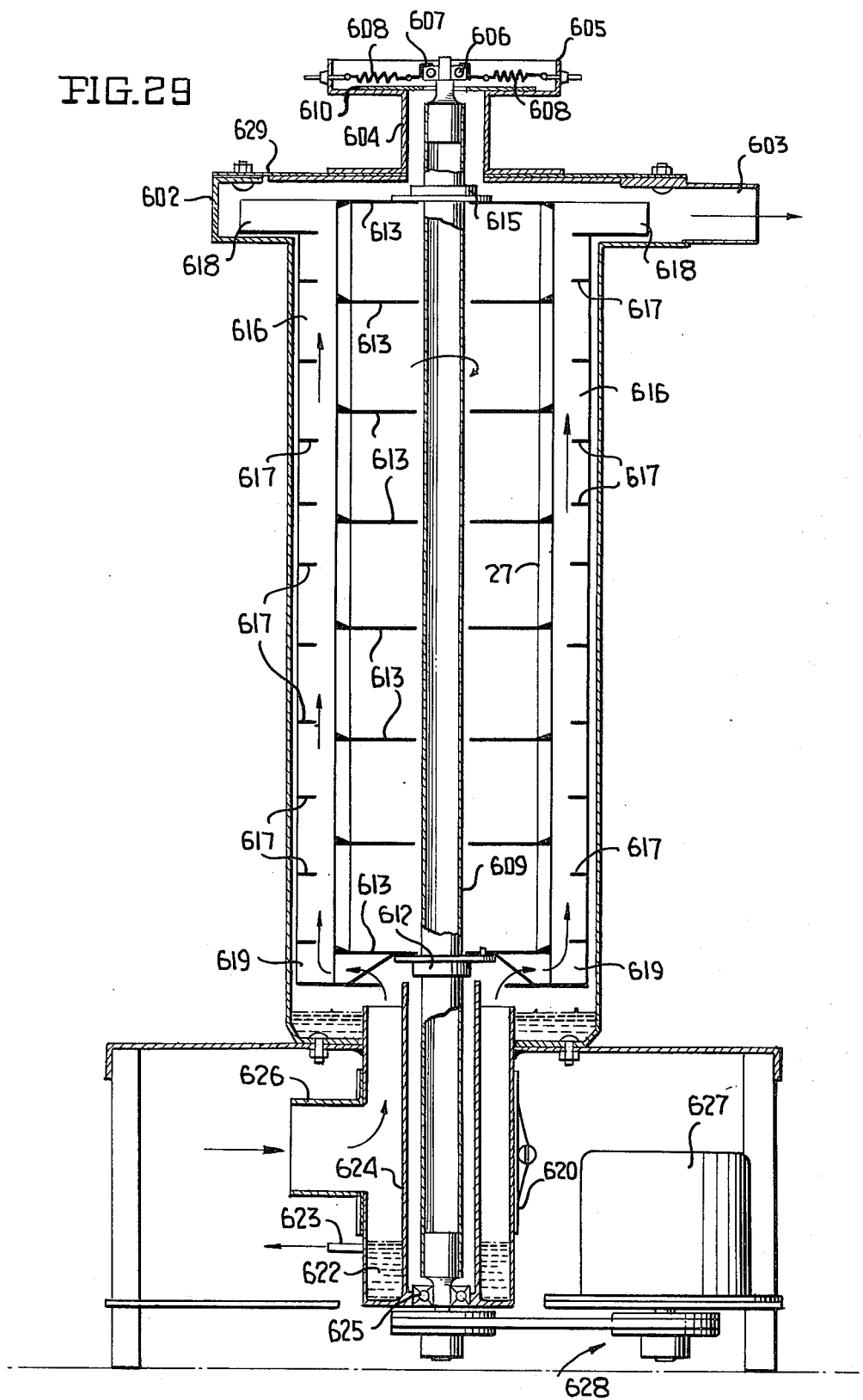

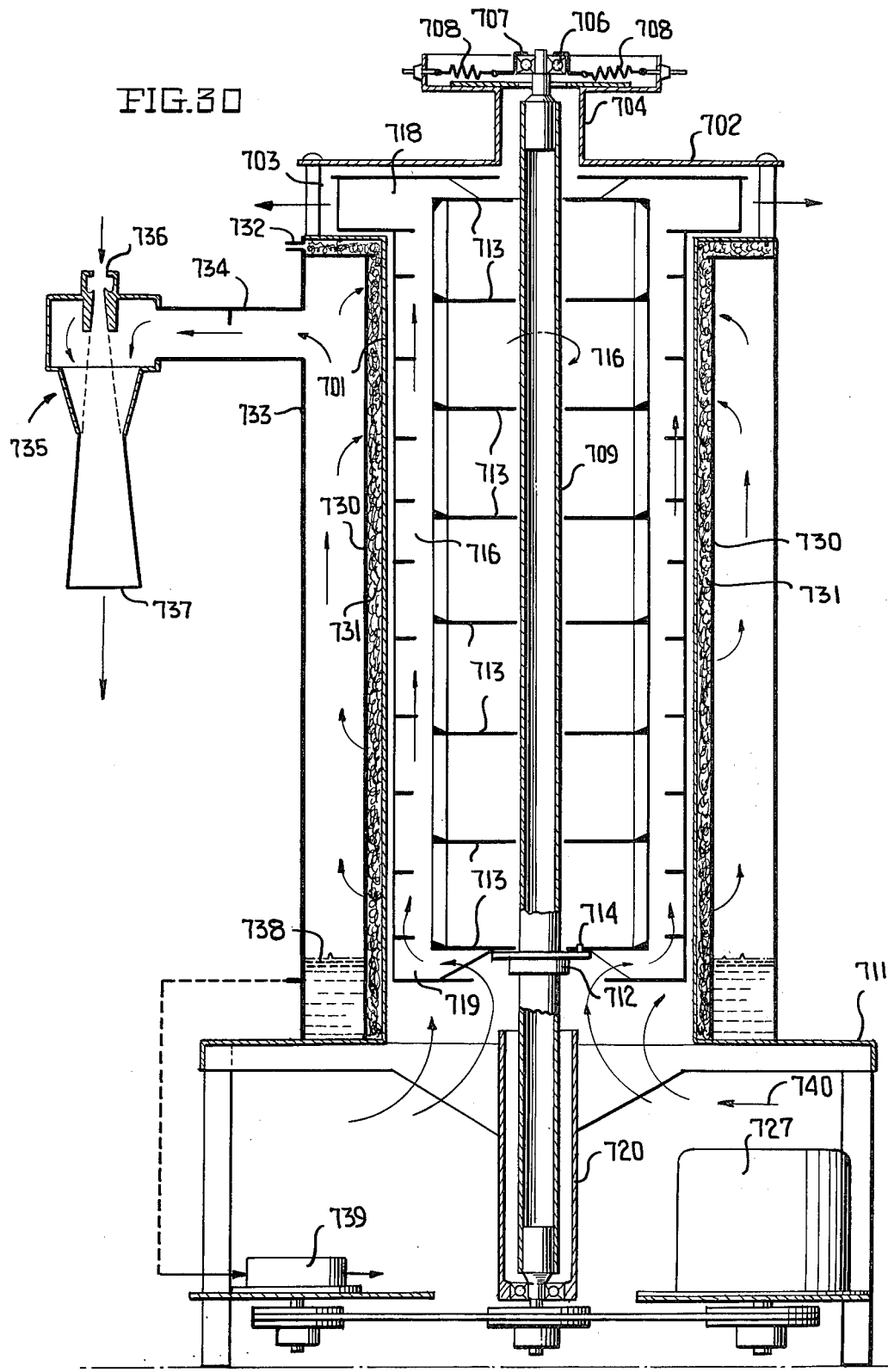

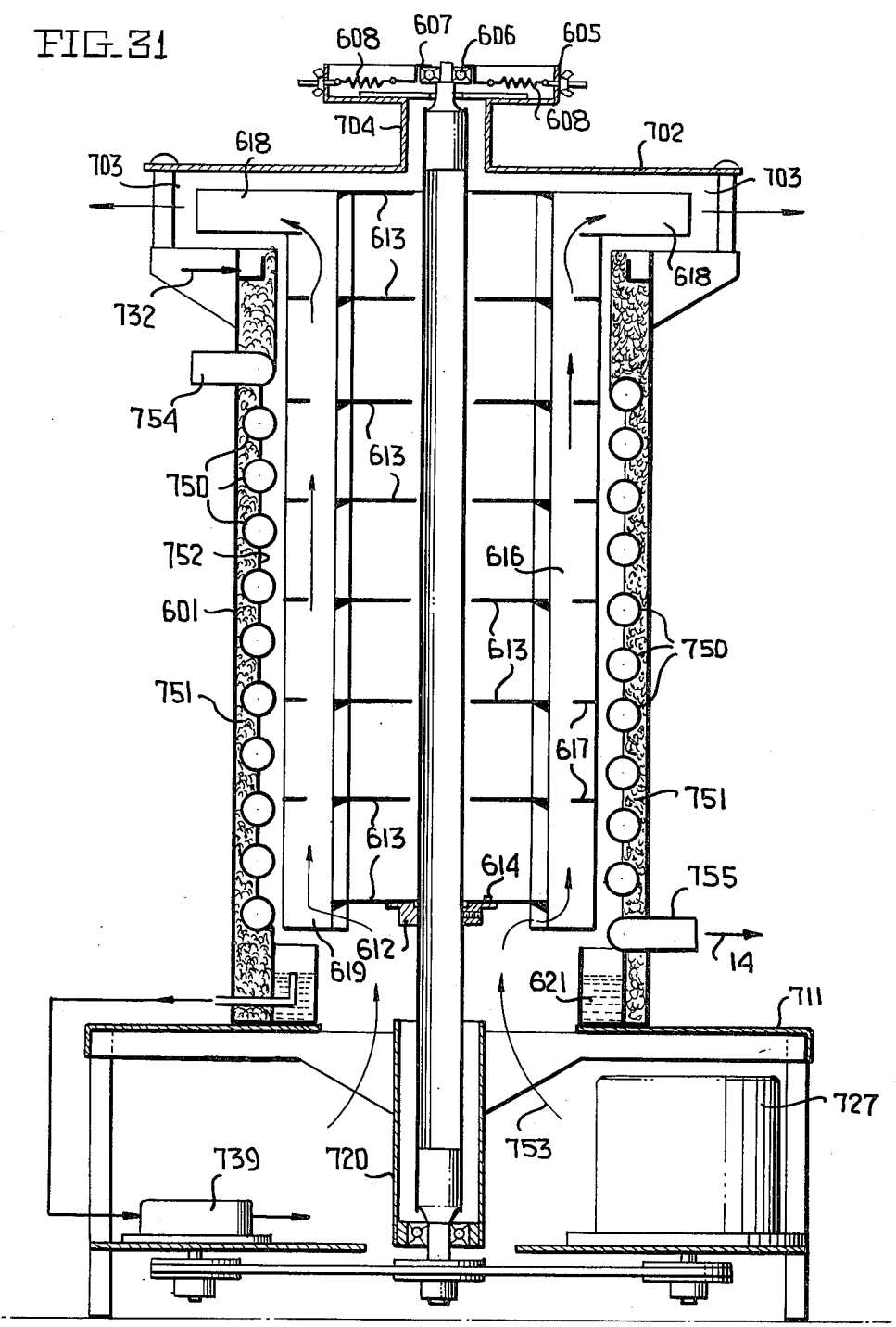

PROCESS AND APPARATUS UTILIZING COMMON STRUCTURE FOR COMBUSTION, GAS FIXATION, OR WASTE HEAT RECOVERY

BACKGROUND OF THE INVENTION

The present invention relates to a method and apparatus for stirring fluids and undergoing combustion and fluid undergoing convective heat transfer with rotational energy.

Prior art burner systems rely upon the momentum of the injected combustion air to produce a turbulating effect in the combustion volume. Since the mechanical efficiency of momentum exchange of the injected combustion air and surrounding combustion gases is low, the effective turbulation of conventional combustion systems is minimal. Such turbulation is also dependent upon the combustion air flow rate into the system and on the pressure differential which exists across the entire heating system.

An object of the present invention is to provide energetic stirring and mixing within a combustion volume, completely independent of the combustion air flow rate and the pressure drop associated with other flow components of the system.

The present invention also relates to improving energy recovery in existing heating and gas recovery systems and to improved recovery of the major share of the sensible and latent heat energy in the combustion products in a burner-heat exchanger for carbonaceous fuels. Prior art boilers, furnaces and water heaters which are used in residential and commercial heating installations with the available liquid, solid, and gaseous fuels tend to be thermodynamically inefficient for many reasons. Under optimum steady state operating conditions, it is necessary for these heating systems to reject at least 15% of the fuel energy in discharging combustion products as sensible and latent heat. Since it is not economic to fabricate these heating systems from corrosion-resistant materials of construction, it is imperative that the temperature level of the discharging fuel gases remain above the dew point of the condensible portion of the discharge; in other words, condensation of flue products within existing heat exchanger systems must be avoided in order to minimize corrosion problems.

An object of the present invention is to provide an economizer of simplified construction which may be economically fabricated from corrosion-resistant materials and which is readily adapted to existing heating systems to permit recovery of the energy which is normally rejected as sensible energy and latent heat energy in the discharging flue products. A further object of the present invention is to provide an economizer which enables existing heating systems to operate in a conventional manner, discharging flue products at elevated temperatures necessary to avoid condensation but wherein the energy in the discharged products is recovered to achieve high thermodynamic efficiency.

Prior art combustion and heat exchanger flue systems have widely varying flow characteristics which result in resonant coupling or instability in operation. Another object of the present invention is to provide a dynamic flue system which is completely stable and obviates existing flue difficulties.

Prior art heating systems require the use of "draft-diverter" components which interconnect the heating systems with conventional flue systems. Under adverse draft conditions resulting in unstable operation of the heating systems, it is well known that toxic gases may be emitted into living quarters through the draft diverter components. A further object of the present invention is to provide positive venting means for flue products to allow safe operation of existing heating systems under all conditions.

It is well known that very compact and efficient gas generator systems can be devised in which direct contact heat transfer occurs between combustion products and injected water. However, these systems have not found commercial acceptance due to corrosion problems and difficulty in recovering heat from the humid combustion products. Still another object of the present invention is to allow the use of simplified gas generating systems which provide direct contact heat transfer.

Another object of the present invention is to provide induction means for combustion air whereby gases are discharged from the system after they have undergone complete heat transfer and after the condensible portion of the flue products is removed, thereby substantially reducing the accessory power requirements of such a system.

Prior art heating systems, particularly the so-called "higher performance" systems, are plagued by the difficulty of matching the combustion device with conventional heat exchangers. This difficulty has prevented convenient retrofitting of heating systems in the field to accommodate improved combustion components. Another object of the present invention is to provide a high performance retrofit capability for all existing heating systems which are gas, oil, or solid fuel fired.

Prior art heating systems, particularly those which are fired with liquid fuels and fuel atomizing devices of the conventional nozzle type, have serious difficulty in providing modulated firing rates, particularly at low firing rates when the draft conditions of conventional heating systems are marginal. Another object of the present invention is to provide modulated firing rate capability under extremely low firing rate conditions with means for positive venting of flue products.

An object of the present invention is to provide an economical and efficient automatic draft control system. This system permits a universal interface of the invention, when used to recover waste heat from flue gases, to any existing heating or other combustion device, including those operating in the atmospheric mode. Automatic control means responsive to the deviation between a predetermined parameter and the actual operating condition of that parameter are provided in order to commonly or independently control the rate at which combustion products are discharged by the primary device and induced to the heat exchanger of the invention and control the ratio of fuel to air in the combustion device. In this manner, it is possible to obtain optimum combustion by maintaining a predetermined ratio between air and fuel. This draft control system is operable over a wide range of fixed firing rates or at variable firing rates.

Prior art heating systems are restricted to using fuels having a low sulfur content primarily due to the corrosion problem which is encountered with these fuels. Another object of the present invention is to permit the use of lower grade fuels which generate products normally considered prohibitive for conventional heat exchangers.

It is well known that the temperature of the flame zone is an important consideration from the standpoints of burner control and possible elimination of pollutant emissions. Prior art heating systems have relatively poor regulation of flame temperature due to inadequate convective heat transfer from the combustion zone with the available stirring energy and critical dependence of this stirring energy upon the flow of combustion air. A further object of the present invention is to provide means for positively controlling the flame temperature within the combustion zone to maximize volumetric firing rate and minimize generation of pollutant emissions.

Prior art combustion systems have difficulty, particularly in the combustion of fuels derived from coal, in disposing of the inert and ash content of the fueld residue without clogging the system. A still further object of the present invention is to: (1) remove the generated ash from the combustion products or fixated fuel gases at a temperature which is below the fusion point for the ash content; and (2) eliminate restrictive flow passages where solids may collect and clog.

Prior art combustion systems have difficulty in staging the admission of combustion air within the combustion process in order to optimize the generation and fixation of fuel gases within the primary zone of the burner and completely after-burning these gases in the later stages of the burner. Another object of this invention is to optimize the staging of the oxidation process for a variety of fuels.

Still another object of the present invention is to provide, for a burner, a mechanical stirrer which has self-cooling and self-lubricating features and which is extremely lightweight and dynamically balanced.

Existing combusion systems rely completely upon the momentum exchange from the injected combustion air for mixing of the combustion chamber gases and recirculating of the combustion products for stable operation. Under optimum experimental conditions, the maximum mechanical efficiency of such a "jet-pump" system is less than 7%. In other words, less than 7% of the kinetic energy available in the injected combustion air is available for turbulating the combustion chamber and providing the necessary mixing energy. This is a serious limitation in prior art burner practice, although it is well known that the stability of a combustion process and its volumetric firing rate potential and heat transfer effectiveness are all parameters which are directly proportional to the available mixing energy of the system. It must also be noted that the blower elements and blower housings which are used with conventional oil burners involve substantial diffuser losses and a limited range of stable operation. Conduction of the combustion air to the combustion chamber is also accompanied by total pressure losses, so that the mechanical efficiency of the blower in a conventional oil burner system is always less than 60%. The energy which is actually available for mixing and turbulating the conventional burner system is therefore the product of the air blower and "jet-mix" efficiencies, less than $0.60 \times 0.07$, or 4.2%. It is an object of the present invention to provide a burner which increases the mixing energy available inside the combustion chamber by a factor of ten times that available in conventional burners.

It is a further object of the present invention to provide a basic structure which, with slight modification, can serve as a highly efficient burner, a highly efficient heat exchanger or a highly efficient economizer for use in combination with an existing heating system to improve its efficiency.

For fuels containing sulfur, the formation of sulfuric acid is inherent in a combustion device. A serious disadvantage of prior art combustion devices resides in the use of restricted flow passages where sulfuric acid may collect and cause corrosion. Conventionally, in larger utility boilers, the corroding material is blown out by shutting down the boiler and using steam to clean the passages. An object of the present invention is to minimize corrosion by eliminating constrictive passages and by continuously flowing water and steam through the system as part of the combustion process to clean out the corrosive materials and reduce the amount of corrosive materials which are produced.

SUMMARY OF THE INVENTION

In accordance with one aspect of the present invention there is provided a heat exchanger whereby a gaseous primary fluid is induced into an enclosure wherein it is passed to successive swirling flow stages of discrete temperatures. Each successive pair of stages is established by a plurality of radially-extending blades which are rotatably driven by a plurality of radially-extending blades which are rotatably driven about the longitudinal axis of the enclosure to create complex multi-vortex swirl patterns at the edges of the blades. The gas flow is induced by an exhauster which may be disposed in the enclosure. A secondary fluid is contained at or forced to flow along the periphery of the enclosure, secondary flow being preferably in a direction generally opposite to the first fluid flow, there being at least one wall which separates the two fluids and serves as a heat exchange surface. The swirling primary fluid is forced to impinge against and flow along the heat exchanger surface in each stage, at a velocity dependent upon the rotational speed of the blades, to effect efficient convective heat transfer between the fluids. If there is water vapor in the primary fluid it tends to condense on the heat exchange surface releasing significant latent heat by virtue of the condensation phenomenon. The swirling action spreads the water vapor over the heat exchange surface to promote condensation and efficient heat transfer. Condensate, in turn, is swept by the swirling flow back into the flow where it mixes with, and is vaporized by, the hot gases. The water vapor is then once again hurled against the heat exchange surface where it is distributed and condenses once again. By varying the blade rotation speed, the rate of heat transfer is varied independently of the volumetric flow rate of the primary fluid entering the enclosure.

The heat exchanger as described above can be connected as an economizer for combustion or gas generating process whereby the combustion products of the burner constitute the gaseous primary fluid which, after passing through the economizer, is passed to the flue for exhaust to ambient. The induction of combustion product flow into the economizer by the exhauster establishes the induced flow through the system to eliminate the problems associated with pressure drops in conventional systems and permitting balanced flue operation. The secondary fluid, which contains thermal energy received from the combustion products in the economizer, is recirculated through the heating system to greatly increase its efficiency.

The same basic structure described above for the heat exchanger and economizer may also be used as a primary burner. Under such circumstances fuel and air are admitted at the inlet end of the enclosure to constitute the primary fluid, whereas the secondary fluid provides cooling to permit more efficient burner operation as well as being usable externally for heating purposes. The first swirling stage provides efficient mixing for combustion. The subsequent swirling stages provide efficient heat exchange to eliminate instability in the burner. Importantly, the speed of blade rotation controls this mixing and hence the efficiency of the burner. The burner therefore has six parameters which are independently adjustable but which can be commonly controlled, to control burner operation; these are: blade speed; air inflow rate; fuel inlet rate; water or additive inflow rate; gas product feedback; and condensate or additive feedback. If desired, control of these parameters can be accomplished independently.

In the above-mentioned embodiments, the blades establish discrete temperature zones which correspond to the individual swirling flow stages. The temperature in each zone is substantially constant but the temperature in each succeeding zone decreases. The discrete temperature zones, a opposed to a uniform temperature throughout the enclosure, permit efficient thermal energy transfer to the secondary fluid, particularly when the secondary fluid flows counter-current or opposite to the flow of the primary fluid. In other words, the secondary fluid is increasingly heated as it passes each discrete temperature zone, resulting in a greater overall temperature differential between the two fluids than is possible in isothermal heat exchange systems. Moreover, the swirling stages permit a long residence time of primary fluid in the system, thereby permitting maximum opportunity for extracting thermal energy therefrom.

In a second embodiment, the radially-extending blades are replaced by a squirrel-cage assembly comprising a plurality of radially-extending discs joined at their peripheries by longitudinally-extending blades. In this embodiment, the blades produce a tangential flow pattern which, when superimposed upon the longitudinal flow created by the exhauster, results in a generally helical flow path through the enclosure. In this embodiment a primary fluid which is initially hot is swirled at high velocity and in continuous contact with thermal transfer wall without contacting the rotatable shaft and support structure for the longitudinally-extending blades.

In another aspect of the invention a unique fuel metering valve is provided which allows fuel to be delivered to an atomizer nozzle at high pressure. The valve avoid failure-prone spring biasing and is easily and inexpensively manufactured.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 11 is a side elevation view of a burner constructed in accordance with the present invention;

FIG. 14 is a side view of a flame retention of FIG. 7 modified to achieve a variable firing rate;

FIG. 15 is a bottom view of the flame retention head of FIG. 14;

FIG. 16 is a side view in section of a fuel metering device useful in the system of FIG. 3;

FIG. 17 is an exploded view in perspective of the fuel metering device of FIG. 16;

FIG. 18 is a side elevation view of an economizer in accordance with the present invention;

FIG. 19 is a top view of the economizer of FIG. 12;

FIG. 20 is an exploded view in perspective of the internal moving parts of the economizer of FIG. 18;

FIG. 22 is a side elevation view of another heat exchanger embodiment according to the present invention;

FIG. 23 is a side elevation view of still another heater exchanger embodiment according to the present invention;

FIG. 26 is a functional block diagram of a temperature responsive control for a motor-driven fuel feed arrangement such as illustrated in FIG. 3;

FIG. 27 is a detailed schematic diagram of the arrangement of FIG. 26;

FIG. 28 is a functional block diagram of a flow-responsive control arrangement for a variable firing rate heating system;

FIG. 29 is a side elevation view of another form of the heat exchanger of the present invention;

FIG. 30 is a side elevation view of an embodiment of the present invention employed as an air conditioning system; and FIG.31 is a side elevation view of another form of the heat exchanger of the present invention.

DESCRIPTION OF PREFERRED EMBODIMENTS

Figure 1:
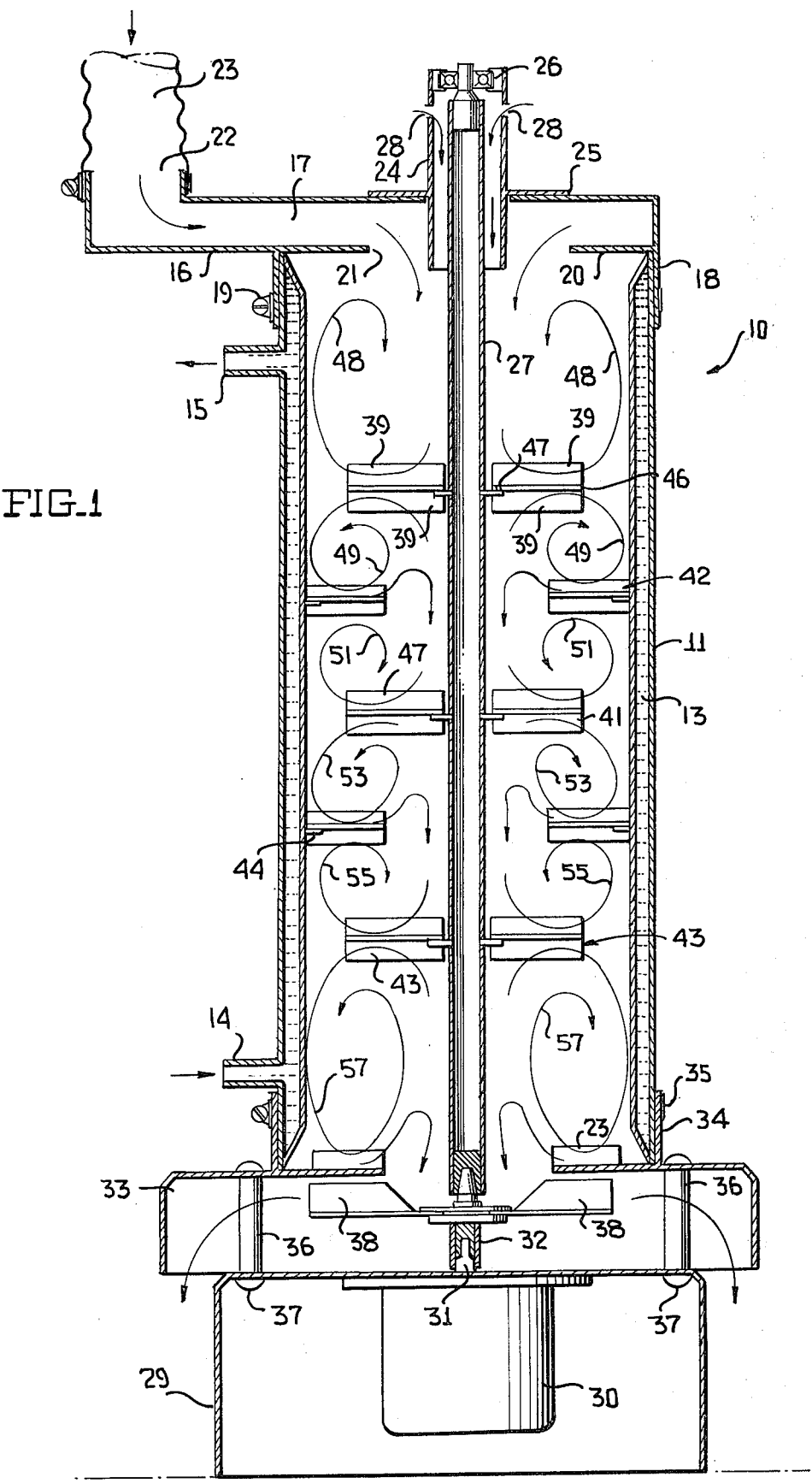
FIG. 1 is a side elevation view of a heat exchanger constructed in accordance with the present invention.

Referring specifically to FIG. 1 of the accompanying drawings, a heat exchanger assembly 10 includes a hollow, generally cylindrical member 11 which is open at both ends and has its control longitudinal axis vertically oriented. The horizontal cross-section of member 11 need not be circular for purposes of the present invention; rather it may take any form consistent with the operational features described herein. Further, member 11 need not be vertically oriented in this heat exchanger embodiment of the invention. An interior cylindrical wall 12 is disposed concentrically within member 11 and defines with member 11 an annular sleeve-like flow path 13. Flow path 13 has a fluid inlet opening 14 proximate the bottom of member 11 and a fluid outlet opening 15 located proximate the top of that member. Flow path 13 may alternatively take the form of a helical coil such as that described below in relation to FIG. 22.

A cap member 16 is seated atop member 11 and includes an internal plenum 17. Cap member 16 further includes an annular portion 18 which fits concentrically around the top portion of member 11 and is secured thereto by means of a band clamp 19. An annular wall 20 of cap member 16 projects radially inward from the upper edge of member 11 and serves as a baffle defining an interior opening 21 through which fluid may flow into the interior of member 11. Plenum 17 subsists above baffle wall 20 and is otherwise enclosed except for a fluid inlet 22. Inlet 22 is adapted to be connected to a fluid conduit 23 which serves as a fluid supply passage for plenum 17. Preferably, although not necessarily, inlet 22 is arranged to issue inflowing gases tangentially into plenum 17.

A hollow cylindrical sleeve 24 extends through a suitably provided opening in the top of cap 16 beyond baffle wall 20 and into the interior of member 11. A flange portion extends radially from sleeve 24 to permit the sleeve to be mounted at the top of cap 16. A support bearing 26 for a shaft 27 is provided inside sleeve 24. A plurality of openings 28 are provided through sleeve 24 to serve as bleed inlets for cooling air. The sleeve itself serves as a heat shield for the upper portion of shaft 27 which would otherwise be directly exposed to the hot fluid in plenum 17. The cooling air which enters through bleed openings 28 provides thermal isolation for support bearing 26. The sleeve also directs the air downward to cool the shaft 27.

A support member 29 for assembly 10 is disposed beneath the assembly and houses a drive motor 30 for shaft 27. Specifically drive motor 30 is mounted on the underside of the top wall of support member 29. The motor drive shaft 31 through the support top wall where it is engaged by a drive bushing 32 which is locked and keyed to drive shaft 31. The drive bushing 32 and its point of engagement with shaft 27 are located in a flow deflector housing 33 disposed between support member 29 and the bottom end of member 11. Housing 33 includes an annular wall 34 projecting upwardly from its top wall so as to receive the bottom end of member 11. A band clamp 35 secures the wall 34 about member 11. Three or more vertically-extending spacer elements 36 help support the weight of member 11 and also provide threaded engagement for screws 37 which secure the support member 29 to housing 33. Deflector housing 33 has a larger diameter than support member on which it rests and has an open underside to permit air in the housing to vent to ambient.

An exhauster element, in the form of a plurality of blades 38 emanating radially from bushing 32, is located in housing 33. Normally there are eight such blades although any number may be employed. The blades rotate about the longitudinal axis of shaft 27 as the shaft is rotatably driven by motor 30. The function of the exhauster is to exhaust fluid from within member 11 and out through housing 33, thereby inducing gaseous inflow through inlet 22 and establishing a flow through the entire system.

Within member 11 there are additional sets of blades at different heights. Specifically, a first plurality of impeller or stirring blades 39 extend radially from shaft 27 and constitute the upper most set of blades. Similar sets of blades 41 and 43 are located at successively lower levels in member 11 and also are secured to and extend radially from shaft 27. The blades, 39, 41 and 43 are show flat with no pitch; however, this is a matter of choice. If the blades are pitched they tend to produce greater mixing than flat blades; however, flat blades exhibit greater structural strength. In the embodiment shown, blades 39 are secured to a thin annular disc 46, preferably made of stainless steel, which slide-fits over shaft 27. The blades 39 are welded edgewise at, for example, four locations, on the top and bottom of the disc in juxtaposition so that a total of sixteen blades 39 are used (i.e. eight on top and eight on bottom of the disc). The resulting disc and blades assembly is anchored to the shaft 27 by means of pins or screws 47 or the like. Similar disc and blade assemblies are provided for blade sets 41 and 43.

Annular stator baffle plate 42 is secured to wall 12 and has an interior opening with a radius which is smaller than that of blades 39, 41 43, but substantially greater then that of shaft 27. Baffle plate 42 is disposed at a level in member 11 which is substantially mid-way between blades 39 and blades 41. A smilar baffle plate 44 is disposed substantially mid-way between blades 41 and 43. The functions of baffle plates 42, 44 are to: accentuate re-circulation (which is established by the blades 39, 41 and 43 in a manner described below); assist in establishing discrete temperature zones to maximize the temperature differential between fluid inside member 11 and fluid in flow path 13; and aids the condensation and collection effects described below. Although the baffle plates 42 and 44 do optimize operation, they are by no means required for the present operation since many of the improvements described herein are achieved when these plates are not present.

In operation, when drive motor 30 is turned on and shaft 27 is operating, exhauster blades 38 and impeller blades 39, 41, 43 rotate likewise. The exhauster blades 38 induce flow of fluid undergoing heat exchange in through conduit 23, inlet 22, plenum 17 into the top of member 11. At this point the effect of impeller blades 39 take over to create discrete swirling flow stages 48 and 49, respectively, above and below blades 39. These stages 48, 49 are shown simplistically as simple vortices for purposes of clarity; however, in actual fact, the blades establish a rather complex flow pattern. More specifically, there are at least three distinct flow components which make up the resultant flow pattern in each of stages 48, 49. There are: (1) a swirl component flowing circumferentially along wall 12 resulting, in effect, from the fluid pumping by each blade in its plane and in its direction of rotation; (2) vortex recirculation of the fluid along wall 12, above and below the plane of the blades, and then radially inward to the rotating shaft in a plane which is at right angle to the plane of the blades; and (3) vortex recirculation of the fluid from the tips of the rotating blades radially inward to an inner radius of the blades and in their plane of rotation. Component (2) above is of itself complex because of the varying static pressure gradients which are established along the radius of the rotating blades and the differential static pressure gradient established across the system by the rotating exhaust component 38. The combination of these flow components result in a vigorous swirling and mixing in each stage with a net flow along the lines 48 amd 49.

Similar phenomena occur as a result of rotation of blades 41, 43. Thus, blades 41 establish flow stage 51 above and flow stage 53 below the blades. Blades 43 establish flow stage 55 above and flow stage 57 below those blades. Baffle plate 42 marks the transition between stages 49 and 51; likewise baffle plate 44 makes the transition between stages 53 and 55. These stages would subsist without the baffle plates; however, I have found that the baffle plates aid significantly in establishing discrete temperature differences between the adjacent stages. Fluid transfer between stages is effected at the stage interfaces. In the absence of the baffle plates the interchange is much greater. The desired recirculation and mixing of fluid in each stage can be controlled by appropriately sizing the blades and baffle plates. Nevertheless, the exhausting effecting of blades 38 assures a net flow through the unit from stage to stage.

Heat transfer is effected through wall 12. It will readily be seen from the foregoing description that the heat exchanger of FIG. 1 is extremely efficient in that it continuously forces the fluid in the various flow zones along wall 12. Specifically, swirl component (1) described above subsists in the plane of the blades and flows tangentially along wall 12. Component (2), made up of recirculating fluid vortices, creates the net longitudinal flow along wall 12 and establishes a uniform temperature of the fluid recirculating in each stage. In the presence of any temperature gradient between this recirculating fluid and the fluid in path 13, an efficient convective heat exchange between these fluids is established. If the fluid entering member 11 has significant water vapor content, the heat exchange efficiency is further enhanced. There is significant water vapor in combustion by-product gases. If such gases are introduced into member 11 the water vapor condenses, in each stage, when it is swirled against wall 12. Upon condensing the water vapor relinquishes considerable latent heat, much of which is transferred to the fluid in flow path 13. Importantly, however, the swirling flow recirculates and tends to sweep the condensate from wall 12 back toward the shaft 27 where it is evaporated again by the hot gases. This water vapor is once again swirled against wall 12 where it condenses and gives up latent heat and repeats the cycle. The same water can thus be repeatedly evaporated and condensed in each stage or zone. Of course, any fluid capable of condensing and evaporating at the temperatures present in the system will serve similarly. In successive stages the gaseous products passing through member 11 are rapidly reduced in temperature by the continued condensation-evaporation-condensation cycle accompanied by the release of latent heat at wall 12. By effecting this cycle multiple times in each stage and by having plural discrete temperature stages, substantially maximum heat transfer from the fluid in member 11 is achived.

From the above it will be appreciated that as the rotational speed of the blades 39, 41, 43 increases, the number of times, and relative velocity with which, a given molecule experiences the condensation-evaporization cycle in each stage increases. The result is a higher temperature differential across wall 12 in each stage for higher blade speeds of rotation. To this end, drive motor 30 is preferably a variable speed motor.

It should also be noted that a single plural-blade element establishes two stages; one above the blade and one below the blade. Therefore, a single, lightweight rotary structure results in an efficient heat transfer mechanism.

The preferred flow direction for the heat fluid in flow path 13 is counter to the net flow fluid through member 11. Therefore opening 14 is preferably an inlet into which fluid is pumped or otherwise caused to flow and opening 15 is preferably an outlet. Counter-flow permits a much greater temperature differential and heat exchange to be created across wall 12 than is the case when flow in both paths are in the same direction.

Figure 2:
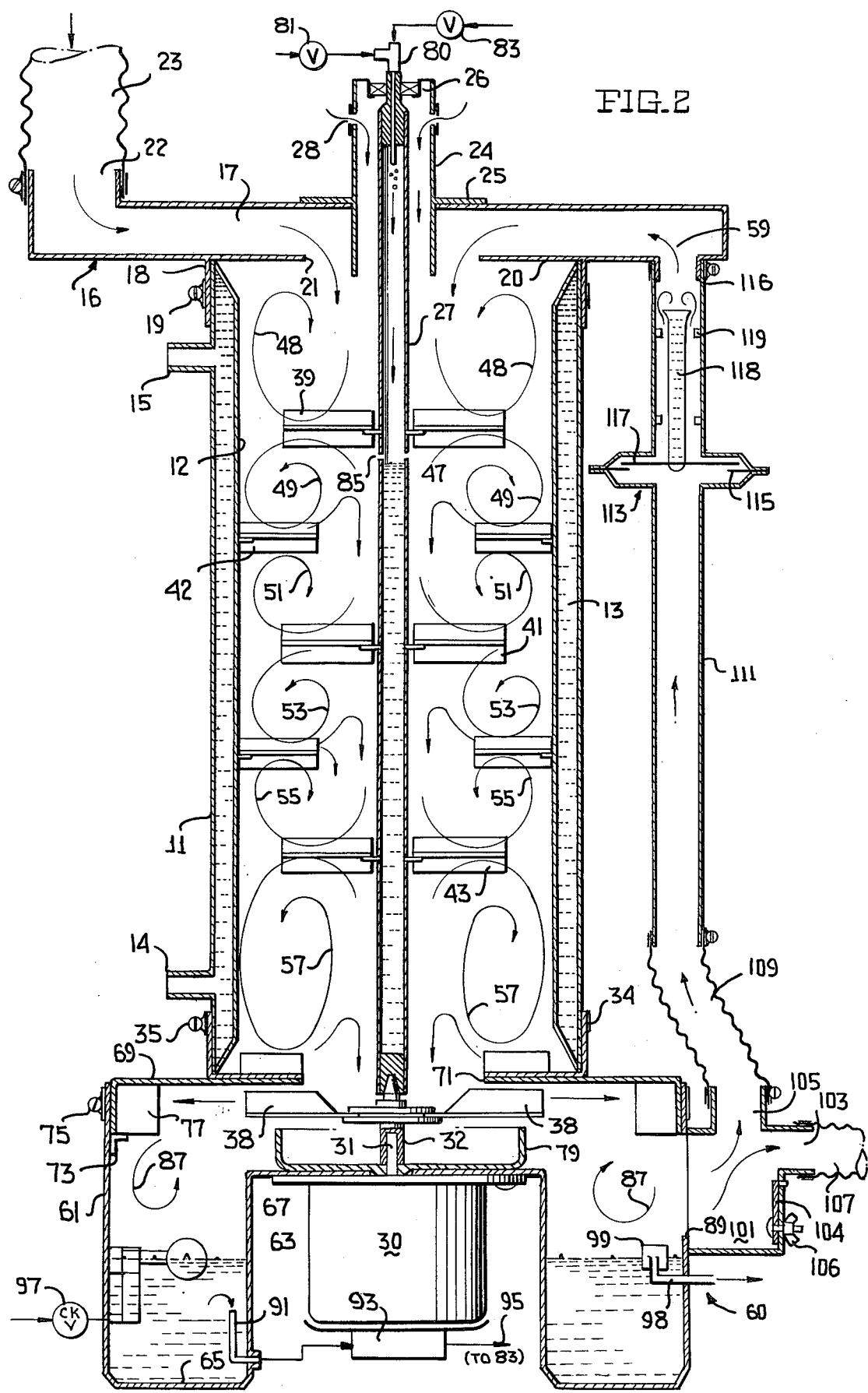
FIG. 2 is a side elevation view of another heat exchanger embodiment constructed in accordance with the present invention.

A modified embodiment of the heat exchanger is illustrated in FIG. 2 wherein components bear the same reference numerals as their counterparts in FIG. 1. The differences in the embodiment of FIG. 2 are described in the following paragraphs.

The base of the unit of FIG. 2 includes a bottom member 60 having an outer vertically-extending cylindrical wall 61 concentrically disposed about an inner cylindrical wall 63, the two walls being joined together at their bottom edges by annular wall 65. Inner wall 63 is shorter than outer wall 61 and is sealed at its top by a generally circular wall 67. Inner wall 63 and wall 67 define a cylindrical space in which the drive motor 30 is disposed and mounted on the underside of wall 67 which is suitably apertured to permit drive shaft 31 to extend upwardly therethrough into drive bushing 32. A lower support baffle plate 69 is in the form of a generally circular disc which is centrally apertured at 71 and which has a downwardly depending annular portion at its outer edges. This annular portion fits in concentrically abutting relationship inside wall 61 and is supported therein by means of a plurality of circumferentially spaced support gussets 73 spot welded to the inner surface of wall 61. A clamping ring 75 is secured about the outside of wall 61 to provide circumferential pressure to urge wall 61 against the depending portion of plate 69. An annular section 77 of fibrous material, such as fiberglass, or the like, is secured to the inner surface of the depending portion of plate 69. The exhauster, including blades 38, is disposed in the volume between wall 67 and plate 69, just above an annular deflector 79 for the motor mount.

In the embodiment of FIG. 2 the shaft 27 is hollow and is adapted to receive liquid heat transfer additives and water or recirculated condensate. To this end a fluid passage member 80 is secured to the top of the shaft and is arranged to conduit fluid into the shaft interior from either of two inlets. One inlet, controlled by valve 81, provides for initial injection of the liquid additives. After initial injection, valve 81 is closed and the additives are automatically re-circulated with water via the second inlet, controlled by valve 83.

At one or more locations along the length of shaft 27 there are provided plural outlet openings 85 which permit liquid from within the shaft to spray radially outward into enclosure. Preferably these locations are below the first flow stage 48. The effect of the injected liquid is described in greater detail hereinbelow.

The annular volume between walls 61 and 63 of member 60 serves as a reservoir for the liquid condensate from inside member 11. Specifically, condensed liquid (and gas) is discharged from within member 11 by exhauster 38. The condensate, upon hitting fibrous section 77 is separated from the gases and drops into the annular reservoir. The gases, on the other hand, are uniformly diffused at 87 and flow out through a side opening 89 in wall 61. A delivery tube 91 is disposed in the reservoir and supplies liquid therefrom to the inlet of a transfer pump 93 which is driven by drive motor 30. Pump 93 may be, for example, a low-head impeller-type pump. The outlet 95 of pump 93 is connected to valve 83 to recirculate the condensate. A check valve 97 is provided through which "make up" water ma be added to the reservoir if needed. Generally, considerable water is present in th form of water vapor in the gaseous inflow into inlet 22, and such water vapor condenses and provides sufficient water for the system's needs. Nevertheless, for those instances where the water vapor content is insufficient, or where evaporation reduces the water level below that which is desired, additional water may be added via valve 97. An overflow arrangement, including tube 98 and vented cup 99, is provided to prevent liquid in the reservoir from overflowing through opening 89. Specifically, tube 98 is L-shaped and includes a horizontally-extending portion which is supported by and extends out through wall 61. A vertically-extending portion of tube 98 extends upwardly to the desired overflow level. This vertically-extending portion extends through the bottom of vented cup 99 which has its rim at a higher level than the top of the tube but lower than the opening 89 in wall 61. The purpose of cup 99 is to prevent overflow of the heat additives. The additives are generally of a lower specific gravity than water and form a film on the surface of the liquid in the reservoir. The vented cup 99 acts as a shroud to provide preferential drainage of condensate from beneath the film. The capacity of transfer pump 93 is selected to be greater than the rate of condensate generation, during operation the additive and condensate are recirculated together as an emulsion for distribution through openings 85 in shaft 27. During shutdown or other times of possible condensate overflow, the vented cup 99 preserves the additive and permits primarily water to be discharged through overflow tube 98.

The operation of the heat exchanger assembly of FIG. 2 is similar to that of the FIG. 1 assembly. However, as noted, there are three main differences. In the FIG. 2 assembly; heat transfer additives (typically, oil) are injected into the primary fluid; the additives and any liquid condensate is recirculated; and exhaust gases are controllably recirculated. The function of the additive injection is to promote more efficient heat transfer by means of dropwise condensation. It is well known that if a heat exchange surface is coated with a film of oil on top of a film of water, or with a film comprising a mixture of film and water, heat exchange across the surface is more efficient. The oil and water are injected via openings 85 in shaft 27 for just this purpose. The high velocity stirring action produced by the impeller blades intimately mixes the oil and water in each flow stage. The mixture is swept along wall 12, along with the gases in each stage, where it produces the requisite film. The additional water, of course, serves as in the FIG. 1 embodiment to alternately condense and vaporize, giving off its latent heat during the condensation portion of the cycle to improve the heat transfer characteristic of the system. This, of course, relates to the importance of recirculating the water which eventually falls into the reservoir at the bottom of the unit.

Gases outflowing through opening 89 in wall 61 enter a small plenum 101 having two egress openings 103 and 105. Outlet 103 is connected to a conduit 107 through which the gases are discharged from the heat exchanger. This discharge may be exhausted to ambient, fed to another unit, or partially recirculated to the source of the gases supplied at inlet 22. Outlet 105 is connected to a flexible conduit 109 which in turn feeds an interconnecting conduit 111 as part of a feedback path for the heat exchanger. A disc-shaped damper 104 is provided with appropriate metering openings and is rotatable to selectively restrict flow through discharge outlet 103. In this manner the egressing gases can be proportioned between the discharge outlet 103 and feedback outlet 105 as desired. A locking arrangement 106, in the form of a wing nut engaging a screw extending from damper disc 104, permits the disc to be locked in the desired position.

Figure 5:
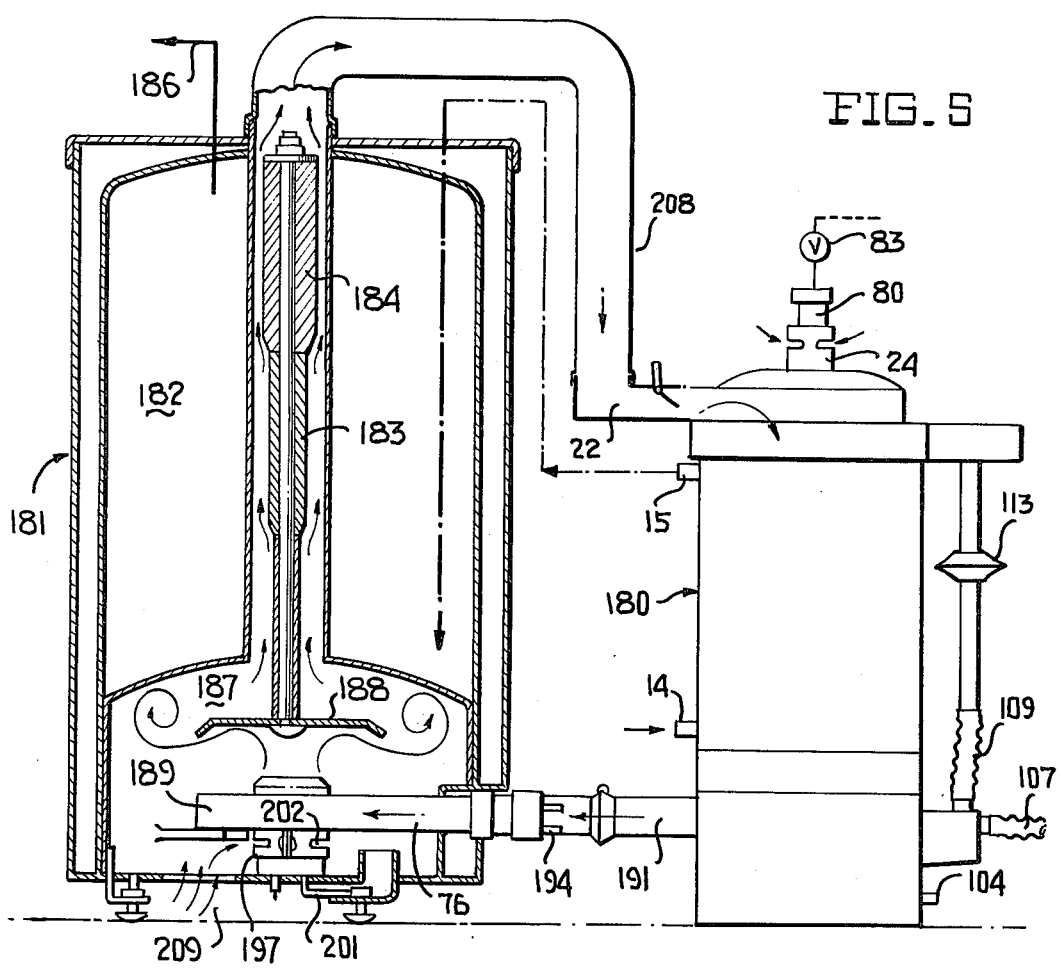
FIG. 5 is a partially schematic side elevation view showing the heat exchanger of FIG. 2 employed as an economizer connected to a blue-flame oil burner operating at atmospheric pressure.
Figure 25:
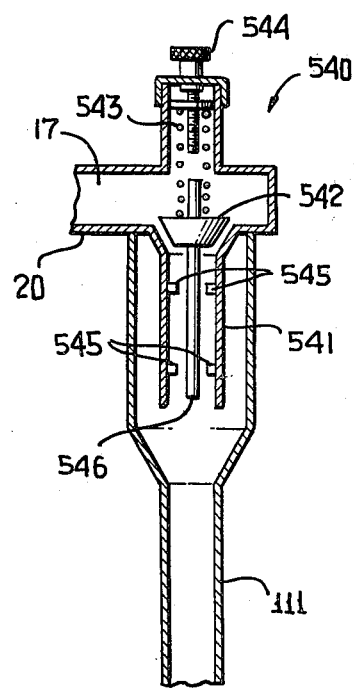
FIG. 25 is a modified version of the feedback gas controller employed with the heat exchanger of FIG. 2.

Conduit 111 conducts feedback gases received from feedback inlet 105 back ianto plenum 17. A feedback controller 113 is disposed in conduit 111 and includes an annular plate 115, supported at its periphery, on which rests a disc 117 of greater diameter than the opening in plate 115. An elongagted weight bias member 118 is secured at one end to disc 117 and extends upwardly therefrom into conduit 111. A plurality of centering studs 119 extend radially from bias member 118 to maintain that member substantially centered in conduit 111. The action of the exhauster blades creates a push-pull differential pressure effect across disc 117 to raise that disc against the weight of bias member 119. As disc 117 is raised, more and more feedback flow is permitted into plenum 17. This arrangement maintains a constant rate of mass thoughput and eleminates pressure variations. It is used with fixed rate firing operation but can be used with variable firing rate operation provided that the feedback controller of FIG. 25 is substituted and the inflows of fuel and air are separately controlled. This arrangement is especially useful when the burner to which the economizer is connected, or an integral burner-heat exchanger of the type shown in FIG. 5, is a blue flame oil burner. Reliable operation in that regime requires that a constant rate of feedback of combustion by-products, comprising a predetermined percentage of total throughput, be maintained. In this embodiment, the use of feedback controller 113 substantially eliminates variations in the rate of combustion by-product feedback flow as are caused by transient pressure surges. Likewise, this arrangement is particularly useful in a burner/economizer or integral burner/heat exchanger configuration of the disclosed system operating at atmospheric pressure.

The arrangement is contained entirely within the conduit 111 and is therefore relatively tamper-proof. However, it is to be understood that if adjustablility is desired for finer control, it is possible that bias control may be achieved by conventional adjustable springs or diaphragm elements which respond to fluid pressure. An example of this is described hereinbelow in relation to FIG. 25. The top of bias member 118 is widened to serve a secondary bleed baffle 116 which limits the response rate of the feedback controller during erratic pressure perturbation.

Water is not injected into first flow stage 48 in order that the temperature differential produced for heat exchange at this stage can be maximized. In the latter stages the temperature differential between the fluid in enclosure 11 and the fluid in flow path 13 is less than in stage 48. As this diferential becomes less, more and more water can be injected into those lower stages where it improves the rate of heat transfer. Although shown only at stage 49, it is clear that outlets 85 to inject water and additive may be located at any or all lower stages.

Since the flow of egressing gases can be proportioned between the discharge outlet 103 and feedback outlet 105 means are provided for adjusting and accurately regulating the flow at inlet 22 which is induced through conduit 23 from a remote or closely coupled source. When the source is combustion device, or the like, requiring accurate regulation of is draft conditions for optimum performance, the present invention provides means for maintaining these conditions. Although the fed back gases 59 are disclosed entering the plenum volume 17 with the induced gases 22, it is not essential that the fedback gases enter at this location. The adjustment and regulation of induced fluid flow 22 may be accomplished when the insertion of the recirculated gases occurs at any point in the fluid flow upstream from the exhauster component 38.

It should also be noted that the flow of secondary fluid through flow path 13 may be required for a variety of purposes. One such purpose would be to assure that the temperature at the wall 12 is sufficiently low to permit the water vapor to condense thereon and transfer its latent heat during condensation. This raises the point that it is necessary for the temperature in each zone to vary from below the dew point of water at wall 12 to above the vaporization point at the interior near shaft 27. Depending upon dimensional consideration and the particular fluids involved, this is readily achieved by controlling the speed of motor 30 (i.e. the speed of blades 39, 41, 43), the rate of feedback gas flow via damper 104, and the flow rate of the secondary fluid in path 13.

In the latter stages of heat transfer, the injected water is advantageous, not only for heat transfer efficiency, but also because it tends to provide a scrubbing effect on the fluid and wall 12. If the gaseous inflow at inlet 22 constitutes the combustion products of a so-called dirty fuel, this scrubbing action washes down any soot or corrosive by-products.

It should be noted that a single set of rotor blades may be employed to effect stirring, establish two stages, and set up an exhaust flow. There is greater operational efficiency in having separate exhauster blades 38; nevertheless, for certain applications the initial cost advantages of a single set of blades may outweigh other considerations. If a single set of blades is employed for that purpose, the blades should be appropriately pitched to effect a net flow component in the exhausting direction.

Figure 3:
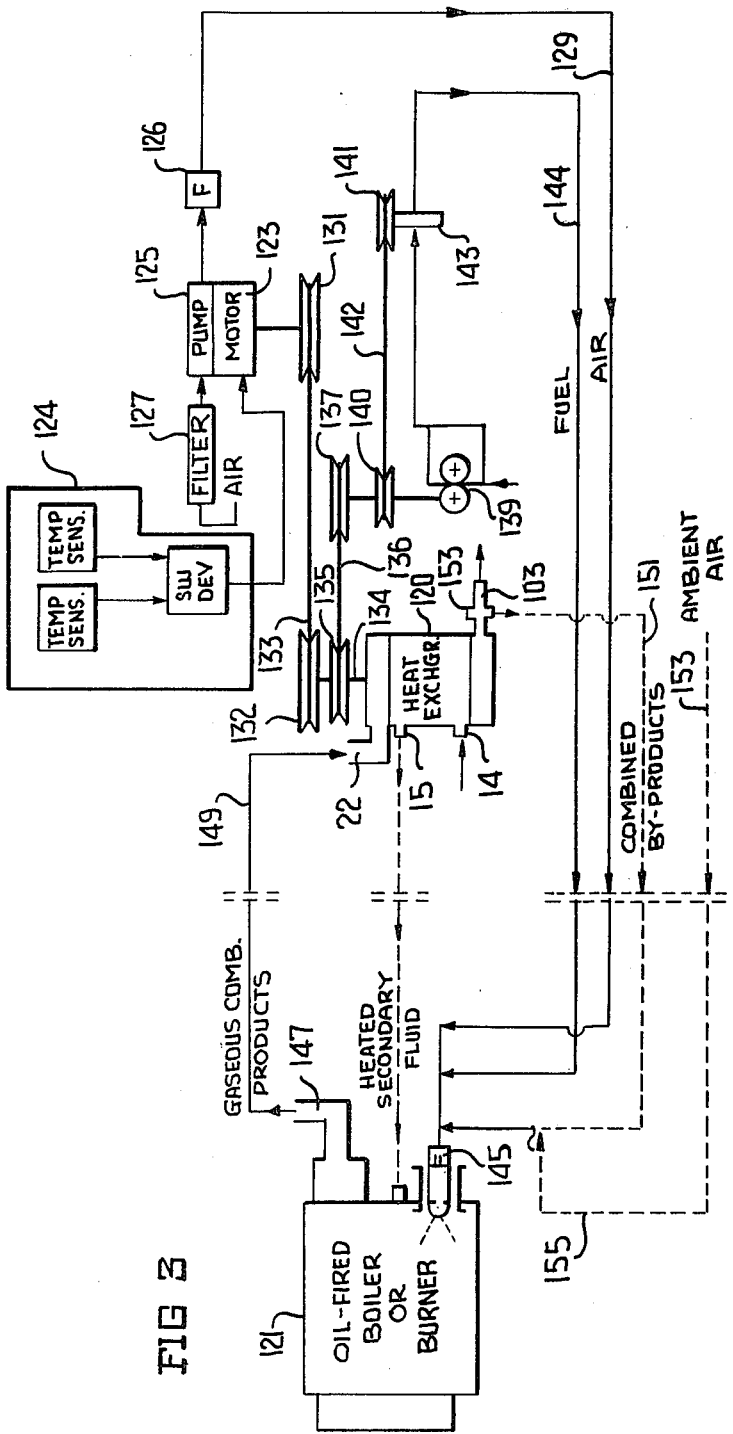
FIG. 3 is a schematic diagram showing the heat exchanger of FIGS. 1 or 2 employed as an economizer for a conventional burner.

Referring to FIG. 3 of the accompanying drawings, a heat exchanger 120 according to the present invention is employed in conjunction with a conventional oil-fired boiler 121 to achieve waste heat recovery from flue gases and improve overall boiler performance. A drive motor 123 drives air pump 125 which receives ambient air through air filter 127 and delivers the filtered air to the system via conduit 129. An additional filter 126 may be provided at the outlet of pump 125 to filter out carbon particles. Pump 125 is directly driven from motor 123 and may, for example, be a conventional vane-type air pump. Motor 123 is controlled for on and off operation by a conventional thermostat 124 which senses the temperature in the space being heated and the outside temperature.

Drive motor 123 also directly drives a pulley 131 which is part of a belt-drive arrangement. Specifically, pulley 131 drives a larger pulley 132 by means of belt 133. Pulley 132 is mounted on the rotatable shaft 134 which corresponds to shaft 27 of FIGS. 1 and 2. Drive motor 123 thus drives shaft 134 via the belt-driven arrangement including pulleys 131 and 132 and belt 133. A speed-reduction pulley 135 is disposed on shaft 134 and, via belt 136, drives a further pulley 137. Pulley 137 is disposed on shaft 138 to rotatably drive that shaft and thereby operate fuel pump 139. A speed reduction pulley on shaft 138 drives a further pulley 141 via belt 142. Pulley 141 in turn drives a valve 143 to meter the output of fuel pump 139 and deliver the pumped fuel to fuel line 144. Valve 143 is of the type which provides a metered fuel flow in proportion to its driven speed when operating and which completely blocks fuel flow to line 144 when not operating.

Fuel, via fuel line 144, and atomizing air, via air line 129, are delivered to a conventional air-atomizing igniter 145 at burner 121. Exhausted gaseous combustion products from the burner agress from outlet 147 and are connected via conduit 149 to the inlet 22 of heat exchanger 120. These combustion products serve as the primary fluid for the heat exchanger and are stirred therein in the manner described in relation to FIGS. 1 and 2. Secondary fluid for the heat exchanger is supplied at inlet 14, by means of a pump (not shown) or the like, and is delivered from outlet 15, after receiving the heat recovered from the burner combustion products, back to the boiler 121. The secondary fluid may be recirculated between the boiler and the heat exchanger or may be part of an open flow system. In either case, it is clear that the driving pump for the secondary fluid may be driven by motor 123 via a suitable beltdrive. Such drive is not shown in FIG. 3 to preserve drawing clarity. Because the economizer stabilizes the flow of the product from heating device, this invention makes it possible to operate that device at increased capacity with the same thermal efficiency.

The system of FIG. 3 illustrates how a single motor can drive the air and fuel delivery systems and the heat exchanger. Drive motor 123 is preferably a variable speed motor to permit the ultimate flexibility of operation. Any variable speed drive of the type well known in the art may be used. For example, when the heat exchanger operates as a boiler, it can generate steam; and if it is of the helical type, shown in FIG. 23, it can generate a vapor; and either of these outputs may be used to power a conventional rotary tubine reciprocating engine attached to shaft 27. Such steam or vapor output can be used directly or to compress air or hydraulic fluid which can indirectly power a rotary turbine or reciprocating engine. Likewise, a rotary turbine can be attached to shaft 27 and so driven. All of such means are conventional and well known in the art. When a separate source of power is not employed, auxilliary motor means are required for start-up. Means for manually or automatically controlling the flow of steam or vapor or stored compressed air or hydraulic fluid so as to obtain any desired variable speed are equally well-known in the art. As the motor speed increases the heat transfer capacity of the heat exchanger increases even though the temperature of the combustion products egressing from the burner remain the same. Further, increasing motor speed results in a proportional increase in induced air flow into the burner 121. Specifically, the exhauster in the heat exchanger (elements 38, FIG. 1) exhausts at a greater rate as the motor speed increases resulting in a greater mass throughput flow out the burner at egress 147. Since heat transfer is substantially proportional to the velocity of mass flow, this increases the heat transfer rate. Specifically, the exhauster in the heat exchanger (element 38, FI. 2) exhausts at a greater rate as the motor speed increases, providing the feedback controller (element 113, FIG. 2) is set in a closed position to eliminate by-pass recirculation of gases within the heat exchanger. In this case, an increase in the speed of the drive motor (element 30, FIGS. 1, 2; and element 123, FIG. 3) increases the speed of the air pump 125 to supply greater atomizing air flow to the burner via line 129. Likewise, the fuel delivery from the metering valve 143 is at a rate which is proportional to the rotative speed of the drive motor 123. Motor speed variations in response to the control component 124 allows firing rate modulation of the boiler 121 while its air-fuel ratio is held constant, and the heat which it rejects in its gaseous products are directed to inlet 22 of the heat exchanger 120 and efficiently recovered at a rate which is proportional to the increase firing rate of the boiler 121.

As shown by the dashed lines 151, the combined by-products of combustion, upon egressing from the heat exchanger, may be recirculated back into the burner at igniter/atmoizer 145. Similarly, ambient air, available via dashed line 153, may be combined with the recirculated combustion by-products at combiner 155 before being delivered to burner 121. The controlled recirculation of combustion products under these conditions permits stable operation of the oil-fired boiler 121 in the "blue-flame" regime of combustion, allowing soot-free operation with a minimum amount of excess combustion air and flame generated pollutant emissions (NO).

As described above in relation in FIGS. 1 and 2, the rate of condensation of water vapor in the heat exchanger is also a function of motor speed so that the portion of the total heat transfer rate, due to condensate circulation and stirring action in the heat exchanger, is also increased.

Apart from permitting control of all of the stated parameters with a single drive motor, it should be noted that the system of FIG. 3 has the additional advantage of safety in that no fuel is supplied if any drive element fails. Thus, a drive train failure cannot cause a dangerous accumulation of unburned fuel.

As described hereinbelow in relation to FIG. 11, the basic structure of the heat exchanger 120 may be modified to function as a burner. In such case, the single motor drive arrangement of FIG. 3 may be modified to operate with the modified burner alone, the burner 121 being unnecessary. In such case, fuel line 144 would feed a suitably provided igniter at burner/heat exchanger 120 and the air line 129 would feed inlet 22, conduit 149 being deleted. Combustion by-products carried by line 151 could be combined with input air at inlet 22.

Whether operating as a burner alone or as an economizing heat exchanger for burner 121, heat exchanger/burner 120 provides a balanced flue arrangement by virtue of the continued exhaust draft created by exhauster blades 38 (FIGS. 1 and 2).

It should be noted that the heat exchanger, when operating as an economizer, requires no secondary fluid. Under such circumstances the economizer is used for its capability of providing a controlled draft which permits setting the "economized" heating system to its optimum operating mode. Moreover, the rotary stirrer has the advantage of breaking up standing waves in stirred volume which might otherwise backpressure the combustion gas throughput.

Figure 4:
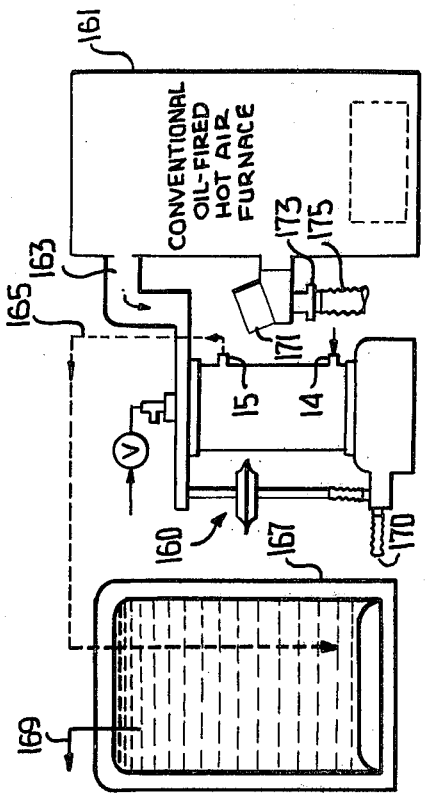
FIG. 4 is a schematic diagram showing the heat exchanger of FIG. 2 employed as a flue gas recovery device.

Referring to FIG. 4, a heat exchanger of the type described in relation to FIG. 2 is shown operating as a waste heat flue gas recovery device for a conventional oil-fired hot air furnace 161. Gaseous combustion products from furnace 161 are delivered to inlet 22 of the heat exchanger via conduit 163 to serve as the primary heat exchanger fluid. The heated secondary fluid provided at heat exchanger outlet 15 is delivered via conduit 165 to a thermal storage tank 167. Storage tank 167, for example, may contain water which in that case would be the secondary fluid. The water may be continuously recirculated between tank 167 and secondary fluid flow path 13 (FIGS. 1, 2) at the heat exchanger. Alternatively, water supplied to inlet 14 of secondary fluid flow path 13 may come from the main water supply. In any case, the heated water is available for use at 169.

A conventional oil burner accessory package 171, including a flame retention head, atomizer and igniter elements is provided at furnace 161. A metering device 173 for induced combustion air feeds the accessory package. The metering device may take the form of an adjustable sharp-edged orifice. This metering device may be eliminated when a fixed-point firing rate of the oil burner is desired and a more exact regulation of the induced combustion air flow is necessary to optimize the oil burner performance. In this case, the by-pass regulator component (element 113, FIG. 2) may be adjusted, as described above, to maintain a constant and optimum flow of flue gases 163 from the furnace 161 and induced flow of combustion air 175.

An air inlet tube 175 conducts air induced into the system by the exhauster action of blades 138 (FIGS. 1, 2) at heat exchanger 160. This corresponds to the balanced flue mode of operation. The air may be induced through a duct extending through a wall of the building in which the system is housed and which is being heated by the system. This avoids the wasteful use of heated air inside the building as combustion air. If acoustical damping is employed it is possible to eliminate the noise which is characteristic of high performance yellow flame oil burners having flame retention heads.

It is clear that the system of FIG. 4 permits recovery of the waste heat from furnace 161 in storage tank 167 which may serve as a hot water supply or merely as a reservoir of thermal energy for use as desired. The heat exchanger 160 operates as an economizer which controls the combustion air flow to the furnace 161 to render it more efficient. The exhauster 38 (FIGS. 1, 2) provides a sufficient pressure differential in the system to permit a reasonable size for inlet tube 175. The combustion air at tube 175 is always available at the same pressure (i.e. atmospheric) as the flue discharge, providing a balanced flue arrangement. The system is therefore insensitive to wind conditions and causes far fewer drafts in the home than is the case with conventional combustion-actuated heating systems which are unable to operate with a balanced flue arrangement. The result is a so-called "tighter" home. Further, the flue product tube 170 can be small relative to the supply tube 163 so that tube 170 can be disposed inside tube 163 if desired.

Referring to FIG. 5 of the accompanying drawing, a heat exchanger 180 of the type described in relation to FIG. 2 is connected as part of an arrangement whereby a conventional gas-fired burner is modified to be oil-fired. Gas-fired burner devices are generally operated at atmospheric pressure with their combustion chambers vented, rendering it difficult to convert such burners to oil-fired devices since the latter generally require pressurized combustion chambers. The conventional water heater 181 is shown in FIG. 5 with its gas-firing head removed and replaced with an oil-fired device. The water tank 182 and conventional center flue 182 remain intact. Center flue 183 also serves as a heat transfer sleeve between the hot gaseous products in the sleeve and the water in tank 182. A longitudinally-extending center insert member 184 is supported at the top of the water heater 181 so as to be suspended within flue 183. Insert member 184 has a plurality of sections of different diameter, the smallest being at the bottom, the largest at top. The insert member serves to restrict flow of the heated combustion gases through flue 183, thereby making heat transfer to the water in tank 182 more efficient. An outlet 186 from the water tank is schematically shown in FIG. 4 and provides heated water for use in the household.

The insert member 184 is suspended entirely through the flue 183 and into the combustion chamber 187 where a generally circular baffle plate 188 is secured to the insert member. Below the baffle plate there is an oil burner retention head which is illustrated in detail in FIG. 6. The retention head includes an annular vortex chamber 189 which tangentially receives a combination of recirculated combustion products from heat exchanger 180 via conduit 191 and induced primary combustion air. The recirculated combustion products from conduit 191 pass through a nozzle 192 into an aspiration region which is terminated at its downstream end by another nozzle 193 of larger diameter. Openings 194 provided in the aspiration region permit ambient air to be aspirated into the region.

Figure 6:
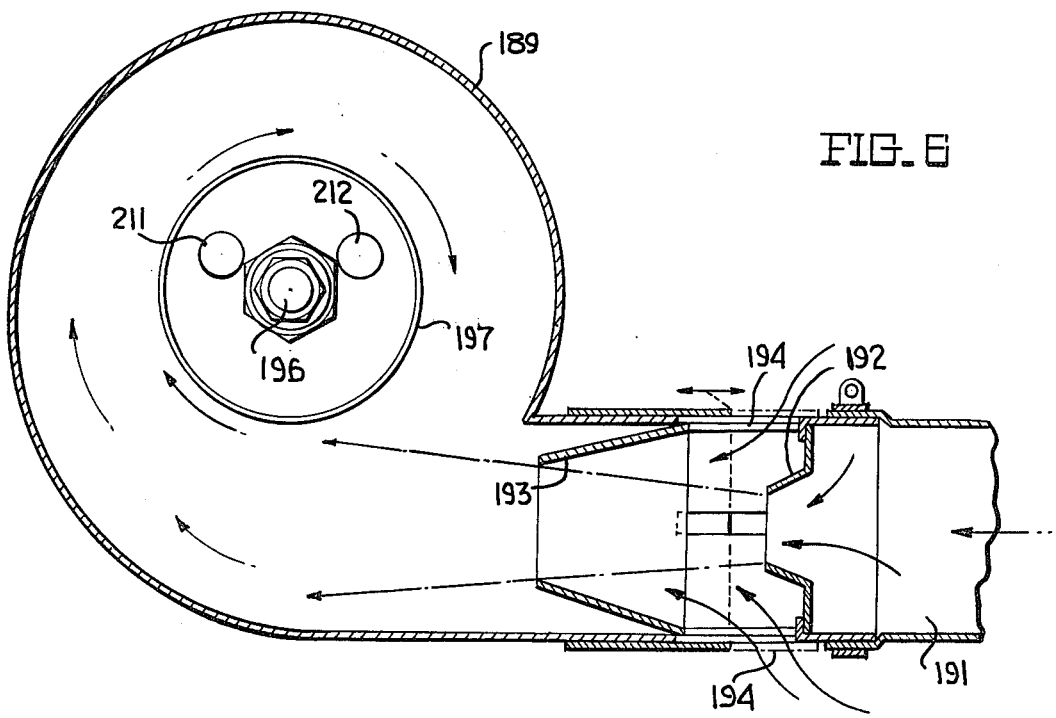
FIG. 6 is a bottom end view of the flame retention head of the oil burner in FIG. 5.
Figure 7:
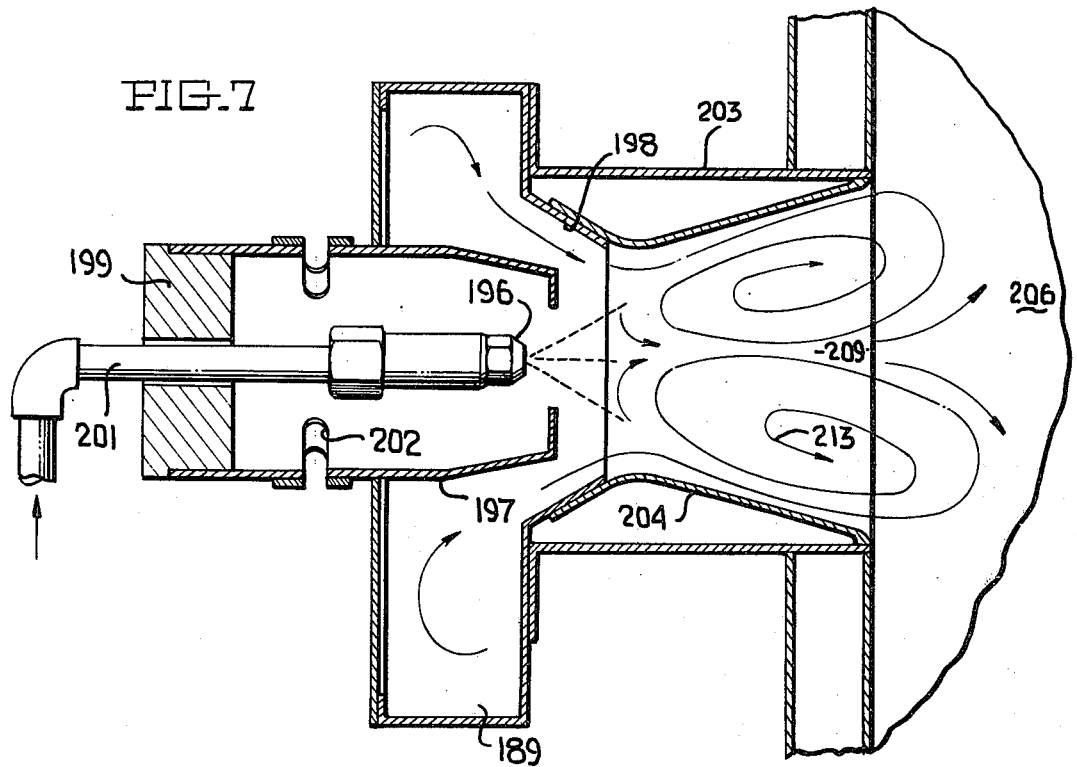
FIG. 7 is a side view of the flame retention head of FIG. 6 when adapted to a heat exchanger which is normally fired with a gun type oil burner.

Centrally of annular chamber 189 there is disposed a conventional fuel atomizer nozzle 196 best seen in FIG. 7. A tubular wall 197 is disposed concentrically within chamber 189. A centrally disposed outlet opening 198 for vortex chamber 189 is conically tapered and tube 197 extends part way into the tapered region. In addition, tube 197 extends out through the other side of chamber 189 through a suitably provided hole in the chamber which is sealed about tube 197. The remote end of tube 197 is plugged with a cylindrical seal member 199 which is suitably apertured to permit passage of fuel supply pipe 201 to feed nozzle 196 and ignition electrodes 211 and 212 (FIG. 6). A number of openings 202 are provided in tube 197 to provide a bleed through which air is permitted to enter tube 197 where it serves as a vacuum break and supplies secondary air into the main combustion stream.

The oil burner configuration and heat exchanger 180 shown in FIGS. 5 and 6 allows operation in the "blue-flame" regime of combustion with a vented or "atmospheric" combustion system when adapted to a heating product which is normally gas-fired. The bypass control component 113 which is incorporated in the heat exchanger 180 (FIG. 5) regulates the flow of combustion products at inlet 22, which products are induced into the heat exchanger 180 at a rate which is optimum for the fixed-point firing rate of the adapted heating unit 181. The regulated flow of gases through the center flue 183 heat exchanger portion of this product allows higher and more efficient convective heat transfer to occur than is possible with conventional "atmospheric" burner systems which rely entirely upon natural convection through this portion for removal of flue products.

In operation, combustion air is introduced into the burner 189 from underneath the water heater structure at 209 and through openings 194 along with the recirculated combustion products from heat exchanger 180. About half of the stoichiometric requirements for air are supplied from each location. Fuel is applied via supply line 201 (FIG. 5) and is atomized by nozzle 196 and ignited by igniter electrodes 211, 212.

The burning gases are deflected by baffle plate 188 to form a flat flame geometry which is generally preferred. Specifically, the baffle deflects the buoyant burning gases into a large projected flame area for effective heat distribution. Combustion gases rise up through the flue 183 where thermal energy in the gases is transferred to water in tank 182. These gases are drawn by the exhauster in heat exchanger 180 (i.e. blades 38 in FIGS. 1, 2) through conduit 208 to the primary fluid inlet 22 of the heat exchanger. Thermal energy in those gases is then transferred to water flowing as the secondary fluid from inlet 14 to outlet 15. The heated water is delivered to water storage tank 182 as make-up water to replace water used from outlet 186. The cooled primary fluid egresses from the heat exchanger via conduit 191 and aspirates a portion of the combustion air required by the burner at openings 194.

The elements of FIG. 7 thus far described correspond to the blue flame retention head as seen in FIGS. 5 and 6. The remainder of the head, shown to the right of outlet opening 198 in FIG. 7 is additional structure which, though not applicable to the specific configuration of FIG. 5, is useful in mounting the retention head on a variety of conventional oil-fired heating units with pressurized combustion chambers. Specifically, frame 203 represents conventional structure to which the retention head is secured. Downstream of outlet 198 a conically-flared wall 204 is provided which terminates at the entry to the main combustion chamber 206. The flared downstream portion 204 of the flame retention head permits the flame to stabilize prior to main combustion chamber 206. Specifically, flared portion 204 permits the generally toroidal flow pattern 213 to develop and provide a smooth transition between the retention head and furnace structure.

The recirculated combustion products from the heat exchanger are swirled in vortex chamber 180 to diffuse and mix the gases with maximum energy conservation before the gases are swirled out through outlet 198 into the ignition region to provide stable soot-free combustion in the blue flame regime.

The system of FIGS. 5 and 6 illustrates how a conventional gas burner, which operates at atmospheric pressure, can be readily converted to an oil burner using the heat exchanger of the present invention in an economizer mode. The exhauster of the heat exchanger maintains a constant flow through the system and the particular retention head configuration assures minimum losses. The use of regulator 113 assures an even outflow of cooled combustion gases at conduit 191 by preventing surges in the manner described in relation to FIG. 2. The inflow water for tank 182 is preheated as the secondary fluid in heat exchanger 180 thereby assuring that the water in the tank is hot enough to maintain the tank surfaces above the temperature at which condensation would form thereon. The tank can therefore be made of low-cost carbon steel or the like. The air inflow at ports 202 in the retention head (FIG. 7) also breaks the vaccum in tube 197 and avoids impingement of the fuel spray against the inside of the tube; this assures a reliable and clean ignition function. Importantly, the burner retention head as shown in FIG. 7 is adaptable to a sealed pressurized burner system in the form shown; or, if the flared member 204 is removed, it is adaptable, without alteration, to an atmospheric burner system as illustrated in FIG. 5.

Figure 8:
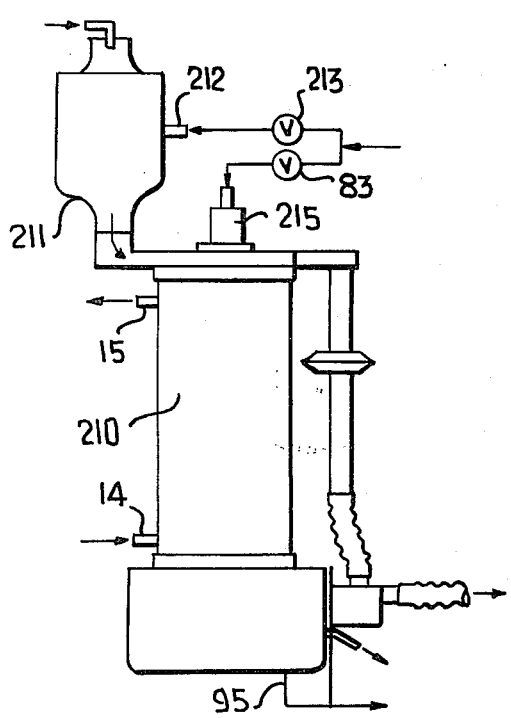
FIG. 8 is a schematic diagram showing the heat exchanger of FIG. 2 modified to include a vapor generator at the inflow opening for the hot fluid.
Figure 9:
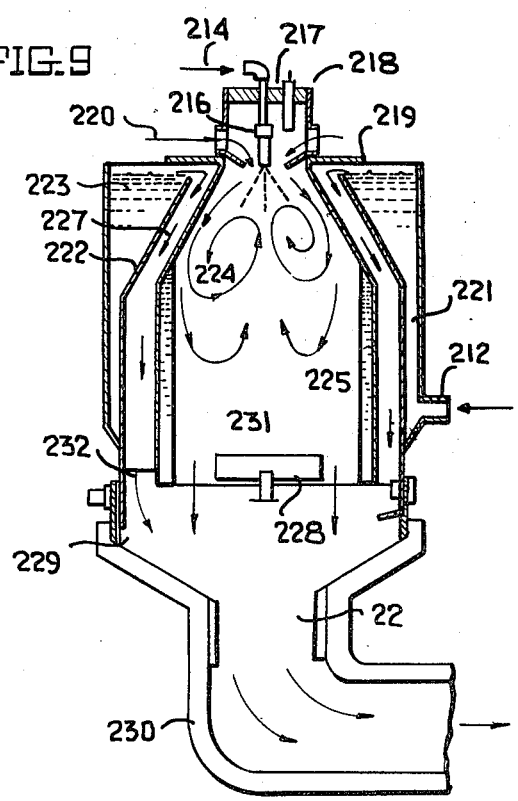
FIG. 9 is a side view in elevation of the vapor generator of FIG. 8.

Referring to FIG. 8, a heat exchanger 210 of the type illustrated in FIG. 2 is shown adapted to operate with a simplified vapor generator 211. Recirculated water and/or other condensate from pump outlet 95 is supplied to valve 83, as in FIG. 2, and also to valve 213 which controls inflow to vapor generator 211 via vapor generator inlet 212. As described above, valve 83 controls recirculation of the condensate back through the heat exchanger. The vapor generator, which is shown in greater detail in FIG. 9, includes inverted cup-like member 221. A burner accessory head is housed in a cylindrical sleeve 215 which is secured atop member 210 by means of a suitable flange arrangement 219. The top of the hollow sleeve 215 is closed by a plug 217 through which a fuel supply line 214 extends into the sleeve. Fuel supplied via line 214 is fed to a fuel atomizer nozzle 216. A conventional oil burner igniter also extends through plug 217 into the sleeve interior. Suitable ports 220 are provided in the periphery of sleeve 217 to permit induction of combustion air into the sleeve interior. These ports are preferably arranged as tangential slots so as to cause the induced air to establish a vigorous free vortex in the vicinity of the nozzle 216.

An internal jacket member 222 is disposed inside inverted cup member 221 and extends from below the open bottom of member 221 to just below the closed top of that member. The bottom rim portion of the cup member 221 is chamfered or bent into contact with jacket member 222 to which it is welded or otherwise secured to provide a fluid seal between the two members. Jacket member 222 is generally cylindrical at its lower portion and has an upper portion which converges conically upward. The generally annular space between members 221 and 222 comprises a reservoir 223 for liquid which enters the vaporizer via inlet 212 defined through member 222. A combustion chamber 224 is disposed concentrically within jacket member 222 and extends from the top of the cup-like member to below the rim of member 221. Internal insulation 225 is provided along the interior walls of the combustion chamber. The annular space 226 between jacket member 222 and combustion chamber 224 constitutes an annular overflow passage 227 for reservoir 223.

Centered at the downstream end of the combustion chamber there is provided a disc 228 made of refractory or insulation material. The disc is of smaller diameter than the interior of combustion chamber 224 so that an annular outlet 231 is provided from the combustion chamber. Annular flow passage 227 extends downward so as to provide an annular outlet 232 disposed concentrically about the annular outlet 231 of the combustion chamber.

A funnel-shaped support member 229 is supported at its stem at inlet 22 of the heat exchanger and in turn supports the lower edge of jacket member 222 at the open end of member 229. Thermal insulation 230 may be provided about the periphery of member 229 and inlet 22 if desired.

In operation, nozzle 216 extends into combustion chamber 224 where it issues atomized fuel that is ignited by igniter 218. The vortically flowing air induced at slots 220 assure vigorous mixing of fuel and air. The flared inlet or upper portion of the combustion chamber 224 assures energetic swirling of gases therein. This portion of the combustion chamber is not insulated so that water which overflows reservoir 223 into overflow passage 227 is heated on the combustion chamber wall. This energetic swirling and heat transfer in the combustion chamber assures blue flame burner operation and eliminates formation of soot. It is noted that the swirling flow initially expands and then swirls back in a vortex path surrounding the central axis of the chamber so that there is reverse flow along that axis. This flow pattern assures stabilization of the flame. The combustion gases egress from annular outlet 231 while water or condensate from overflow passage 227 egresses from outlet 232. Importantly, the egressing condensate is in direct contact with the egressing combustion gases to provide a water vapor laden stream of combustion gases at the inlet 22 of the heat exchanger. Specifically, this stream contains the combustion products and super-heated steam at substantially atmospheric pressure. Almost all of the combustion energy is recovered as sensible enthalpy of the mixture; that is, there is no heat exchange or flue loss.

The exhausting action of blades 38 (FIG. 2) in heat exchanger 210 assures a continuous flow through the vaporizer 211 at a flow rate dependent upon the setting of the by-pass regulator 113 (FIG. 2). The heated secondary fluid flowing from inlet 14 to outlet 15 of the heat exchanger can be used to impart thermal energy for whatever purpose is desired. The advantages of balanced flue operation and continuous adjustability of flow which are discussed above for other applications of the heat exchanger are applicable in this application. The vapor generator itself is a much simpler structure than a conventional boiler and, importantly, does not require internal pressurization as does a conventional boiler.

Figure 10:
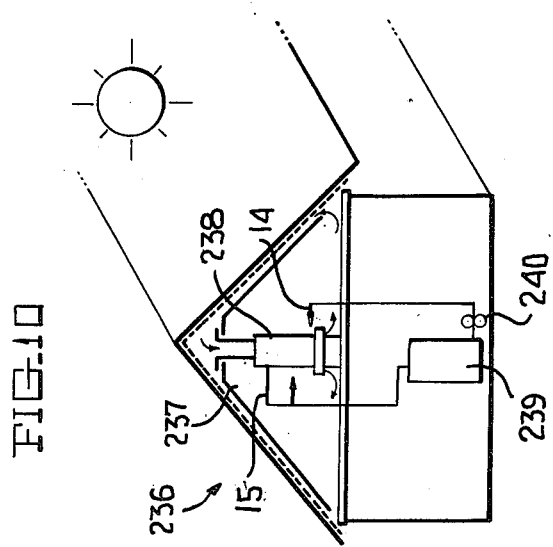
FIG. 10 is a schematic diagram showing the heat exchanger of FIG. 1 adapted to a solar energy application.

FIG. 10 illustrates how the heat exchanger of FIGS. 1 or 2 can be applied to solar energy applications. Specifically, a house 236 includes an attic volume 237 in which the heat exchanger 238 is located. The primary air inlet 22 for the heat exchanger is disposed at or near the highest point in the attic. The heat exchanger is arranged with its primary fluid outlet disposed as in FIG. 1 to issue the cooled primary fluid along the attic floor. A water storage tank 239, serving as a solar heat reservoir is located in the basement or elsewhere in the house. Secondary fluid, in this case water, is recirculated from the bottom water tank 238 to secondary fluid inlet 14 and from secondary fluid inlet 15 to the top of tank 239. A pump 240 is provided to achieve recirculation of the water.

In operation, the solar-heated air at the top of the attic is drawn into the heat exchanger 238 by the action of exhauster blades 38 which exhaust the cooled air along the attic floor. A recirculating air flow is thus set up in the attic whereby the air continuously flows along the inside surface of the roof and is heated by solar energy. The heated air flows through heat exchanger 238 wherein it transfers thermal energy to the recirculating water from storage tank 239.

The system of FIG. 10 requires no combustion. It should also be noted that the interconnections between the water reservoir and heat exchanger also permit heat from the storage tank to be transferred from the secondary fluid (water) to the primary fluid (air). The heated air may be used for whatever purposes are desired.

Heat exchanger 238 may be elongated to maximize the heat exchange area; that is, wall 12 of FIG. 1 has a greater area over which more thermal energy transfer can be effected. As an alternative to using only the heated air in the attic volume, a solar collector may be provided to heat the primary fluid.

Referring to FIG. 11, the same basic structure described above for the heat exchanger may be modified to provide a self-contained combustion device 250. Elements of FIG. 11 which are identical to elements in FIGS. 1 and 2 bear the same reference numerals used in the latter figures. The combustion device embodiment differs from the heat exchanger embodiment in the manner described in the following paragraphs.

The upper portion of the enclosure 11, the portion encompassing the first two swirl stages or zones, comprises a combustion chamber defined by a sheet metal shell 214 in the form of a cylinder which concentrically abuts thermal transfer wall 12. At a height corresponding to a location somewhere in the second swirling stage or zone the shell 241 tapers conically inward at 243 to provide an egress throat 245 from the combustion chamber into succeeding swirling stages. A plurality of stop members 244, in the form of screws or studs extending through or otherwise secured to wall 12, support the shell at the transition between its straight and tapered sections. Insulation 242 is provided along the interior surface of shall 241.

A sleeve 246 is secured concentrically about shaft 27 by means of bushings 247 or the like to permit sleeve 246 to rotate with the shaft. Sleeve 246 defines an annular air passage with shaft 27 which is fed by air in sleeve 24 into which sleeve 246 extends. A plurality of short blades (typically, four) 248 extends radially from sleeve 246 proximate its lower end. Blades 248 replace blades 39 of FIG. 1 and are considerably shorter than blades 39, preferably not extending beyond the radius of outlet throat 245 from the combustion chamber. Sleeve 246 is supported at its bottom by studs 252 which are secured to shaft 27. A plurality of ports 249 are defined in sleeve 246, at least one adjacent each blade. Air inside sleeve 246 is issued from ports 249 along blades 248 to: cool the blades; add combustion air to the combustion chamber; and exploit the Foa effect to maximize mixing of fluid in the combustion chamber. In a manner analogous to that described above for blades 39, blades 248 create a first swirl stage or zone 250 above the blades and a second such stage or zone 251 below the blades.

A fuel atomizer nozzle 252 extends into plenum 17 through a suitably provided opening in cap member 16 at a location above inlet opening 21. The nozzle is supported by a support housing 254 which also supports conventional igniter electrodes. Ports are provided in housing 254 to permit induction of combustion air proximate the ignition region to stabilize and facilitate ignition. The fuel supplied to nozzle 252 is the primary injected fuel. Secondary fuel may be injected by means of an optional nozzle 256 which is supported in another suitably provided hole in cap member 16 above inlet opening 21. The auxiliary fuel is delivered to nozzle 256 at 257 by means of a screw-feed mechanism or the like described below in relation to FIG. 13. Water may also be injected at nozzle 256 under the control of valve 258.

When operating as a combustion device the unit creates ash and soot which tends to fall and collect in the condensate reservoir between walls 61 snd 63. To prevent this solid residue from clogging the condensate recirculation path, an internal strainer element 259 is provided in the reservoir to protect at a location whereby the inlet tube 91 for the recirculation path is protected.

The ash and soot slurry is continuously removed from the reservoir by means of a separation and settling chamber 260. Chamber 260 is a swirl chamber which receives a portion of the pressurized water outflow from pump 93 via an injector nozzle 261 arranged to issue the water into chamber 260. The resulting pressure created in chamber 260 forces the water in chamber 260 to flow into an enclosed strainer cylinder 262 which is supported in the chamber by a fluid conduit 263 which also communicates with the interior of strainer 262. Conduit 263 also communicates with the water reservoir. The pressure built up in chamber 260 forces water to flow into the strainer cylinder 262, through conduit 263 and into the reservoir. The slurry is blocked from such path by strainer 262 and settles to the bottom of chamber 260 wherein it can be selectively removed via valve member 264.

A fuel pump 265 is disposed beneath the assembly and arranged to be driven by drive motor 30. Fuel delivered by pump 265 is delivered to atomizer nozzle 252. A damper 266 is provided in plenum 17 to permit selective blocking of gaseous inflow at inlet 22, particularly when the apparatus is operating as a self-contained burner-boiler, burner-gasifier, or incinerator system with useful heat recovery.

The vigorous swirling and mixing in zones 250, 251 in accordance with the flow patterns described above provides for efficient combustion in the combustion chamber. The resulting heated gaseous products and condensate heat the secondary fluid in flow path 13 at stages 51, 53, 55 and 57 as described above. The shaft 27 is continuously cooled, both by the internal condensate recirculating therethrough and by the air flowing in sleeve 246. The recirculation not only has cooling advantages per se, but in addition permits operation in the blue flame or other desired mode with less primary fluid inflow than would otherwise be required.

Combustion is achieved efficiently in the apparatus of FIG. 11 because of the optimum mixing by the blades and the staging. The mechanical agitation of the combustion zone followed by agitation in subsequent zones provides degrees of freedom in achieving blue flame operation which were heretofore not available. Specifically, conventional burner systems rely upon the turbulating effect produced in the combustion volume by pressurized injected combustion air. The mechanical efficiency of the resulting momentum exchange is low; therefore the effective turbulation of conventional flame volumes is minimal. Turbulation in conventional burners is also dependent upon the combustion air flow rate into the system and on the pressure differential which exists across the entire heating system. In the system of FIG. 11, turbulation of the fuel and air is achieved with blades 248, resulting in an intermixing which is more complete and efficient than is achieved by pressurized air injection. There is no dependence on the pressure drop across the system or on the input air flow rate since the blade rotational speed can be adjusted as necessary to compensate for variations in either of these parameters. Therefore a blue flame mode, yellow flame mode, or substantially any combustion mode is readily achieved. Moreover, stirring of the fuel and air immediately after combustion, before the gases are cooled, in the region immediately above blades 248, provides for more efficient combustion and less thermal stress on structural parts. Specifically, the recycled combustion gases provide a cooling effect in the combustion region. This internal recirculation facilitates obtaining a blue flame.

It is well known that the temperature of the flame zone is an important factor in combustion systems particularly where elimination of pollutants is a consideration. The conventional heating system has relatively poor means for regulating this flame temperature due to inadequate stirring and critical dependence of stirring on the flow rate of combustion air. The apparatus of FIG. 11 positively controls the flame temperature within the combustion zone by mechanical agitation to optimize the conditions from the standpoint of maximizing volumetric firing rate and the minimizing of pollutant emissions.

It is further clear that the system of FIG. 11 provides means for readily removing ash from the system and for self-cooling and self-lubricating its components.

The system of FIG. 11 may operate with powdered coal, oil or gas, as a primary heat source or as an economizer. It may also operate as a synthetic gas generator or gasifier by burning oil or coal and providing combustible gas. As a gasifier, because of the efficient uniform mixing the system is able to inject more water than other systems whereby greater control over the hydrogen-carbon ratio is afforded. This ratio can be made very much more like that of gas than is possible in the prior art. Advantageously for gasifier operations, the system may be quite small.

Importantly for burner operation, the burner is oriented for down-firing (i.e. vertically oriented downward) to aid in through combustion of fuels, particularly fuels having impurities. Impurities such as ash, accumulate at the bottom of the system where it can easily be disposed of and where no problems result from having it accumulate on the side walls or other surfaces. This arrangement allows the impurities in the fuel to assist in the combustion process by allowing suspension of particles within the combustion zones and utilization of the so-called "nucleate" combustion and "fluid bed" phenomena.

It is to be noted that nozzle 256 is shown on the left hand side of the drawing at the top. By means of the violent vortex action which goes in both horizontal and vertical directions, the injected fuel is carried over to the other side of the burning chamber and uniformly distributed.

In operation of this device as a gas generator, there are several points to note. First, there is a staged combustion device wherein there are physically separate zones. The discrete combustion zones are created by the dynamic pattern of the internal recirculating gases. This in turn is a function of the speed of rotation of the blades.

The residence time in any burner or burner chamber is the time available for a particle of fuel to travel the entire length of the chamber. The recirculation in each stage of combustion gases provides effectively long residence times and more through combustion. In other words, each particle of fuel is provided with the maximum opportunity to be completely burned under the preselected conditions of air to fuel ratio and given combustion chamber volume. It may be seen, therefore, that with the present invention, heat transfer rate is made as high as possible by selecting a high rotational speed together with a relatively low primary fluid throughput flow rate.

For gasifier operation it is necessary to achieve stable operation at the maximum fuel-to-oxidizer ratio to generate a fixated gas with constant characteristics and high heating value. More oxygen would result in more complete combustion, increasing the amount of carbon changed to carbon dioxide and the amount of hydrogen changed to water. The output gas would therefore be an inert combustion gas whoch could not become the source of useful combustion in another device. By having incomplete combustion, one can maximize the amount of carbon monoxide and hydrogen which can be produced in the secondary stage of the burner, a function easily achieved by selecting the proper blade speed and fuel-to-air ratio. These conditions are optimized in the present invention wherein the stirring energy is not dependent upon momentum energy derived from the injected oxidizer.

Figure 12:
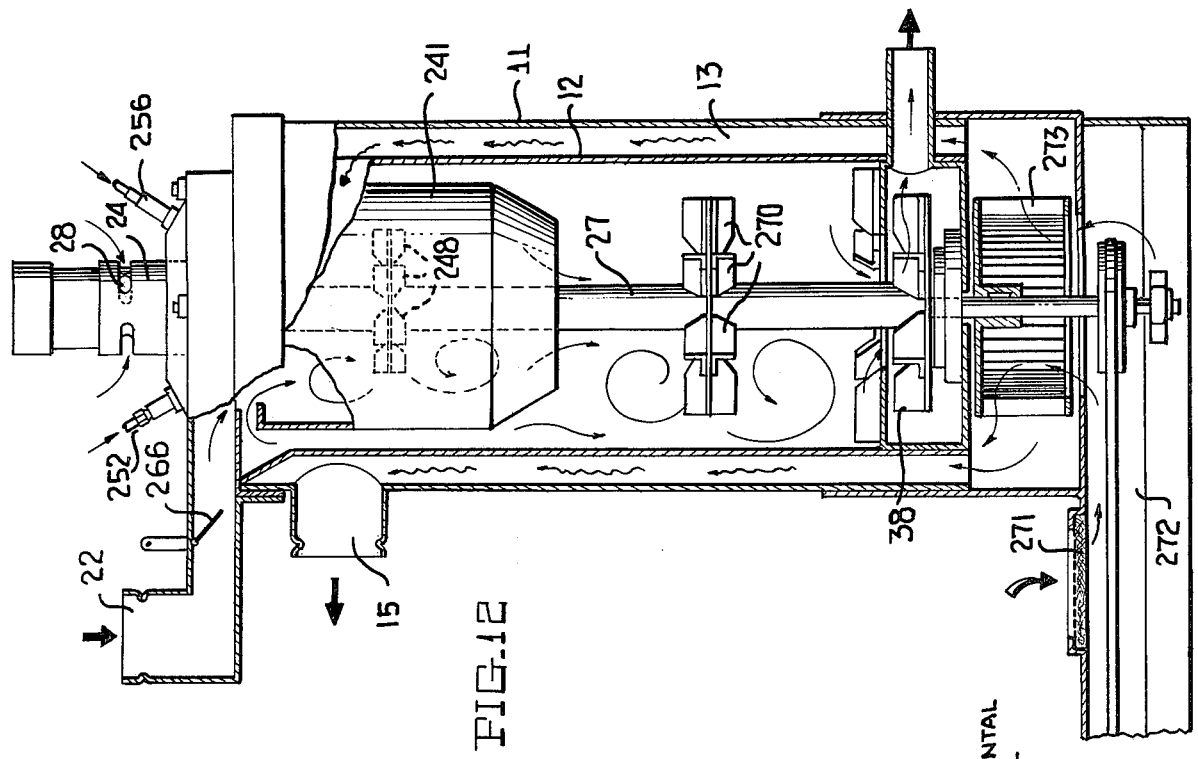
FIG. 12 is a side elevation view of the burner of FIG. 11 adapted to operate as a hot air heater.

FIG. 12 is provided merely to show that the burner of FIG. 11, for example, may be modified to serve as a hot air furnace. In this case, the heat exchanger operates in a burner mode with fuel supplied at nozzle 252 and/or nozzle 256. Combustion gases or air is admitted at inlet 22, under the control of damper 266, and bleed openings 28 in sleeve 24. Mixing of fuel and air is achieved in the combustion chamber 241 by the action of blades 248. Only one additional set of blades 270 is shown outside the combustion region. The important difference in the embodiment of FIG. 12 is that air to be heated is the secondary fluid flowing through path 13. The heated fluid flows out of outlet 15 into the space to be heated and is recirculated back into the heat exchanger through filter 271 and return duct 272. The return duct communicates with the bottom of the heat exchanger through which the air is driven by a circulating air fan 273 driven by and supported on shaft 27. The fan utilizes the large symmetrical volume of the lower portion of the heat exchanger to uniformly diffuse the air into annular flow path 13 wherein it is heated. Fan 273 need not be located directly on shaft 27. For example, the enclosure may be enlarged on either side and the fan may be located in the enlarged portion. In such instance the fan may be driven by a separate motor or by a second drive shaft coupled to the main drive shaft by a separate belt and pulley linkage.

Figure 13:
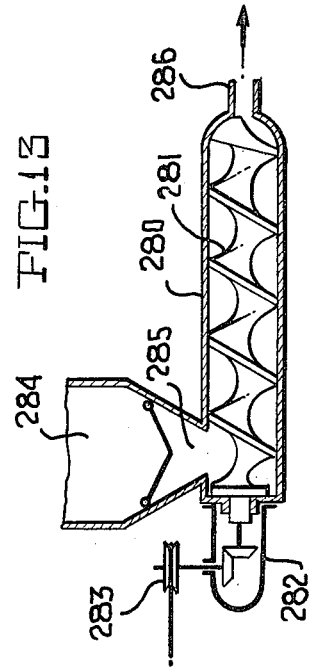
FIG. 13 is a side view in elevation of a feed mechanism for powdered fuel which is useful with the burner of FIG. 11.
Figure 21:
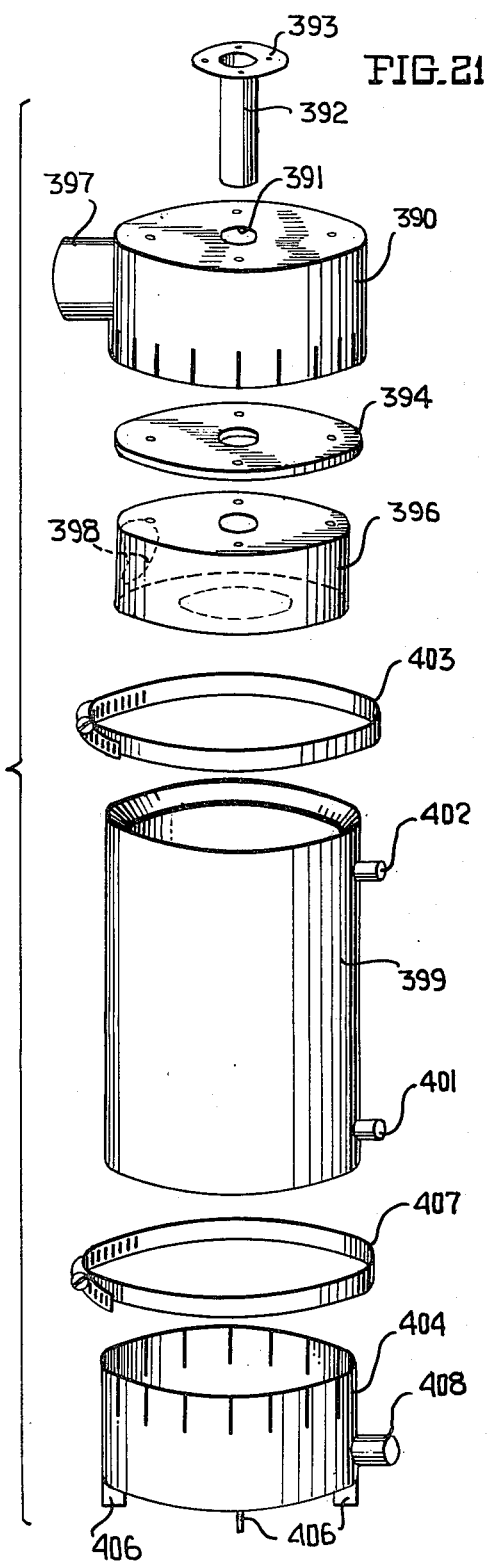
FIG. 21 is an exploded view in perspective of the exterior parts of the economizer of FIG. 18.

A mechanism for controllably delivering inferior fuel, such as powdered coal, at input 257 to injector 256 of FIG. 11 is illustrated in FIG. 13. Specifically a cylinder 280 houses an Archimedes screw 281 which is driven by a gearing arrangement 282 at one end of the cylinder. The gearing arrangement may be driven in turn from a belt drive 283 of the type described in FIG. 3 so that the mechanism of FIG. 13 can be synchronized to the speed of rotation of shaft 27 (FIG. 11, for example). The cylinder 280 is positioned with the screw axis generally horizontal so that powdered coal or the like may be delivered to the cylinder interior through an opening 285 provided at one end of the cylinder wall. A funnel provides continuous flow of the powdered coal by gravity feed. The remote end of the cylinder is provided with an outflow opening 286.

In operation, as the Archimedes screw is rotated, the powdered coal is moved axially along the cylinder toward outlet 286 from which it is delivered to the combustion device. The rate of fuel delivery is proportional to the speed of belt drive 283 which can be readily adjusted. Alternatively, variable speed drive means may be employed.

FIGS. 14 and 15 illustrate and oil burner retention head which is a modified version of the retention head illustrated in FIGS. 7 and 6, respectively. A conventional burner or boiler adaptation 300 (such as unit 181 in FIG. 5) has a standard generally cylindrical adapter and burner mount 302 secured thereto. An annular housing 304 is secured about the remote end of mount member 302. A cylindrical center body 306 extends concentrically through annular housing 304 and is sealed by a plug 307 at its rearward end remote from burner 300. The forward end of center body 306 is provided with an opening 305 through which atomized fuel may flow in the manner described below. The periphery of body 306 is secured to housing 304 by means of a spot weld or the like at the annular contact between center body 306 and the remote wall of housing 304. Circumferentially extending ports 309 are defined through body 306 rearward of housing 304. An annular damper member 308, having similar circumferentially extending ports defined therethrough, is rotatable about body 306 to selectively regulate induced flow of primary combustion air 320 in body 306.

An atomizing air delivery tube 310 extends through plug 307 longitudinally in body 306. Air is preferably supplied to tube 310 from a motor coupled air compressor such as that designated by numeral 125 in FIG. 3; in this manner, the speed variations of the direct motor drive advantageously adjust the flow of atomizing air to accommodate variations in metered oil flow. A delivery line 312 for metered oil likewise extends longitudinally through plug 307 into body 306. Air from tube 310 and oil from line 312 are delivered to a conventional air atomizing fuel nozzle 314 disposed within body 306. Typically, the metered fuel oil is delivered internally of the air orifice in the discharge region of nozzle 314. The fuel flow through line 312 is preferably metered by a positive displacement element (such as element 143 of FIG. 3) which is driven at a speed proportional to the motor drive speed. Thus, the fuel oil and atomizing air may be delivered at a constant mass flow ratio under the control of the speed of the drive motor 123 of FIG. 3.

The ignition region 316 for the system is located in the space between the forward or discharge end of nozzle 314 and opening 305 in the forward end of body 306. This is a sheltered region through which primary combustion air 320 from ports 309 flows. Ignition electrodes 318 of conventional construction are disposed in ignition region 316. Electrodes 318 are preferably mounted in an adapter type of plug which extends longitudinally into body 306 through a suitably-provided opening in the body which is sealed by the plug. The plug is readily removable as a modular unit for servivING and inspection. A conventional safety control element 322, preferably of the "cad-cell" optical flame sensor type, detects the presence of flame in the ignition region and may be used to shut down the system during unsafe conditions.

Secondary combustion air flow 324 is tangentially induced into housing 304. Typically, this secondary combustion air would be induced by the unit of FIG. 2; specifically, from exhauster blades 38 discharging cool gases via outlet 103 in FIG. 2. It is noted that, using the single drive system of FIG. 3, the secondary combustion air flow rate may likewise be made a function of the rotational speed of drive motor 123 of FIG. 3. At the tangential inlet for secondary combustion air 324 there is disposed a Coanda surface structure 326 to which the inflowing air stream attaches by means of boundary layer attachment. Surface 326 directs the inflow tangentially in an orderly flow pattern with minimum stagnation pressure losses. As indicated at 328 and 330 the tangentially-directed inflow of secondary combustion air recirculates about annular housing 304 until entering the piloting zone 332 of the combustion chamber. The conservation of momentum energy effected by Coanda surface 326 permits the vortex flow to enter the combustion chamber with high swirl velocities which are advantageously utilized for energetic mixing and flame stabilization.

The combustion mixing and piloting zone is defined by a diverging frusto-conical member 334 which diverges from downstream of the opening 305. Swirling gases 336 undergo combustion in the piloting zone inside member 334. The reverse flow portion 338 of the swirling gases accounts for the flame stabilization characteristics of the system. It also allows full use of the combustion volume provided within the structure. In conventional systems, flame stabilization occurs downstream of the combustion volume, resulting in less efficient utilization of that volume.

A damper member 340 is movable to different gross positions set by adjustment screw 342 to vary the size of the inlet opening for secondary combustion air flow 324. Fine positioning of damper 324 is achieved by means of adjusting screw 348 which is threadedly engaged by support 346 to extend therethrough and bear upon a right angle extension plate of damper 340. After the secondary combustion air flow 324 has been optimized for a given firing rate or fuel flow delivery rate, the induced air and delivered fuel may be maintained at a constant ratio without further damper adjustments over a wide range of modulating firing rate or variations in the speed of motor 123 (FIG. 3).

Referring now to FIGS. 16 and 17, there is illustrated a positive displacement fuel metering unit corresponding, for example, to unit 143 of FIG. 3. An upper sealing cap 350, in the form of a flat circular disc, is secured to a flat circular top surface of an upper valve body member 352. Member 352 is generally cylindrical in shape with a central bore 351 extending longitudinally therethrough. A short cylindrical stem portion 353 extends concentrically for a short distance from the bottom surface of member 352 with bore 351 likewise extending through portion 353. A fluid inlet channel 354 is radially defined through member 352 from bore 351 to the outer periphery of the member. An outlet channel 360 is defined radially through member 352 from bore 351 to the member periphery and in alignment with inlet channel 354. A lower valve member 356 is shaped identically to upper member 352 but includes the short cylindrical stem portion 355 at its upper surface. Fluid inlet 359, fluid outlet 370, and central longitudinal bore 357 are provided in member 356 and correspond to elements 354, 368 and 351, respectively, of member 352.

A valve drive member includes a drive pulley 141 which is driven by motor 123 of FIG. 3 by means of belt 142. Pulley 141 is provided with a central hole through which a generally cylindrical hollow tube 364 and pulley 141 are secured together so that the tube rotates about its central longitudinal axis with the pulley. The upper end of tube 364 has a cut-away portion 360 which extends less than 180° about the tube periphery. A similar cut-away portion 361 is provided at the bottom of tube 364.

The outer diameter of tube 364 is slightly smaler than the diameter of bores 351 and 357 so that it may be inserted in those bores and rotate with pulley 141 relative to valve members 352 and 356. When so inserted, the cut-away portion of tube 360 selectively communicates with either inlet channel 354 or outlet channel 368, and the cut-away portion 361 selectively communicates with either outlet channel 370 or inlet channel 359. The cut-away portions 360 and 361 are disposed at 180° opposite locations on the tube periphery so that when portion 360 is communicating with inlet 354, portion 361 is communicating with outlet 370; likewise, when portion 360 is communicating with outlet 368, portion 361 is communicating with inlet 359. A support structure, generally designated at 362, holds members 352 and 356 together and in place so that pulley 141 and tube 364 may be rotated relative thereto. A metering piston 366 is disposed inside hollow tube 364 and is substantially co-extensive with that tube. Piston 366 has a central portion which is of slightly smaller diameter than the inner diameter of tube 364. The ends of piston 366 are of considerably smaller diameter. The piston is free to move longitudinally within tube 364 while providing a fluid seal between the two ends of the tube.

A lower support member 363 is in the form of an elongated cylinder having a central bore 365 extending longitudinally therethrough and a wide annular disc 358 at its top. Disc 358 is secured to the bottom surface of member 356 in sealing relationship. Bore 365 is aligned with bore 357 in member 356 so that piston 366 is free to slide into bore 365. In order to limit the excursion of the piston into bore 365, a positionally-adjustable stop member 374 is provided and takes the form of a cylindrical plunger inserted into bore 365. Circumferential O-rings disposed about plunger 374 serve to seal bore 365 against leakage of valved fluid which is present in bore 357 and the upper end of bore 365. An adjustment screw 382 threadedly engages the lower end of bore 365 and is itself provided with a central longitudinal bore through which an extension rod 384 extends into contact with the bottom of plunger 374. The upper end of rod 384, which extends above adjustment screw 382, is surrounded by an annular spring member 378 which provides resilient contact between the bottom of plunger 374 and the top of adjustment screw 382. A locking ring 384 is provided to secure the threaded adjustment screw in position relative to member 363. A snap ring attachment 386 secures rod 380 in position relative to adjustment screw 382. As is evident from the drawing in FIG. 16, the adjustment screw permits the position of plunger 374 to be adjusted in bore 365, thereby permitting adjustment of the maximum longitudinal travel allowable for piston 366.

In operation, fuel oil, for example from pump 139 of FIG. 3, is supplied at constant pressure at each of inlets 354 and 359. As pulley 141 is rotated by belt 142, the cut-away portions 360 and 361 of tube 364 sequentially communicate with their respective inlet and outlet channels. When portion 360 communicates with inlet 354, fuel oil is admitted to the upper piston chamber defined by the interior portion of tube 364 above piston 366 and the space inside bore 351 above tube 364. The pressurized fuel oil tends to push piston 366 downward to enlarge the upper chamber and reduce the lower chamber. When tube 364 further rotates so that upper cut-away portion 361 communicates with outlet 368 and lower cut-away portion communicates with inlet 359, pressurized fuel oil at inlet 359 is admitted into the lower chamber and drives piston 366 upward to expel fuel oil from the upper chamber out through outlet 368. Further rotation of tube 364 to the original position permits pressurized fuel oil from inlet 354 to enter the upper chamber and drive piston 366 downward to force fuel oil from the lower chamber out through outlet 370. The piston is thus reciprocated within tube 364. The outflow lines from outlets 368 and 370 are connected together at 372 to provide a metered fuel flow to the burner.

The positive displacement fuel metering unit of FIGS. 16 and 17 allows fuel to be delivered at a high pressure to an atomizer nozzle, if desired. The unit avoids spring biasing in the reciprocating valve action, whichd biasing is commonly used in conventional servo-type metering valves and is failure prone. Further advantages of this unit reside in: elimination of external flow leakage with internal shuttle portion; use of rotary valve with practical sizes for maufacturing even though the volume of the delivered metered fuel is small; simple manufacturing; and capable of construction with materials which can be used with water as well as oil.

It is to be noted that the reciprocating action of piston 366 and the resulting positive delivery of metered fluid occurs at a frequency which depends only on the rotational speed of pulley 141 and, hence, the speed of drive motor 123 of FIG. 3. Further, the fluid delivery is not affected by the viscosity of the fluid or the fluid pressure at the inlets 354 and 359. Still further, the connection of the two outlets together at 372 permits the metered fuel to be delivered to the burner free of pulsations, thereby avoiding oscillation of the burner firing rate.

FIGS. 18, 19, 20 and 21 illustrate an economizer configuration of the present invention. Specifically, an upper end member 390 takes the form of an inverted sheet metal cup which defines the upper plenum valume of the unit. A central circular opening 391 through the top wall of member 390 has a sheet metal sleeve 392 inserted therethrough. The top of sleeve 392 terminates in a mounting disc 393 which is secured to the top surface of member 390 and seal opening 391. A circular insulation disc 394 is secured against the underside of the top wall of member 390 and is suitably apertured to permit sleeve 392 to pass therethrough. Insulation disc 394 serves to thermally isolate the internal plenum volume from the upper support structure of the system. An internal plenum member 396, also in the form of an inverted cup, fits inside member 390 with its top wall abutting insulation disc 394. Member 390, disc 394 and disc 396 are secured together by means of screws and nuts, rivets, or any other suitable means. The upper wall of member 396 is apertured to permit sleeve 392 to pass therethrough. The bottom wall of member 396 is also provided with a central opening; however, the latter is much larger than the diameter of sleeve 392. An inlet tube 397 is provided as part of member 390 and is arranged to direct inlet air tangentially into that member.

An inlet opening 398 is provided in the sidewall of member 396 and is aligned with tube 397 to permit inlet air to be tangentially admitted into the inner plenum volume defined by member 396.

A heat exchanger unit 399 takes the general form of a cylinder having an outer cylindrical wall and an inner cylindrical wall which define a flow path or sleeve 400 therebetween. Fluid ingress port 401 and fluid egress port 402 communicate with flow path 400 through the lower and upper portions, respectively, of the unit. Upper end member 390 fits over the top of unit 399 and is secured thereabout by means of a clamping ring 403.

A lower member 404 of generally cup-like configuration is supported on legs 406 and is arranged to receive the lower end of heat exchanger unit 399 at its top. A clamping ring 407 secures the upper end of member 404 about the lower end of unit 399. An egress port 408 for gases passing through the heat exchanger is provided through the sidewall of member 404.

A hollow drive shaft 411 extends longitudinally through unit 399, members 390 and 404, and through sleeve 392. A sealing and adapter bushing 412 for drive shaft 411 is disposed below member 404, extending upward to meet the shaft through a central aperture provided in the bottom wall of member 404. Sealing and adapter bushing 412 also serves as a bearing support for condensate transfer pump 413 which is disposed in an inverted top-hat-shaped cap 414. Cap 414 includes an upstanding stud 416 which is journaled in bushing 412 to rotatably support drive shaft 411. Cap 414 also includes an outlet tube 415 to deliver condensate from transfer pump 413.

At the top of the apparatus, hollow drive shaft 411 is supported by adapter bushing 417. The upper extension of bushing 417 is retained by upper bearing support 418. A central bore is defined through bushing 417 to permit liquid to be delivered to the hollow interior of drive shaft 411. To this end a delivery tube 419 is arranged to receive condensate from pump 413, via outlet tube 415, and deliver same through bushing 417 to the interior of drive shaft 411.

A support structure, generally designated by the numeral 421, is mounted atop member 309, with upper bearing support 418 extending therethrough and serving to secure structure 421 in place. A driven pulley 422 is supported on drive shaft 411 inside support structure 421 and is driven by an electric drive motor 423 via a drive belt 426. A further drive pulley 427 of smaller diameter is fixedly secured to pulley 422 and, via belt 424, drives a fuel delivery unit 428. In this arrangement the drive shaft for the main unit is a counter shaft drive for the fuel unit so that a belt failure de-energizes the system for fail-safe operation.

A first turbulating or stirring sub-assembly 431 comprises a plurality (preferably eight) blades extending radially from shaft 411 proximate the upper end of unit 399. The vortically flowing gases which egress from plenum 396 into unit 399 are maintained at high swirl velocities by the blades in sub-assembly 431 in the manner described hereinabove in relation to FIG. 1. The hot gases are thus swirled along the heat exchange surface which separates the gases from flow path 400 to effect efficient heat transfer. An annular disc 434 extends radially inward to serve the same function as stator 42 of FIG. 1. Specifically, disc 434 augments internal circulation of gases within discrete thermal zones, provides internal recirculation of condensate which condenses on the heat exchange surface, and permits staged action of subsequent stirring elements 432 and 433.

Elements 432 and 433 are disposed sequentially lower on shaft 411 and serve as both stirring elements and exhauster fans for the heat exchanger. Plural blades extend radially from the shaft and are partially supported along their lower edges by a disc 437, 438 (FIG. 20) which extends radially from the shaft to a shorter distance than the blades. Discs 437 and 438, by covering a portion of the bottom edges of the blades, establish a preferred flow path for the gases at the upper blade edges. This arrangement results in more effective establishment of stages.

The condensate transfer pump continuously recirculates condensed liquid from the bottom of the system back to inlet 419 and into shaft 411. The recirculated condensate both cools the shaft and, if sprayed into the heat exchanger zones, augments heat transfer as described above. In the preferred embodiment the pump is a Tesla-type transfer pump which can be constructed of materials which are corrosion resistant within the combustion-generated condensate.

Referring specifically to FIG. 22 of the accompanying drawings, a heat exchanger assembly 440 is similar to assembly 10 of FIG. 1 and includes a hollow, generally cylindrical member 441 which is open at both ends and has its central longitudinal axis vertically oriented. The horizontal cross-section of member 441 need not be circular for purposes of the present invention; rather it may take any form consistent with the operational features described herein. Further, member 441 need not be vertically oriented in this heat exchanger embodiment of the invention. A thin-walled helical tube 442 is disposed concentrically within member 441 adjacent the interior wall of that member. Tube 442 may, for example, be made of stainless steel. A fluid inlet 444, located proximate the bottom of member 441, and a fluid outlet 445, located proximate the top of that member, extend through suitably provided openings in the member wall.

A cap member 446 is seated atop member 441 and includes an internal plenum 447. Cap member 446 further includes an annular portion 448 which fits concentrically around the top portion of member 441 and is secured thereto by means of a band clamp 449. An annular wall 450 of cap member 446 projects radially inward from the upper edge of member 441 and serves as a baffle defining an interior opening 451 through which fluid may flow into the interior of member 441. Plenum 447 subsists above baffle wall 450 and is otherwise enclosed except for a fluid inlet 452. Inlet 452 is adapted to be connected to a fluid conduit 453 which serves as a fluid supply passage for plenum 447. Preferably, although not necessarily, inlet 452 is arranged to issue inflowing gases tangentially into annular plenum 447.

A hollow cylindrical sleeve 454 extends through a suitably provided opening in the top of cap 446 beyond baffle wall 450 and into the interior of member 441. A flange portion 455 extends radially from sleeve 454 to permit the sleeve to be mounted at the top of cap 446. A support bearing 456 for a shaft 457 is provided inside sleeve 454. A plurality of openings 458 are provided through sleeve 454 to serve as bleed inlets for cooling air. The sleeve itself serves as a heat shield for the upper portion of shaft 457 which would otherwise be directly exposed to the hot fluid in plenum 447. The cooling air which enters through bleed openings 458 provides thermal isolation for support bearing 456. The sleeve also directs the air downward to cool the shaft 457.

A support member 459 for assembly 440 is disposed beneath the assembly and houses a drive motor 460 for shaft 457. Specifically, drive motor 460 is mounted on the underside of the top wall of support member 459. The motor drive shaft 461 extends through the support top wall where it is engaged by a drive bushing 462 which threadably engages shaft 457. The drive bushing 462 and its point of engagement with shaft 457 are located in a flow deflector housing 463 disposed between support member 459 and the bottom end of member 441. Housing 463 includes an annular wall 464 projecting upwardly from its top wall so as to receive the bottom end of member 441. A band clamp 465 secures the wall 464 about member 441. Three or more vertically-extending spacer elements 466 help support the weight of member 441 and also provide threaded engagement for screws 467 which secure the support member 459 to housing 466. Deflector housing 466 has a larger diameter than support member on which it rests and has an open underside to permit air in the housing to vent to ambient.

An exhauster element, in the form of a plurality of blades 468 emanating radially from bushing 462, is located in housing 463. Nominally there are eight such blades although any number may be employed. The blades rotate about the longitudinal axis of shaft 457 as the shaft is rotatably driven by motor 460. The function of the exhauster is to exhaust fluid from within member 441 and out through housing 463, thereby inducing gaseous inflow through inlet 452 and establishing a flow through the entire system.

Within member 441 there are additional sets of blades at different heights. Specifically, a first plurality of impeller or stirring blades 469 extend radially from shaft 457 and constitute the uppermost set of blades. Similar sets of blades 471 and 473 are located at successively lower levels in member 441 and also are secured to and extend radially from shaft 457. The blades 469, 471 and 473 are shown flat with no pitch; however, this is a matter of choice. If the blades are pitched they tend to produce greater mixing than flat blades; however, flat blades exhibit greater structural strength. In the embodiment shown, blades 469 are secured to a thin annular disc 476, preferably made of stainless steel, which slide-fits over shaft 457. The blades 469 are welded edgewise at, for example, eight locations, on the top and bottom of the disc in juxtaposition so that a total of sixteen blades 469 are used (i.e. eight on top and eight on bottom of the disc). The resulting disc and blades assembly is anchored to the shaft 457 by means of pins or screws or the like. Similar disc and blade assemblies are provided for blade sets 471 and 473.

A helical tab 477 is secured to the interior wall of member 441 and serves to maintain proper spacing between adjacent sections of helical tubing 442. Tab 477 is preferably made of sheet metal or the like and may, if desired, be made as separate spaced sections of a helix rather than a single integral helix extending from the bottom to top of member 441.

In operation, when drive motor 460 is turned on and shaft 457 is rotating, exhauster blades 468 and impeller blades 469, 471, 473 rotate likewise. The exhauster blades 468 induce flow of fluid undergoing heat exchange in through conduit 453, inlet 452, plenum 447 into the top of member 441. At this point the effect of impeller blades 469, 471 and 473 create discrete swirling flow stages as described in relation to FIG. 1.

In the embodiment of FIG. 22 the main difference resides in the fact that secondary fluid flows through tubing 442 rather than jacketed flow path 13 of FIG. 1. The tubing 442 provides a greater surface area for heat exchange than the flat wall 12 of FIG. 1, so that heat transfer is more efficient in the FIG. 22 embodiment. Tube 477 maintains space between sections of tubing 442 so that the swirling hot gases in each discrete zone have access to more than 180° of the tubing surface area. In addition, tab 477 deflects condensate and cooler gases inwardly where they are mixed with the swirling heated gases in each stage and thereby augment the heat transfer process as described hereinabove.

It should be noted that the helical tube flow path for the secondary fluid is a higher pressure vessel than the annular jacket described in previous embodiments herein. Thermal transfer is much greater at higher temperatures so that the helical tube approach provides a distinct advantage in this regard.

It should also be noted that the helical tube flow path may comprise two concentric helical tubes, or a tube within a tube. This is advantageous where the secondary fluid is a potable liquid. Specifically, steel tube is not suitable for potables; yet steel is relatively inexpensive. The steel tube can therefore be used as an outer tube, surrounding a smaller copper tube which carries the potable liquid to be heated. The annular space between the two tubes is filled with water which transfers thermal energy from the outer tube to the inner tube. This "fill" water may also be put to hydronic use so that two usable fluids are heated together.

Figure 24:
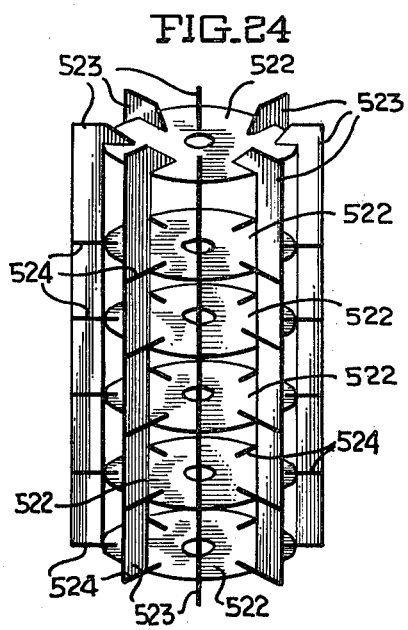
FIG. 24 is a view in perspective of the internal stirring mechanism of the heat exchanger of FIG. 23.

Referring specifically to FIGS. 23 and 24 of the accompanying drawings, another embodiment of the invention includes a hollow, generally cylindrical member 481 which is open at both ends and has its central longitudinal axis vertically oriented. The horizontal cross-section of member 481 need not be circular for purposes of the present invention; rather it may take any form consistent with the operational features described herein. Further, member 481 need not be vertically oriented in this heat exchanger embodiment of the invention. A thin-walled helical tube 482 is disposed concentrically within member 481 in the same manner as tube 441 of FIG. 22. A fluid inlet opening 484 for tube 482 is located proximate the bottom of member 481 and a fluid outlet opening 485 for the tube is located proximate the top of that member.

A cap member 486 is seated atop member 481 and includes an internal plenum 487. Cap member 486 further includes an annular portion 488 which fits concentrically around the top portion of member 481 and is secured thereto by means of a band clamp 489. An annular wall 490 of cap member 486 projects radially inward from the upper edge of member 481 and serves as a baffle defining an interior opening 491 through which fluid may flow into the interior of member 481. An annular bracket 495 is secured to the underside of wall 490 to provide a sleeve depending downward from opening 491 into member 481. Plenum 487 subsists above baffle wall 490 and is otherwise enclosed except for a fluid inlet 492. Inlet 492 is adapted to serve as a fluid supply passage for plenum 487 and, in the preferred embodiment, delivers gases tangentially into plenum 487.

A hollow cylindrical sleeve 494 extends through a suitably provided opening in the top of cap 486 beyond baffle wall 490 and flange 495 into the interior of member 481. A flange portion extends radially from the top of sleeve 494 to permit the sleeve to be mounted at the top of cap 486. An upper support cylinder 496 includes an annular flange extending radially outward from its bottom rim and secured to the upper flange of sleeve 494. A split clamping ring 497 is disposed inside the top of support cylinder 496. Half of clamping ring 497 is secured to the support cylinder; the other half is clamped in place about a tube 498 which extends down through cylinder 496 from above.

A bottom support member 499 has an annular top wall with a central opening 500, a cylindrical sidewall and an annular bottom wall. Member 481 rests on annular wall 501 which has an upstanding annular guide wall 502 surrounding the bottom of member 481. A band clamp 503 serves to secure annular wall 502 about member 481. Support member 499 rests on a base structure 503 which houses the drive mechanism for the system. Specifically, a drive motor 504 also rests on base structure 503 with its drive shaft 506 extending into a compartment 507 below the base structure top surface. A pulley 509 is disposed in compartment 507 about the motor drive shaft to be rotatably driven thereby.

A center driven shaft 510 for the system extends vertically from within upper support cylinder 496, through sleeve 494, member 481, support member 499 and compartment 507 to a lower support cylinder 511 secured below that compartment. A drive coupling 512, such as a reinforced base, or the like, is clamped to a rotating bearing adapter 513 in support cylinder 511. A support bearing 514, preferably clamped in a split collar with half the collar secured to the lower end of cylinder 511, journals bearing adapter 513 to permit it to rotate. Drive shaft 510 is a tubular shaft which is preferably thin-walled and resilient. It is centrally supported by liquid supply tube 498 along most of its length. Tube 498 is rigid and stationary and serves to deliver coolant or lubricant to its lower end. This liquid is pumped upward from the bottom of tube 498 by viscous pumping action through grooves cut in the outer wall of the support tube 498. This arrangement provides an extended bearing surface which permits use of non-metallic bearing materials (e.g. Teflon, and the like). A film of the coolant or lubricant coats the support tube 498 to facilitate rotation thereabout of shaft 510.

A large pulley 516 and a smaller pulley 517 are secured about shaft 510 in compartment 507. Pulley 516 is driven from motor drive pulley 509 via a drive belt 518. Pulley 516 serves to drive shaft 510 and operate the system. Speed reduction pulley 517 in turn drives a further pulley 520 located in compartment 507 via drive belt 519. Pulley 520 in turn drives a water pump 521 secured to the underside of support structure 503.

Within member 481 there is disposed a mixing member which is a modification to the bladed mixing arrangement (39, 41, 43) of FIGS. 1 and 2. Specifically a plurality of annular discs 522 (six in the example of FIGS. 23 and 24) are radially oriented about shaft 510 and are longitudinally spaced from one another along the shaft. A plurality (eight in the present example) of blades 523 extend longitudinally at equi-angular spaced locations of the discs and radially outward from the discs. Tension strips 524 are secured (e.g. by welding) to the discs 522 and blades 523 to hold the discs and blades together in a squirrel-cagelike assembly. The blades 523 may be fabricated from thin (e.g. 15 mil) sheet metal or wire screen to provide light weight blade elements. The blades 523 have tabs 525 or the equivalent atop the uppermost disc 522 for reasons to be described below. The discs 522 are similarly lightweight, thereby permitting an overall lightweight assembly.

An upper annular support boss is secured along its bottom to the top surface of uppermost disc 522 and is secured to shaft 510 which extends therethrough. The boss 526 may be anchored to shaft 510 by means of a set screw or the like (not shown). A low support boss 527 is secured to the underside of the lowermost disc 522 and to shaft 510 by welding or the like.

A bladed exhauster fan 528 is disposed about shaft 510 inside bottom support member 499 and below opening 500. Exhauster fan 528 is secured to shaft 510 by a boss 529. An outlet 530 is provided for exhausted gases through the sidewall of lower support member 499. The bottom of support member 499 collects condensate in the manner described in relation to FIG. 2 and includes a delivery tube 531 for supplying condensate to pump 521. The pump recirculates the condensate by delivering it to tube 498 at the top of the unit. An overflow tube 532 is also provided in member 499 to limit the level of collected condensate. A gas seal arrangement 534 surrounds shaft 510 at the bottom of member 499. This arrangement constitutes a welded standpipe with a cap secured by bayonet attachment. The standpipe is packed with sealant and self-centering discs within the sealant. This arrangement avoids troublesome alignment of sheet metal structure with the drive shaft.

In operation, the motor 504 drives shaft 510 by means of the belt and pulley arrangement in compartment 507. Rotation of the shaft causes the squirrel-case assembly to rotate along with exhauster fan 529 which draws hot gases (i.e. waste gases from a burner or boiler, etc.) into inlet 492 and through annular flange 495. The entering gases are propelled radially outward by the tabular sections 525 of blades 523 atop the uppermost disc 522. Blades 523 create a vigorous tangential flow component in these gases which are also influenced by the longitudinal flow effect of exhauster fan 528. The net flow, therefore, is in a helical path along the secondary fluid flow tube 482. This tube, as described in relation to FIG. 22, provides greater surface area than the jacket arrangement 13 of FIG. 1. Moreover, the helical flow path throughout the length of the unit assures continuous contact of the heated gases with the tube 482 which serves as the heat transfer surface for the unit. The longitudinally-extending blades 523 prevent the backwash or recirculation of the gases along the center drive shaft 510 which avoids excessive temperatures at the shaft. The shaft can therefore be made of a lesser temperature-resistant material than is required for the recirculating flow stages of FIGS. 1 and 2.

The system of FIG. 23 has many advantageous features. As described, the system of FIG. 23 maintains a high swirl velocity of the heated gases over the extent of the heat transfer surface. The spacer element(s) 480 (corresponding to element 477 of FIG. 22) help to disrupt the boundary layer of the cooler gases to provide periodic mixing thereof with the bulk stream along the helical flow path. The squirrel-cage structure itself is structurally rigid, being radially and longitudinally supported with large blade area and minimum mass. Loading is distributed uniformly over the central support shaft 498 to minimize nodal point loading. The symmetrical and rigid construction avoids dynamic couplings and critical balancing problems. Uniform blading loading and side thrust components minimize aerodynamic unbalance of system. The heavy and stationary central support shaft avoids resonance problems of thin-walled drive shaft. Captive lubricant around central support and within tubular drive shaft is a further damping impedance factor.

Since the system maintains a positive and vigorous countercurrent heat transfer from the gases to fluid in the tubular path 482, it is well adapted to steam generation within the tubular path. The uniform heat transfer to the tube 482 prevents "chugging" or superheating of steam pockets in the boiler with erratic discharge of water and wet steam. Further, the tubular boiler construction allows high internal pressures with minimum weight of the heating system.

As mentioned, the disclosed system avoids impingement of heat on the central drive shaft. Further, the stainless steel disc elements have low thermal conductivity to the shaft.

It is also within the scope of this invention to use annular rings or helical elements within annular tube 482 for additional internal structural support when used in combination with this type of extended stirring element.

It should be noted that the motor and pulley drive arrangement in FIG. 23 may be used in the same manner as illustrated in FIG. 3 to control not only the shaft speed (and the parameters controlled thereby) but also the fuel flow rate and condensate flow rate.

A feedback controller, suitable as a variable firing rate replacement for controller 113 of FIG. 2, is illustrated in FIG. 25. It is intended to be disposed in gas feedback conduit 111 to regulate the gas fed back into plenum 17. Conduit 111 is provided with a widened section near its upper end in which the modified controller 540 is disposed. A sleeve 541 in the form of a cylinder with a widened funnel-like upper end, is suspended into conduit 111 from the top of the conduit and provides the only flow path between the conduit and plenum 17. A plug 542, contoured to match the interior configuration of the funnel-like upper part of sleeve 541, is suspended from the top of the plenum into the sleeve by a spring 543. A spring itself is suspended from an adjustment screw 544 extending from the top of the plenum. A rod 546 extends downwardly from plug 542 into the sleeve and cooperates with suitably provided centering studs 545 in the sleeve to maintain plug 542 substantially aligned with the sleeve. By positioning the adjustment screw 544 as desired, plug 542 and the upper portion of sleeve 541 are made to cooperate in providing a flow restriction of desired size for fed back exhaust gases.

A temperature controller unit for a fuel oil fired boiler is illustrated in FIGS. 26, 27 and corresponds to the control described briefly in relation to FIGS. 3 and 16. The control arrangement shown, it will be appreciated, is also applicable to other temperature-controlled systems. Typically, the boiler is fired by fuel supplied by a flow rate motor 556. Motor speed is controlled by a temperature sensing arrangement which measures the boiler fluid temperature and compares it to a pre-set reference temperature. Specifically, a reference temperature setting circuit 551 comprises a voltage divider 561 in which the voltage division is operator-adjustable to select a particular voltage which corresponds to a desired reference temperature. A temperature sensor 552 includes a temperature-responsive impedance 562 and associated bias circuitry for providing an output voltage which is a predetermined function of the temperature sensed by impedance 562. The temperature responsive impedance 562 is used to sense the temperature of the boiler fluid. A voltage comparator circuit 553 includes a differential operational amplifier 563 which provides an output voltage proportional to the difference between the voltage provided by circuits 561 and 562.

The speed of motor 556 is sensed by a tachometer, the output signal from which is integrated by integrator 568 and fed to one input of another voltage comparator circuit 554. The other input to circuit 554 is supplied by voltage comparator 553. Voltage comparator 554 includes a differential operational amplifier 564. The output signal from comparator 554 is applied to a motor drive circuit 555 which drives motor 556.

In operation, the output signal from comparator 553 is a voltage which varies in accordance with the difference between the operator-set temperature (circuit 551) and the sensed boiler fluid temperature (circuit 552). If the boiler fluid temperature is equal to the pre-set temperature, the output voltage of circuit 553 is zero. If the boiler fluid temperature is above or below the pre-set temperature, the output voltage from circuit 553 is proportional to the temperature difference. Thus, as the temperature of the boiler fluid decreases below the pre-set temperature, the output level from comparator 553 increases, increasing the output levels from comparator 554 and motor driver 555 to thereby increase the motor speed. As the speed of the motor increases, the fed back input to amplifier 564 from the tachometer 557 increases to reduce the output level from amplifier 564. The feedback loop comprising circuits 554, 555, 556 and 557 therefore functions to maintain the speed of motor 556 proportional to the output level from circuit 553 (i.e. proportional to the sensed temperature). Another feedback loop, comprising circuits 551 through 556, maintains the boiler fluid temperature equal to the operator-selected temperature by automatically controlling the flow rate of fuel to the boiler. A similar feedback loop may be employed to control burner flame efficiency by substituting a fuel-air mixture control for the flow rate motor and by substituting a photo-sensitive detector, responsive to the desired flame color, for the temperature sensor.

A similar approach may be used to provide a variable firing rate heat exchange heating system. Specifically, as described above, the apparatus of FIG. 2 (or FIGS. 4, 5, 8 and 11) may be converted from fixed-point firing rate operation to variable firing rate operation by substituting feedback controller 540 of FIG. 25 for controller 113. An alternative to using mechanical feedback control (i.e. controller 540) to achieve variable firing rate operation is to use an electronic arrangement such as that illustrated in FIG. 28. A flow set circuit 571, in the form of a voltage divider or the like, permits the operator to select the desired firing point. A flow sensor 572 senses the flow rate of the throughput through the system (e.g., at inlet 22 or outlet 274 of the system in FIG. 12 or inlet 492 or outlet 530 in FIG. 23, etc.) and provides a voltage proportional to that flow rate. Comparators 573 and 574 and motor driver 575 correspond to their counterparts 553, 554 and 555, respectively, in FIG. 26. The drive motor 576 represents the main drive motor for shaft 27 (FIG. 11) or motor 504 for shaft 510 (FIG. 12), etc. Speed sensor 577 senses the rotational speed of the drivenshaft and provides a proportional feedback voltage to comparator 574.

Operation of the circuit of FIG. 28 is directly analogous to operation of the circuit of FIG. 26. The operator can select the firing point by simple adjustment at flow set circuit 571 and the system responds accordingly by changing the motor speed.

It should again be noted that any desired system parameter can be used to control the speed of motor 576. Thus, pressure, fuel flow, flame color, moisture content of the primary fluid, or concentration of any constituent component of the primary fluid may be so used; it is only necessary to provide an appropriate sensor for that parameter in place of sensor 572.

Another feedback approach to obtain variable firing rate would be to mechanically control the position of the primary fluid inlet damper (e.g. damper 266,, FIG. 11) instead of the speed of the motor. Control may be had in response to any of the aforementioned parameters.

Burner, heat exchanger, economizer and gasifier embodiments described hereinabove relate to downward flow of the primary fluid. It is to be understood that in many applications an upward flow of primary fluid may be advantageous. A stirred heat exchanger according to the present invention in which upward flow is employed is illustrated in FIG. 29. More specifically, a heat exchanger shell 601 is a thin-walled hollow cylinder fabricated from thin sheet metal stock, preferably stainless steel when use with low temperature combustion products is contemplated. An upper blower housing 602 sits atop shell 601 and is preferably integral with the shell. Housing 602 is a flat cylinder of somewhat greater diameter than shell 601 and includes a tangentially-oriented exhaust flue 603. It should be noted that flue 603 need not be tangentially oriented; rather it may be radially or axially oriented. A bearing support structure 604, comprising a vertically-oriented tube with flanged ends, is secured atop blower housing 602. Secured to the upper flange of bearing support 604 is bearing assembly 605. Bearing assembly 605 includes a bearing 606, bearing cup 607 and a plurality of tension springs 608 (three or more) which are adjustable to: center a drive shaft 609 with respect to the bearing support 604 and shell 601; impose an end thrust loading on shaft 609; avoid critical bearing alignment and starting torque problems for the driven shaft 609. A floating baffle 610 is disposed in bearing assembly 605 and surrounds shaft 609 at a location below bearing 606. The baffle has a clearance fit about shaft 609 and provides a self-centering and self-sealing action with respect to the bearing support.

Drive shaft 609 extends longitudinally through shell 601 into bearing assembly 605 above the shell and into an open-sided base support structure 611 below the shell. A lower flanged bushing 612 is fixedly secured to shaft 609 proximate the lower end of shell 601. The flanged portion of bushing 612 supports a squirrel cage rotor assembly comprising a plurality of longitudinally-spaced discs 613 which fit about shaft 609 and extend radially therefrom. A stud 614 projects upwardly from the flanged portion of bushing 612 through a suitably provided hole in the lowermost disc 613 which rests on that flanged portion. Stud 614 serves to index and anchor the squirrel cage rotor assembly to the shaft. An upper collar 615 is fixedly secured about shaft 609 at a location in blower housing 602 atop the uppermost disc 613 and serves to limit said movement of the rotor assembly along the shaft.

A plurality (e.g. eight or nine) longitudinally-extending blades 616 are secured to each of discs 613 proximate the disc edges. The blades extend radially from the discs toward the wall of shell 601, terminating just short of that wall, leaving approximately one- to three-sixteenths of an inch clearance. The blades 616 are fabricated from thin stainless steel or inconel screen material (e.g. 20 mesh) and are preferably radially serrated at 617 to minimize power loss should there be inadvertent contact between a blade and the wall of the shell 601 during rotor rotation. The uppermost portion of each blade 616 is extended radially outward within blower housing 602 to provide exhauster blading 618. Blading 618 exhausts gases out of the blower housing via exhaust flue 603. The lowermost portion of each blade 616 extends below the lowermost disc 613 to form inlet blading 619 which provides radial pumping of gases into the heat exchange region. Since the static pressure is substantially constant along the blades 616, the pumping action of the inlet blading 619 is effectively additive to the exhauster blading 618.

A flue pipe adapter 620 is disposed in base support structure 611 and takes the form of a pipe, the top of which extends above the structure 611 into the bottom of shell 601. The annular region defined between the wall of shell 601 and the upper portion of the pipe adapter 620 serves as a first condensate trap 621 located within the heat exchanger. This first condensate trap collects a small amount of liquid condensate and makes it available during start up to permit a relatively fast response rate. A second condensate trap 622 is located in the base support structure at the bottom of flue pipe adapter 620. Following shut-down, excess condensate overflows trap 621 and falls into trap 622 from which it can be drained via drain pipe 623. A standpipe 624 is disposed in flue pipe adapter 620 and receives the drive shaft 609 so that the shaft and its lower bearing support 625 are isolated from the condensate in trap 622. The standpipe also serves to thermally shield the drive shaft 609 from induced combustion products entering the flue pipe adapter via a radially extending inlet pipe 626.

A drive motor 627 is supported in base support structure 611 and, by means of a belt and pulley drive arrangement 628, rotatably drives shaft 609 about its longitudinal axis. An annular cover plate 629 is secured at the top of blower housing 602 and is removable to provide access into shell 601 so that the squirrel cage rotor can be serviced and removed. Resilience of the exhaust blading 618 facilitates such removal, even though such blading may be of larger diameter than the opening covered by cover plate 629.

When the rotor assembly is rotatably driven by motor 627, its generally symmetrical configuration allows it to run smoothly, much like a top without precession. When so driven, the inlet blading 619 and exhauster blading 618 combine to effect a net upward flow through shell 601 of combuston products induced through inlet 626 of flue pipe adapter 620. Superimposed on this net upward flow is a higher velocity tangential flow component introduced by blades 616 in the annular space between the blades and the wall of shell 601. Aside from the advantage of maintaining a high rotative speed in the stirred gases for augmentation of convective thermal transfer, this arrangement reduces film heat transfer resistance of recirculating condensate at the wall of shell 601. Condensate droplets are induced into the wake region of each blade and more intimate contact is provided with the gases undergoing heat transfer.

It is important to note that in the embodiment of FIG. 29 there is no need for a separate exhauster element, the exhauster blading 618 merely being an extension of the stirring blades 616. Further the need for a special housing and separating baffle for the exhauster is eliminated. Moreover, the entire length of shell 601 is more efficiently utilized with this arrangement.

It is noted that no closed flow path for secondary fluid is shown in FIG. 29 (such as, for example, the jacket 13 of FIG. 1 or helical tube 442 of FIG. 22). This is to emphasize the fact that the secondary fluid may be a body of fluid surrounding shell 601. Of course, either the jacket or helical tube may be utilized with this embodiment if desired. It is important to note too that heat transfer may be effected either from the primary fluid or vice versa.

Also important is the fact that the upflow embodiment of FIG. 29 takes advantage of the natural tendency of combustion products to flow upward, thereby reducing the energy requirements to operate the heat exchanger.

A system having the same basic structure as that illustrated in FIG. 29, but utilized as an air conditioner, is illustrated in FIG. 30.

More specifically, a heat exchanger shell 701 is a thin-walled hollow cylinder. An upper blower housing 702 sits atop shell 701 and is preferably integral with the shell. Housing 702 is a flat cylinder of somewhat greater diameter than shell 701 and includes plural exhaust openings 703. A bearing support structure 704, comprising a vertically-oriented tube with a flanged upper end is preferably integral with the top of blower housing 702. Secured to the upper flange of bearing support 704 is bearing assembly 705. Bearing assembly 705 includes a bearing 706, bearing cup 707 and a plurality of tension springs 708. A floating baffle 710 is disposed in bearing assembly 705.

Drive shaft 709 extends longitudinally through shell 701 into bearing assembly 705 above the shell and into an open-sided base support structure 711 below the shell. A lower flanged bushing 712 is fixedly secured to shaft 709 proximate the lower end of shell 701. The flanged portion of bushing 712 supports a squirrel cage rotor assembly comprising a plurality of longitudinally spaced discs 713 which fit about shaft 709 and extend radially therefrom. A stud 714 projects upwardly from the flanged portion of bushing 712 through a suitably provided hole in the lowermost disc 713 which rests on that flanged portion.

A plurality (e.g. eight or nine) longitudinally-extending blades 716 are secured to each of discs 713 proximate the disc edges. The blades extend radially from the discs toward the wall of shell 701, terminating just short of that wall, leaving approximately one- to three-sixteenths of an inch clearance. The blades 716, for this embodiment may be fabricated from neoprene strips, or an equivalent light-weight and resilient material. The blades are preferably radially serrated at 717 to minimize power loss should there be inadvertent contact between a blade and the wall of the shell 701 during rotor rotation. The uppermost portion of each blade 716 is extended radially outward within blower housing 702 to provide exhauster blading 718. Blading 718 exhausts gases out of the blower housing via exhaust openings 703. The lowermost portion of each blade 716 extends below the lowermost disc 713 to form inlet blading 719 which provides radial pumping of gases into the heat exchange region.

A lower bearing support tube 720 is disposed in base support structure 711 and takes the form of a pipe, the top of which extends above the structure 711 into the bottom of shell 701.

A drive motor 727 is supported in base support structure 711 and, by means of a belt and pulley drive arrangement, rotatably drives shaft 709 about its longitudinal axis.

A baffle member 730 surrounds shell 701 in spaced relation therefrom to provide an annular space between the baffle member and shell. Baffle member 730 is porous to water, preferably being fabricated from a screen-like material. Wick material 731 is disposed in the annular space between shell 701 and baffle 730. This wick material may be fabricated from any of the materials which are currently used in heat pipes, such as glass fibers, beads, felts, powders, foams, and grooved-surface solids. Baffle 730 extends below the underside of blower housing 702 and includes an inlet tube 732 through which water may be introduced into the annular space between baffle 730 and shell 701. An outer housing 733 annularly surrounds baffle 730 and shell 701 and includes a radially-extending egress pipe 734 which serves as a tangential feed for a vapor exhaust system 735. The vapor exhaust system may be a conventional steam jet exhauster of the type illustrated wherein a jet of pressurized steam, received at inlet 736, aspirates the water vapor exhaust fed tangentially about the jet via pipe 734 and issues the steam and exhausted water vapor to ambient an outlet 737. Alternatively, the vapor exhauster system 735 may comprise a more recently developed regenerative mechanical exhauster device. In either case, the function of system 735 is to reduce the boiling point of water recirculating along wick member 731 and remove heat from the flow of stirred air.

Water which collects at region 738, at the bottom of the annular space bounded by housing 733, is delivered to a water transfer pump 739 which is driven by motor 727 via a pulley and belt arrangement. Water discharge from pump 739, along with any externally supplied water need for system operation, is delivered to inlet 732 from which the water is distributed to the wick material 731. The discharge from pump 739 and the make up water, when so distributed along the wall of shell 701 by wick 731, serve to: maintain maximum continuous surface area for augmented convective heat transfer; avoid need for auxiliary heat exchangers for chilled water-to-air requirements; and minimize accessory power requirements of the system. The wick 731 uniformly distributes the water into intimate contact with the outer surface of shell 701. In addition, the wick serves to: provide nucleation centers for vapor generation; generate an extended interface for vapor emission; and maintain essentially isothermal conditions on the vapor side for rapid and efficient exchange of latent heat to the boiling water from the cooling air flow.

In operation, air to be cooled is induced into the bottom of shell 701 through base support structure 711 by net upward flow component provided by exhauster blading 718 and inlet blading 719. The relatively warm air is forced into intimate swirling contact with inner surface of shell 701 in the manner described above and relinquishes its thermal energy to the water distributed along the outer surface of the shell by wick 731. The action of vapor exhausting system 735 in reducing the boiling point of the water permits the water at the shell wall to evaporate, thereby further cooling the primary air flow which is delivered via outlets 703 to the space to be conditioned. Excess water collected at 738 is returned to the system via pump 739 as described above. The water vapor produced in the annular space inside outer housing 733 recirculates internally along the length of the wick (as shown by arrows 741) to maintain isothermal conditions along the length of this vapor jacket.

As mentioned above, heat transfer may be accomplished with the present invention either from the primary fluid to the secondary fluid or from the secondary fluid to the primary fluid. An embodiment utilizing the latter transfer direction is illustrated in FIG. 31. Since much of the structure in FIG. 31 is the same as that in FIGS. 29 and 30, the same reference numerals are employed to designate like structure, which structure is not described in detail at this point. The primary distinguishing structural feature of the system of FIG. 31 versus that of FIG. 29 resides in the presence of a helical tube secondary flow path 750 disposed adjacent the inner surface of shell 601 and wick 751 disposed between the spaced sections of helical tube 750. The wick is held in place by baffle 752 which is previous to water. The wick 751 may be any of the materials mentioned in relation to wick 731 of FIG. 30.

In operation, induced ambient air (arrow 753) enters the bottom of shell 601 through base support structure 711 and is directed upward by the combined action of inlet blading 619 and exhauster blading 618. The air is swirled through the annular space between blades 616 and the shell 601 by the rotating blades. Hot secondary fluid is introduced into tube 750 at inlet 754 near the top of shell 601; the hot fluid egresses from outlet 755 near the bottom of the shell. The hot secondary fluid may be derived from industrial process, from heat pump, etc. The upflowing primary fluid within shell 601 is swirled about the enclosure periphery in intimate contact with tube 750 so that thermal energy is transferred to the primary fluid from the secondary fluid. Water vapor in the primary fluid (ambient air) tends to condense and eventually collect at trap 621 at the bottom of the shell and is recirculated by pump 739 at inlet 732. Wick 753 provides a film-like contact between the recirculating water and tube 750 for maximum heat transfer. In addition, wick 753 aids in the latent heat mechanism of evaporation cooling and recondensing of water to render the thermal transfer process more efficient. Further, the wick provides minimum loss of water droplets due to centrifugal action of the stirring element.

Typical material for the various components of the burner/heat exchanger of the present invention would be as follows: shaft 27 (and its counterparts) may generally be carbon steel or some metal with similar properties; the various radial blades may generally be carbon or stainless steel, with stainless being preferred because it spot welds more readily; the secondary fluid jacket or helical tube may be any good thermal conductor such as carbon steel, copper, aluminum, etc.; the longitudinal blades may be stainless steel, preferably in a mesh or screen form to keep the blades lightweight.

It will be apparent to those skilled in the art that when the present invention is employed as a burner and gaseous fuel is used, fuel flow modulation may be achieved with a conventional demand regulator in the gas feed line. The demand regulator may be adjusted manually or automatically according to the principles described herein. The fuel gas may be induced into the system in a conventional manner using a compressed air jet through a venturi-type induction orifice. In such a system configuration, increased speed of the exhauster creates an increase in the air jet velocity with a proportionate increase of fuel gas inflow. A well known problem in gas burners (and oil burners, for that matter) is the inefficiency resulting from reliance on natural convection to achieve desired primary fluid circulation. As seen from the foregoing, the present invention overcomes this problem by providing a controllable circulating flow.

What has been described above is a process and apparatus in which a single, variably controlled modular unit can be used for different functions. Stated simply, the single unit operates differently and performs different functions in each of its various operating modes. The operating mode can be selected at the factory or in the field by the user as desired. The four operational modes are as follows:
1. complete oxidation and control system for combustion of fuel;
2. complete oxidation and control system for combustion of solid, liquid or gaseous by-products of a heating system coupled to the single unit;
3. partial oxidation and control system for thermal heat recovery and optimization of performance of heating systems coupled to the unit; and
4. augmented convective heat exchange and control system for thermal heat recovery and optimization of performance in coupled heating systems.

The versatility and feasibility of the system is apparent from the foregoing description. The system can take in fuel gas, which is unburned fuel or partially burned fuel, and burn it completely, or it can take in completely burned exhaust by-products, which are inert gases containing heat, and recover the thermal energy; or it can take in any combination of fuels to be burned and inert gases carrying heat. By burning the primary fluid the system can, in its waste heat recovery mode, cool the gases and change them from active flammable materials to inert materials; or these gases can be vented to atmosphere in a cooler state as a result of controlled heat transfer.

It should be noted that this invention provides several unique and valuable features in the field of heat transfer. In nearly all residential and commercial boilers, the convective mode of heat transfer is predominant, particularly in the final phases of the heat transfer process. This is true particularly in blue flame devices or other systems which operate at lower flame temperature levels where the radiation factor is relatively small. The trend toward limiting nitrous oxide pollutants has accentuated this problem and emphasized the need for a more efficient convective heat transfer particularly in the final phases of the heat exchange process. In the present invention the film resistances which characterize all heat exchanger products involving so-called gas film, the soot film and the oxide scale film are minimized by this heat exchange mechanism. Specifically, by utilizing high swirl velocities, on the order of magnitude of the tip speed of the rotary blades, the gas velocity along the film on the heat transfer wall 12 is abnormally high. It has been demonstrated theoretically and experimentally that this condition favors an abnormally high convective heat transfer mechanism. The film under these circumstances is highly turbulent and very thin, creating a low film resistance. When a soot layer is involved, the transfer of heat through such a layer is generally very difficult. This invention, when utilized as an economizer for existing heating appliances, allows the reduction of this film resistance by the same mechanism of abnormally high turbulent heat transfer. Specifically, the high retentive speed of the rotor, on the order of 1500 to 2500 R P M or more, is sufficiently fast to break up the film resistance. Very low speeds may also be used and will in fact effect heat transfer, but not nearly as efficiently as the higher speeds.

Another advantage of the present invention is the centrifugal separation of water from the combustion gases which go to the flue. Aside from eliminating the "steam plume" problem, the invention requires much less accessory power for its exhauster fan. The exhausting of cool flue products, particularly with the condensible portion removed, substantially reduces the accessory power requirements relative to conventional prior art practice.

Another advantage of the invention is the generation of an oil film on the heat exchange surfaces, particularly in the higher temperature zones. The presence of the oil film, even though it may be only of molecular depth, is a very important factor in terms of heat transfer from condensate. The film permits drop-wise condensation to occur rather than film-wise condensation. An increase of at least five times in thermal transfer rate is achieved by drop-wise condensation versus film-wise condensation. In drop-wise condensation the film of oil prevents large drops of water from adhering, minimizing the water film on the surface so that more effective bare surface is exposed for direct heat transfer without the water film resistance. A very important aspect of this invention is that it permits the injected oil to form a film of oil which is thinner and more uniform that it otherwise would be. In other words, the injected hydrocarbon, which in most cases may be fuel or fuel oil in minute quantities, is caused to atomize and uniformly distribute itself in a thin film on the inner surface of wall 12, reducing the surface retention of any impinging water and accounting for the abnormally high heat transfer coefficients which occur under these conditions. This means by which the thinnest possible and most uniform deposit of film oil is obtained is the same means employed to obtain more efficient recovery of the latent heat of water vapor as described above; that is, the recirculation of the primary fluid in each stage or zone (in the radial blade embodiments) and the continuous tangential sweeping of the heat transfer surface by the primary fluid (in the longitudinal blade embodiments).

it is very important to note that although all of the blade elements shown in the radial blade embodiments described herein are driven from the same rotating shaft and at the same speed, they need not be of uniform blade dimensions or shape. In fact, as indicated in FIG. 11, the top blades 248 may be smaller than the other sets of blades. The reason for this is that higher temperature gases have a higher viscosity although their specific density is lower. In the cooler bottom zones, the gases have lower viscosity and a higher specific density. This invention uniquely provides a uniform convective heat transfer coefficient over the available heat transfer surface. In other words, aside from the continuous stirring energy, it allows the use of larger diameter impeller blading, for example, near the end of the heat transfer process to increase the effective flow velocity in this area as contrasted with the earlier phase of the process. No prior art heat exchangers accomplish this function. Prior art devices, for example, involving fire tube boilers or the like which rely upon convection coefficients, have a decreasing coefficient over the length of the heat exchanger and consequently exhibit a serious loss in performance over the length of the heat exchanger. Such is not the case in the present system. Therefore, the present system is able to operate with a minimum heat exchange area, minimum costly or critical materials of construction and high performance per unit of volume.

With the present system one has the option of varying the rotor dimensions of the radial blades so as to get the maximum heat transfer in each of the zones despite the varying conditions of gas temperature and pressure in those zones. The importance of this feature from a commercial standpoint resides in the following: If one customer desires an economizer which will attach to the output of a combustion turbine operating at 2000° F., and another customer wants an economizer of the same shape and capacity which will have an exhaust of only 500° F., the same basic heat exchanger can be used for both. Both heat exchangers will work at equal efficiencies for both applications just by changing the physical dimensions of the zones, by putting stator elements at different places, by changing the design and dimensions of each of the rotors for each zone and by adjusting the rotary speed of the system.

In this invention it may be noted that the residence time can be changed by changing the effective volume of the heat exchange apparatus for a given primary fluid throughput. Likewise, the intensity of the convective heat transfer can be varied by the rotation speed for a given dimension of the apparatus and throughput. In all cases, the residence time of the gases undergoing heat transfer is large relative to conventional practice.

The present invention system permits cascading of heat exchangers and permits the use of relatively large diameter-to-length ratios to vary the effective residence time. This feature is extremely important in burning inferior fuels. Generally, the present invention provides a variety of such parameters which can be selected to facilitate combustion as the fuel varies. For example, the rotational speed of the blades may be varied. It should be noted that the physical residence time of a particle of gas undergoing hat transfer in the system is a function of the ratio of the physical internal dimensions to the primary fluid throughput flow. On the other hand, the rotational speed of the blades alters the convective heat transfer coefficients in substantial proportion to the blade speed so that for any given heat transfer requirement, for a given residence time or any fixed geometry this requirement can be satisfied by a given blade speed. Adjustment of these parameters permits burning of inferior fuels. There is an additional feature in this regard which should be mentioned. In FIG. 11 there is illustrated a nozzle 256 for injecting supplemental fuel in addition to injection of primary fuel. If coal is being burned, it may be desirable to inject oil as a supplemental fuel; this would aid the combustion process. In the same way, one could inject propane as a supplemental fuel. Since there is control over the rate at which the supplemental fuel can be fed, and since one can measure the percentage of combustion taking place by detecting unburned carbon monoxide, it is a simple matter to have ganged controls which simultaneously do all the things needed to increase the efficiency of combustion. In other words, if a departure from stoichiometric or other desired conditions is detected along with a variation from a predetermined percent of tolerable carbon monoxide in the exhaust gases, action may be taken to correct that deviation. The corrective action is to increase the rate in which supplemental oil is being injected and/or to increase the rotational speed of the motor.

Another option of the present system for dealing with inferior fuels is to employ a blower to force air into the heat enclosure under pressure. The damper 266 of FIG. 11 may be used to increase the pressure at which the system is operating and thereby increase the rate of combustion.

In burning inferior fuels it is necessary to keep the temperatures inside the burner/heat exchanger below the fusion point of ash. This avoids the deposition of slag on the walls of the burner/heat exchanger. Provision for removal of the ash by a centrifugal separator is shown in the embodiment of FIG. 11.

When the system is used as a gasifier there must be incomplete combustion and generation of a fixated fuel gas. The portion of the combustion which is completed, however, represents thermodynamic waste unless there is an efficient heat exchanger for saving the heat. The present invention provides an efficient heat exchanger which cooperates with a blue flame gasifier. The heat can be stored and used as desired. For example, electric utilities are presently working on a device which will be a storage battery for heat which can, on demand, convert the heat to electrical energy. Such an application is ideal for the present invention. A kiln is another good example of an industrial application in which waste heat would not be wasted if converted by the present invention. The kiln waste heat would be returned right back into the kiln by the heat exchanger.

Another principal advantage of the present invention is that it is very easy to modulate the temperature. That is, the temperature may be increased and decreased almost instantly on demand. Most oil burner and coal systems have a very slow response time to effect temperature change. On start-up, it takes conventional systems a long time to achieve operating temperature and they are very inefficient. The present system is as efficient on start-up as it is after it is during continuous operation.

It should be noted that the present burner/boiler type has a very low mass to volume ratio. In other words, the boiler mass and inertia of the systems are abnormally low. This is advantageous since this system is immediately responsive to the thermostatic demands of its control system and its accessory components are not subjected to extended "thermal soaking" following shutdown.

Another advantage of the present invention is that there is no heat loss when the device is not in use. In conventional systems the chimney or flue is always open and therefore the heat provided inside the building is constantly escaping to the atmosphere. This may be prevented by going to the expense and trouble of putting in an automatic device to close the chimney or flue when the heating apparatus is not in use. The present system accounts for this automatically. When the blades are not rotating, the mass flow of air through the device is nil or very close thereto. Therefore, when the device is used as an economizer to be added on to an existing heating system, it has the same advantages as a flue-closing device with the elimination of "standby" losses.

The disclosed invention may be located outside of a home or other building, completely avoiding existing chimney and flue requirements. The exhauster blades 38, etc., are designed to handle the effluent gases which are completely cooled and therefore minimize the power requirements of the system. This is not the case with existing induced draft burner devices. When located outside of the home or building, the diffuser losses associated with conventional exhauster designs are completely avoided and the gases are allowed to discharge directly into the atmosphere without the cost and complexity of flue ducting.

The pressure differential which is established by this system allows the use of so-called "balanced flue" arrangements with the induction of combustion air through small ducting to a burner device which is located within the home. This arrangement is highly desirable since the make-up air required for combustion is not induced through a leakage into the home with high thermal losses and poor control means. Existing heating systems oil burners and gas burners are not able to induce combustion air reliably through ducting in this manner. Apart from the thermodynamic advantages of a balanced flue system, this invention offers safety features not available with existing systems. It allows the heating system to be fully sealed and, thereby, prevents leakage of toxic gases into living quarters.

The disclosed invention is truly a "Retrofit Sytem" for energy recovery with all existing heating systems. From a federal energy control standpoint, it is the only system which allows immediate adaptation to existing heating units without modification of basic operating performance and with means for allowing substantial recovery of the energy which is presently wasted by these systems.

Prior art economizer products or waste heat boiler products which are used in industry to recover heat from process applications invariably involve extended heat transfer surfaces with relatively low convective heat transfer coefficients. The difficulty in adding extended surfaces of corrosion resistant material is insurmountable and requires continual maintenance to avoid fouling problems. The present invention avoids the so-called flue balancing and other maintenance problems which characterize existing waste heat boilers. This invention fully utilizes counter-current heat exchange, so that the discharging gases are effectively cooled to a few degrees above the available cooling water temperature or heat sink temperature. This is a requirement which is not satisfied by prior art heating systems or reboiler or economizer products. In order to recover the latent heat which is available in the condensible portion of the flue products, it is necessary that these products be chilled substantially below the dew point temperature of the condensible products. This cannot be achieved unless the system incorporates counter-current heat exchange and a temperature differential allowing chilling of the products to these temperature levels. The present invention allows forced recirculation of the cooling medium and counter-current heat exchange with the greatest thermodynamic advantage possible for the system application.

It may be noted that the invention incorporates a number of failsafe features. When a single motor is used to drive the exhauster, turbulator, and fuel pumping components, a failure of the motor or drive means prevents fuel flow to the basic burner. The unit operating as an economizer provides an induced draft to the basic boiler or furnace apparatus so that any leakage within the interconnecting ducting allows only internal leakage, due to the induced draft and negative internal pressures which are involved; toxic flue products are therefore not vented into living quarters under these conditions.

Prior art heating systems have high thermal losses during shutdown. In other words, the natural convection which occurs through oil and gas fired units as well as through any proposed coal or wood burning units, creates serious heat losses during the shut-down period of the system. An existing heating system which claims to operate with an 80% thermal efficiency achieves this efficiency only during continuous operation but overall it may typically provide an average thermal efficiency of 60%. Since there is no natural draft through the present economizer unit when coupled to a heating system, shut-down losses are completely avoided and the thermal efficiency is not impaired by cyclic operation.

A characteristic feature of the present invention involves the maintenance of high convective heat transfer coefficients throughout the entire heat exchange process. This is not possible with the prior art heat transfer systems involving the use of high pressure fans and the like for driving the heat transfer gases over surfaces. In conventional systems the gases are not maintained at constant velocity and a serious decay of heat transfer capability is inherent during the process of heat transfer. It must be noted that the most difficult aspect of convective heat transfer occurs as the process is progressed to a lower temperature differential where the greatest need for high convective heat transfer coefficients exists. The present system uniquely maintains a constant coefficient throughout the entire heat transfer path.

It should be noted, that the energy recovered by the present economizer is an additive to the basic heating system. Assuming that the basic system operates at a 60% thermal efficiency on a continuous basis, 40% of the energy which is supplied to the system is rejected as flue products. When the disclosed economizer recovers 80% of this energy, it represents 32% of the total energy input and an overall system efficiency of 60+32 or 92%. Assuming that the basic system operates at 80% thermal efficiency with 20% of the heat energy normally rejected, the modified system has an efficiency which is 96%.

Apart from the foregoing advantages attributable to both the radial and longitudinal blade embodiments, the longitudinal blade embodiments have advantageous features of their own. The continuous temperature gradient (i.e. grandual temperature drop in primary fluid from inlet to exhaust) permits production of steam or superheated steam from water without any cold spots that bring about condensation. This is done in a simple and efficient boiler structure which provides for reliable Rankine cycle heat pump drive means and the like. Moreover, the primary fluid is restricted to a narrow annular path between the blades and the heat transfer surface wherein it can efficiently transfer its thermal energy to the secondary fluid. Further, the helical path followed by the primary fluid results in a long residence time in the heat exchanger, thereby providing optimum opportunity for recovery of thermal energy from the primary fluid.

It is clear that if the insulating shell 243 of the burner of FIG. 11 is removed, the system can be used as a heat exchanger. This points up the extreme flexibility of the invention in its use as a burner, heat exchanger, economizer, etc. Further, the basic cylinder 11 of FIG. 1 (and in the other embodiments) may comprise multiple end-to-end cylinders, thereby permitting lengthening or shortening the basic system as required for particular applications.

Whereas the embodiment of FIG. 3 shows the basic drive motor being controlled by a thermostat, it is clear that motor control can be effected by other sensed parameters, depending upon the application. For example in burner or economizer applications it is desirable to monitor the oxygen content or the pollutants in the exhausted gases. This can be done in the flue with electrical controls provided for adjusting drive motor speed to change the combustion characteristics (in the case of a burner embodiment) or the heat transfer characteristics (in the case of an economizer embodiment). Other parameters, such as ambient humidity, time of day, etc., can be used to control the drive motor.

Another advantageous feature of the present invention arises when it is used as an economizer in conjunction with a boiler furnace or other combustion device. Because of the built-in exhauster in the economizer, the boiler and economizer need not be operated at the same pressure.

Another feature of the present invention resides in the fact that efficient stirring of the primary fluid is achieved without alternating rotation direction of the blades. This provides for energy saving since considerably greater energy is required to repeatedly start and stop the drive motor than to let it run continuously.

While I have described and illustrated various specific embodiments of my invention, it will be clear that variations of the details of construction which are specifically illustrated and described may be resorted to without departing from the true spirit and scope of the invention as defined in the appended claims.

I claim:

1. In a thermal system, apparatus for increasing convection efficiency, comprising:

an enclosure having an inlet opening, an outlet opening, and a predetermined longitudinal axis;

means for supplying a substantially gaseous primary fluid at said inlet opening;

means for establishing a static pressure differential between said inlet and outlet openings to establish a continuous net flow of primary fluid longitudinally through said enclosure;

a thermal transfer wall exposed to said primary fluid in said enclosure;

means containing a secondary fluid in flow isolation from said primary fluid and in thermal conduction relationship with said primary fluid through said thermal transfer wall; and rotatable means for mechanically stirring said primary fluid in said enclosure, said rotatable means including drive means and blade means driven by said drive means for imparting at least one rotative flow component to said primary fluid along said thermal transfer wall with a flow rate substantially greater than the primary fluid net flow rate from said inlet opening to said outlet opening caused by said pressure differential.

2. The apparatus according to claim 1 wherein said apparatus is a heat exchanger and further comprises:

a closed flow path;

secondary flow means for flowing said secondary fluid through said closed flow path;

said closed flow path including at least said thermal transfer wall positioned in the path of said rotative flow component of said primary fluid, said thermal transfer wall being fabricated of a material which readily transfers thermal energy between said primary and secondary fluids and provides flow isolation between said fluids.

3. The apparatus according to claim 2 wherein said closed flow path comprises an annular region surrounding said enclosure and having a radially inner wall which serves as both said thermal transfer wall and as a peripheral wall for said enclosure.

4. The apparatus according to claim 2:
wherein said pressure differential establishes a net flow of said primary fluid in a first longitudinal direction through said enclosure; and
wherein said secondary flow means comprises means for establishing a net flow of said secondary fluid in a second longitudinal direction through said enclosed flow path, said second longitudinal direction being opposite said first longitudinal direction.

5. The apparatus according to claim 1 wherein said rotatable means comprises:
a rotatable shaft extending along said longitudinal axis;
a plurality of discs extending radially from said shaft at a respective plurality of spaced longitudinal positions along said shaft;
wherein said blade means are plural blade members extending longitudinally through said enclosure and secured to each of said discs proximate the disc peripheries; and
means responsive to said drive means for rotating said blade members and discs together with said shaft.

6. The apparatus according to claim 5 wherein:
said enclosure is generally cylindrical;
said longitudinal axis is the central longitudinal axis of said generally cylindrical enclosure; and
each of said blade members has a radially outermost edge which is substantially parallel to said longitudinal axis.

7. The apparatus according to claim 6 wherein said means for establishing a pressure differential comprises exhauster blade means secured to said rotatable shaft in said enclosure for forcing fluid flow from said inlet opening to said outlet opening.

8. The apparatus according to claim 7 wherein said rotatable means comprises:
a rotatable shaft coupled in driven relationship with said drive means and extending along said longitudinal axis;
wherein said blade means includes a plurality of blade assemblies secured to said shaft at a respective plurality of spaced positions along said shaft, each blade assembly comprising:
plural blade members extending radially from said shaft; and
means for fixedly positioning said blade members relative to said shaft to assure common rotation of said blade members with said shaft about said longitudinal axis.

9. The apparatus according to claim 8 wherein said blade members are substantially longer in the radial direction than in the longitudinal direction in said enclosure, and wherein each blade member includes a generally flat surface extending parallel to said longitudinal axis.

10. The apparatus according to claim 8 wherein said enclosure is generally cylindrical, wherein said longitudinal axis is a central longitudinal axis of said cylindrical enclosure, and wherein said rotatable shaft is disposed concentrically about said longitudinal axis.

11. The apparatus according to claim 10 wherein said means for establishing a pressure differential comprises exhauster blade means secured to and driven by said rotatable shaft in said enclosure for exhausting fluid flow from said inlet opening through said outlet opening.

12. The apparatus according to claim 8:
wherein said pressure differential establishes a net flow of said primary fluid in a first longitudinal direction through said enclosure; and
wherein said secondary flow means comprises means for establishing flow of said secondary fluid in a second longitudinal direction through said enclosed flow path, said second longitudinal direction being opposite said first longitudinal direction.

13. The apparatus according to claim 1 wherein said rotatable means comprises:
a rotatable shaft extending along said longitudinal axis:
means coupling said shaft to said drive means for rotating said shaft about said longitudinal axis; and
zone-establishing means responsive to rotation of said shaft for establishing a plurality of thermal zones at successive longitudinal locations in said enclosure, said zone-establishing means including:
means for swirling the primary fluid in each zone along a path which includes said thermal wall; and
means for progressively graduating the temperatures in successive zones along the length of said enclosure from said inlet opening toward said outlet opening.

14. The apparatus according to claim 1 wherein said enclosure is oriented with said longitudinal axis extending vertically.

15. The apparatus according to claim 1 operated as an economizer, wherein said means for supplying a primary gaseous fluid in a combustion system and said primary fluid corresponds to hot combustion gases exhausted from said combustion system; said apparatus further comprising:
means for delivering said primary fluid from said outlet opening to the ambient environment; and
means for controlling the net flow of primary flow through said enclosure to control the exhausting of combustion gases from said combustion system.

16. The apparatus according to claim 15 wherein said rotatable means comprises:
a rotatable shaft extending along said longitudinal axis;
a plurality of discs and extending radially from said shaft at a respective plurality of spaced longitudinal positions along said shaft;
wherein said blade means are plural blade members extending longitudinally through said enclosure and secured to each of said discs proximate the disc peripheries; and
means coupling said shaft to said drive means for rotating said blade members and discs together with said shaft.

17. The apparatus according to claim 15 wherein said rotatable means comprises:
a rotatable shaft coupled in driven relationship to said drive means and extending along said longitudinal axis;
wherein said blade means includes a plurality of blade assemblies secured to said shaft at a respective plurality of spaced positions along said shaft, each blade assembly comprising:

plural blade members extending radially from said shaft; and means for fixedly positioning said blade members relative to said shaft to assure common rotation of said blade members with said shaft about said longitudinal axis.

18. The apparatus according to claim 1 operated as an economizer wherein:

said means for supplying a primary gaseous fluid is a combustion system; and said primary gaseous fluid corresponds to the combustion gases exhausted from said combustion system; and wherein said apparatus further comprises means for flowing said secondary fluid through said combustion system, after it has passed through said closed flow path, to utilize thermal energy in said secondary fluid which has been transferred thereto from said primary fluid.

19. The apparatus according to claim 1 wherein said rotatable means is rotatable in one direction only.

20. The apparatus according to claim 1 wherein said primary fluid is a gas which includes water vapor as a part thereof, and wherein said rotatable means includes:

means for condensing said water vapor on said thermal transfer wall;

means for sweeping condensed water back into the rotating primary fluid flow; and means for vaporizing the water swept back into the rotating flow;

whereby to establish a repetitive cycle of condensation and vaporization along said thermal transfer wall.

21. The apparatus according to claim 1 wherein said primary fluid is made up of hot combustion gases and wherein said blade means includes:

a drive shaft, rotatably driven by said drive means, extending longitudinally through said enclosure along said longitudinal axis; and means for forcing said hot combustion gases away from said drive shaft to prevent overheating of the drive shaft.

22. The apparatus according to claim 21 wherein said means for forcing includes said blade means, said blade means including:

a plurality of blades;

means supporting said blades in longitudinally-extending positions in said enclosure, radially spaced from said drive shaft and angularly spaced from one another;

means coupling said drive shaft to said drive means for rotating said drive shaft at relatively high speeds, compared to said continuous net flow, about said longitudinal axis; and means securing said supporting means and blades to said drive shaft for rotation therewith about said longitudinal axis.

23. The apparatus according to claim 22 wherein said drive means rotates said drive shaft in one direction at speeds in excess of 1500 revolutions per minute.

24. The apparatus according to claim 22 wherein said blades, said supporting means and said securing means comprise a separable unitary and substantially rigid structure.

25. The apparatus according to claims 1 wherein said longitudinal axis is oriented vertically, and wherein said outlet opening is disposed below said inlet opening.

26. In a thermal system, apparatus for increasing convection efficiency, comprising:

an enclosure having an inlet opening, an outlet opening, and a predetermined longitudinal axis;

means for supplying a substantially gaseous primary fluid at said inlet opening;

means for establishing a static pressure differential between said inlet and outlet openings to cause said primary fluid to flow continuously through said enclosure;

a thermal transfer wall exposed to said primary fluid in said enclosure;

means containing a secondary fluid in flow isolation from said primary fluid and in thermal conduction relationship with said primary fluid through said thermal transfer wall; and means for establishing a highly turbulent and relatively low thermal transfer resistant film of said primary fluid on said thermal transfer wall in said enclosure, said last-mentioned means comprising rotatable blade means for swirling said primary fluid at high velocities along said thermal transfer wall.

27. The apparatus according to claim 26 wherein said rotatable blade means comprises a plurality of blades rotatable about said longitudinal axis and drive means for rotating said blades in one direction at speeds in excess of 1500 revolutions per minute.

28. In a thermal system, apparatus for increasing convection efficiency, comprising:

an enclosure having an inlet opening, an outlet opening, and a predetermined longitudinal axis;

means for supplying a substantially gaseous hot primary fluid at said inlet opening, said gaseous primary fluid having water vapor therein;

means for establishing a pressure differential between said inlet and outlet openings to cause said primary fluid to flow continuously through said enclosure;

a thermal transfer wall exposed to said primary fluid in said enclosure;

means containing a secondary fluid in flow isolation from said primary fluid and in thermal conduction relationship with said primary fluid through said thermal transfer wall;

rotatable means for mechanically stirring said primary fluid in said enclosure, said rotatable means comprising zone-establishing means for establishing a plurality of thermal zones at successive longitudinal locations in said enclosure, said zone-establishing means comprising:

means in each zone for re-circulating said primary fluid radially from said longitudinal axis, longitudinally along said thermal transfer wall, and radially back to said longitudinal axis, to cause water vapor in said primary fluid to alternately condense on said thermal transfer wall, then be swept away from the wall by the re-circulating primary fluid and then evaporated.

29. Heat exchange apparatus comprising:

an enclosure having peripheral walls extending longitudinally between first and second end walls;

inlet means for admitting a primarily gaseous primary fluid into said enclosure proximate said first end;

outlet means for passing said primary fluid out of said enclosure proximate said second end;

fluid flow-inducing means for establishing a relatively low rate of net flow of said primary fluid through said enclosure from said inlet means to said outlet means;

means for containing a secondary fluid isolated from said first fluid;

energy transfer means for providing thermal energy transfer between said primary fluid and said secondary fluid in said enclosure;

a rotatable shaft having a longitudinal axis extending longitudinally through at least a portion of said enclosure;

blade means responsive to rotation of said shaft for swirling the primary fluid along a path which is bounded at least in part by said energy transfer means; and drive means for rotating said shaft about its longitudinal axis to impart a swirl velocity component to said primary fluid which is much larger than said net flow rate.

30. The apparatus according to claim 29 wherein said blade means comprises a plurality of blade assemblies, each fixed to said shaft at mutually spaced longitudinal locations, each blade assembly comprising a plurality of blades extending radially from said shaft.

31. The heat exchanger according to claim 29 wherein said means for containing comprises:

a flow duct surrounding said enclosure; and means for flowing said second fluid through said flow duct in a direction which is generally opposite to the longitudinal net flow direction of said first fluid.

32. The apparatus according to claim 29 wherein said flow-inducing means comprises exhaust pump means disposed in said enclosure for exhausting primary fluid therefrom.

33. The apparatus according to claim 29 wherein said means for containing comprises a flow path adjacent said peripheral walls for said secondary fluid, said apparatus further comprising means for flowing said secondary fluid through said flow path.

34. The method of recovering thermal energy from combustion gases comprising the steps of:

flowing said combustion gases through an enclosure at a controllable net flow rate;

establishing by means of rotating blades in an enclosure, a helical flow path for said combustion gases such that the combustion gases are in continuous swirling contact with a thermal transfer wall which isolates said combustion gases from a secondary fluid and such that water vapor present in said gas continuously condenses on said thermal transfer wall and is swept therefrom by the continuous helical flow, thereby transferring latent heat of vaporization to said secondary fluid:

wherein the flow rate of the helical flow component of said combustion gases is very much greater than the net flow rate through said enclosure.

35. A method for increasing convection efficiency in an enclosure having a longitudinal axis, said method comprising the steps of:

supplying a substantially gaseous primary fluid at an inlet opening in said enclosure;

establishing a pressure differential between said inlet opening and an outlet opening of said enclosure to establish a continuous flow of primary fluid through said enclosure;

maintaining a secondary fluid in flow isolation from said primary fluid and thermal conduction relationship with said primary fluid through a thermal transfer element;

mechanically stirring said primary fluid in said enclosure, said stirring including the step of imparting a rotative flow component to said primary fluid about said longitudinal axis and along said thermal transfer element, the rate of said rotative flow component being at least very much greater than the primary fluid net flow rate through said enclosure; and flowing said secondary fluid through a confined flow path bounded at least in part by said thermal transfer element;

wherein the mechanical stirring of said primary fluid is accomplished by the steps of:

rotating a rotatable shaft about said longitudinal axis; and rotating plural blade members together with said shaft about said longitudinal axis to provide a net helical flow for said primary fluid through said enclosure, said helical flow representing the vectorial sum of said longitudinal flow and said rotatable shaft.

36. The method according to claim 35 wherein said step of establishing a pressure differential comprises rotating exhauster blades secured to said rotatable shaft in said enclosure to force fluid flow from said inlet opening to said outlet opening.

37. The method according to claim 35 wherein said step of establishing a pressure differential is performed externally of said enclosure.

38. A method of heat exchange comprising the steps of:

establishing flow of a first gaseous fluid containing water vapor through an enclosure in contact with a thermal transfer wall;

flowing a second fluid in contact with said thermal transfer wall to permit thermal transfer between said first and second fluids;

establishing a plurality of thermal zones at successive longitudinal locations in said enclosure;

graduating the temperatures in successive zones along the length of said enclosure;

in each zone, swirling said first fluid therein along a path which in part includes said thermal transfer wall;

in each zone, condensing said water vapor on said thermal transfer wall;

sweeping condensed water back into the swirling flow;

vaporizing the water swept back into the swirling flow; and repeating the above three steps to establish a cycle of condensation and vaporization in each of said zones;

wherein said step of swirling comprises the steps of:

rotating a first plurality of blades at a first location about an axis extending along the nominal flow direction of said first fluid through said enclosure; and in response to rotation of said plurality of blades, establishing a pair of said zones, one upstream and the other downstream of said first plurality of blades, each zone being defined by plural flow components having a net flow pattern which extends radially from said axis then along said thermal transfer wall and then back toward said axis.

39. A method of heat exchange comprising the steps of:
establishing flow of a first fluid through a enclosure in contact with a thermal transfer wall;
flowing a second fluid in contact with said thermal transfer wall to permit thermal transfer between said first and second fluids;
establishing a plurality of thermal zones at successive longitudinal locations in said enclosure;
graduating the temperatures in successive zones along the length of said enclosure; and
in each zone, swirling said first fluid therein along a path which in part includes said thermal transfer wall;
wherein said step of swirling comprises the steps of:
rotating a first plurality of blades at a first location about an axis extending along the nominal flow direction of said first fluid through said enclosure; and
in response to rotation of said plurality of blades, establishing a pair of said zones, one upstream and the other downstream of said first plurality of blades, each zone being defined by plural flow components having a net flow pattern which extends radially from said axis then along said thermal transfer wall and then back toward said axis.

40. The method according to claim 39 wherein the flow along said thermal transfer wall is oppositely directed in said two zones.

41. In a process of efficiently utilizing accessory power to maximize the convective heat exchange between a flowing gaseous stream and a heat exchanger housing, the steps comprising:

maintaining a static pressure differential between a first end and a second end of the heat exchanger housing which provides negligible internal flow resistance to said gaseous stream to flow the gaseous stream from the first end to the second end of the heat exchanger housing at an average axial velocity;
driving a mechanical stirring element located within the gaseous stream from a location outside the stream; and
mechanically stirring the gaseous stream with said stirring element along the inner surface of the heat exchanger housing at an angular velocity which is large relative to said axial velocity of the gaseous stream;
wherein accessory power required to maintain the static pressure differential across the heat exchanger is low and the power required to drive the stirring element is fully utilized to augment the convective heat exchange process.

42. The apparatus according to claim 7 wherein said exhauster blade means is disposed proximate said outlet opening.

43. The apparatus according to claim 29 wherein said fluid flow-inducing means is an exhauster means disposed proximate said outlet means.

44. The apparatus according to claim 43 wherein said exhauster means is a plurality of exhauster fan blades secured to and extending radially from said rotatable shaft.

45. The apparatus according to claim 1 wherein said enclosure is cylindrical and disposed concentrically about said longitudinal axis.

46. The apparatus according to claim 29 wherein said enclosure is cylindrical and disposed concentrically about said longitudinal axis.

* * * * *